US012812250B2

(12) United States Patent
Kim et al.

(10) Patent No.: US 12,812,250 B2
(45) Date of Patent: Nov. 24, 2026

(54) CAMERA DEVICE COMPRISING A STIFFENER HAVING GROOVES

(71) Applicant: LG INNOTEK CO., LTD., Seoul (KR)

(72) Inventors: Dong Hyun Kim, Seoul (KR); Jae Hun Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 9 days.

(21) Appl. No.: 18/712,187

(22) PCT Filed: Jan. 17, 2023

(86) PCT No.: PCT/KR2023/000788
§ 371 (c)(1),
(2) Date: May 21, 2024

(87) PCT Pub. No.: WO2023/146192
PCT Pub. Date: Aug. 3, 2023

(65) Prior Publication Data

US 2025/0024149 A1 Jan. 16, 2025

(30) Foreign Application Priority Data

Jan. 27, 2022 (KR) ........................ 10-2022-0012013
Mar. 16, 2022 (KR) ........................ 10-2022-0032582

(51) Int. Cl.
*H04N 23/68* (2023.01)
*H04N 23/55* (2023.01)

(52) U.S. Cl.
CPC ........... *H04N 23/687* (2023.01); *H04N 23/55* (2023.01)

(58) Field of Classification Search
CPC ...... H04N 23/687; H04N 23/55; H04N 23/00; H04N 23/52; H04N 23/54; H04N 23/57; H04N 23/68; H02K 33/18; H05K 1/18
See application file for complete search history.

(56) References Cited

U.S. PATENT DOCUMENTS 12,149,830 B2 * 11/2024 Smyth .................... H04N 23/54
12,238,418 B1 * 2/2025 Yang ...................... H04N 23/54
12,389,704 B1 * 8/2025 Smyth .................... H04N 23/55
(Continued)

FOREIGN PATENT DOCUMENTS

JP 2019-20467 A 2/2019
JP 6959777 B2 11/2021
(Continued)

*Primary Examiner* — Padma Haliyur
(74) *Attorney, Agent, or Firm* — Birch, Stewart, Kolasch & Birch, LLP

(57) ABSTRACT

A first embodiment of the present invention relates to a camera device comprising: a first substrate; a second substrate which is disposed on the first substrate; a first stiffener which is disposed at the second substrate; an image sensor which is disposed at the first stiffener; a connection substrate which connects the first substrate and the second substrate to each other; and a drive unit which moves the image sensor with respect to the first substrate, wherein the first stiffener comprises: a first surface at which the image sensor is disposed; a second surface which is opposite to the first surface; and a plurality of grooves which are formed at the second surface and spaced apart from each other.

20 Claims, 43 Drawing Sheets

(56) References Cited

U.S. PATENT DOCUMENTS

| | | | | |
|---|---|---|---|---|
| 2016/0037627 | A1 | 2/2016 | Ueyama | |
| 2019/0018258 | A1* | 1/2019 | Minamisawa | H04N 23/687 |
| 2019/0121050 | A1* | 4/2019 | Park | G02B 7/02 |
| 2019/0288022 | A1* | 9/2019 | Hsu | G02B 7/006 |
| 2019/0387136 | A1* | 12/2019 | Ahn | H04N 23/54 |
| 2020/0053258 | A1* | 2/2020 | Park | H04N 23/52 |
| 2021/0021744 | A1* | 1/2021 | Kim | G02B 7/09 |
| 2022/0086317 | A1* | 3/2022 | Paik | H04N 23/687 |
| 2023/0156310 | A1* | 5/2023 | Jang | H04N 23/6812<br>348/208.2 |
| 2024/0214681 | A1* | 6/2024 | Xia | H04N 23/54 |

FOREIGN PATENT DOCUMENTS

| | | | |
|---|---|---|---|
| KR | 10-0818473 | B1 | 4/2008 |
| KR | 10-2016-0088040 | A | 7/2016 |
| KR | 10-2019-0110226 | A | 9/2019 |
| KR | 10-2020-0002358 | A | 1/2020 |
| KR | 10-2021-0100430 | A | 8/2021 |

* cited by examiner

CAMERA DEVICE COMPRISING A STIFFENER HAVING GROOVES

CROSS REFERENCE TO RELATED APPLICATIONS

This application is the National Phase of PCT International Application No. PCT/KR2023/000788, filed on Jan. 17, 2023, which claims priority under 35 U.S.C. 119(a) to Patent Application No. 10-2022-0012013, filed in the Republic of Korea on Jan. 27, 2022, and Patent Application No. 10-2022-0032582, filed in the Republic of Korea on Mar. 16, 2022, all of which are hereby expressly incorporated by reference into the present application.

TECHNICAL FIELD

The present embodiment relates to a camera device.

BACKGROUND ART

A camera device is a device that photographs a picture or video of a subject, and is installed in optical devices such as smartphones, drones, and vehicles.

In order to improve image quality, camera devices are required to have optical image stabilization (OIS) function that corrects image shaking caused by the user's movement.

In camera devices, an image stabilization function is performed by moving the lens in a direction perpendicular to the optical axis. However, with the recent trend toward higher pixels, the diameter of the lens increases, which increases the weight of the lens, making it difficult to secure electromagnetic force to move the lens inside a limited space.

Furthermore, in the case of a camera device that performs an image stabilization function by moving the image sensor, there is a problem in that heat being generated from the image sensor is not smoothly dissipated.

Furthermore, in the case of a camera device that performs an image stabilization function by moving the image sensor, as the number of terminals for electrical conduction with the image sensor increases, so there is a problem of increased soldering defects as the gap between terminals narrows.

(Patent Literature 1) KR 10-2017-0021682 A

DETAILED DESCRIPTION OF THE INVENTION

Technical Subject

A first embodiment of the present invention is intended to provide a camera device that performs an image stabilization function by moving the image sensor.

A first embodiment of the present invention is intended to provide a camera device that drives an image sensor in three axes: x-axis shift, y-axis shift, and z-axis rolling, that is, three axes.

Furthermore, it is intended to provide a camera device with enhanced heat dissipation performance of an image sensor in a structure that moves the image sensor.

A second embodiment of the present invention is intended to provide a camera device that performs an image stabilization function by moving the image sensor.

A second embodiment of the present invention is intended to provide a camera device that drives an image sensor in three axes: x-axis shift, y-axis shift, and z-axis rolling, that is, three axes.

Furthermore, it is intended to provide a camera device that minimizes defects occurring during electrical connection work between large numbers of terminals with narrow spacing.

Technical Solution

A camera device according to a first embodiment of the present invention comprises: a first substrate; a second substrate being disposed on the first substrate; a first stiffener being disposed at the second substrate; an image sensor being disposed at the first stiffener; a connection substrate which connects the first substrate and the second substrate to each other; and a drive unit which moves the image sensor with respect to the first substrate, wherein the first stiffener comprises: a first surface at which the image sensor is disposed; a second surface which is opposite to the first surface; and a plurality of grooves which are formed at the second surface and spaced apart from each other.

Each of the plurality of grooves of the first stiffener may be formed in a first direction perpendicular to the optical axis to be longer than the length of the image sensor in the corresponding direction.

The first stiffener comprises a first groove and a second groove being disposed furthest from each other in a second direction perpendicular to both the optical axis and the first direction, wherein the distance between the first groove and the second groove may be shorter than the length of the image sensor in the corresponding direction.

It comprises a third substrate being disposed on a lower surface of the second substrate and comprising a hole, the first stiffener is disposed on a lower surface of the third substrate, and the image sensor may be disposed on an upper surface of the first stiffener and may be disposed in the hole of the third substrate.

It may comprise a second stiffener being disposed on an upper surface of the first substrate, and a gap may be formed between the first stiffener and the second stiffener.

In an optical axis direction, a gap between the first stiffener and the second stiffener may be larger than the thickness of the second stiffener and smaller than the thickness of the first substrate.

The first substrate comprises an insulation layer and a conductive layer, the conductive layer of the first substrate comprises an open region where the insulation layer is omitted from a lower surface of the first substrate, and the area of the open region of the conductive layer may be more than 70% of the total area of the lower surface of the first substrate.

The open region of the conductive layer may be connected to the second stiffener through a via hole being formed in the first substrate.

The first stiffener may comprise a protruding portion being protruded from an upper surface and disposed in a hole of the third substrate, and the image sensor may be disposed on an upper surface of the protruding portion of the first stiffener.

An upper surface of the image sensor may be disposed at a height corresponding to an upper surface of the third substrate.

The drive unit may comprise a coil being disposed on the second substrate and a magnet that interacts with the coil.

The camera device may comprise: a bracket; a first cover member being disposed in the first substrate and inside the bracket; a driver IC being disposed in the first substrate outside the first cover member and electrically connected to the coil; a second cover member covering the driver IC; and a conductive tape being attached to the second cover member and the bracket.

The camera device may comprise: a first cover member disposed in the first substrate and comprising an upper plate and a side plate; a driver IC disposed in the first substrate outside the first cover member and electrically connected to the coil; a bracket being disposed in the first substrate to cover the driver IC; and a conductive epoxy being disposed between the driver IC and the bracket.

The camera device may comprise a lens being disposed on the image sensor and a second drive unit that moves the lens in an optical axis direction with respect to the image sensor.

An optical device according to a first embodiment of the present invention comprises a main body; the camera device being disposed in the main body; and a display disposed in the main body and outputting an image photographed by the camera device.

A camera device according to a second embodiment of the present invention comprises: a first substrate; a second substrate being disposed on the first substrate; an image sensor electrically connected to the second substrate; a connection substrate connecting the first substrate and the second substrate; and a first drive unit that moves the image sensor with respect to the first substrate, wherein the connection substrate comprises a terminal, wherein the first substrate comprises a hole being disposed at a position corresponding to the terminal, wherein a pin member is disposed in the hole of the first substrate, and wherein the pin member may electrically connect the terminal of the connection substrate and the first substrate.

The first substrate comprises an insulation layer and a conductive layer, wherein the conductive layer may comprise an open region that is opened upward by omitting the insulation layer around the hole of the first substrate.

The terminal of the connection substrate may comprise a plurality of terminals electrically connected to the image sensor.

The pin member may comprise: a first portion being disposed below the first substrate; a second portion being disposed in the hole of the first substrate; and a third portion disposed above the first substrate.

The second portion of the pin member may be bent roundly and extended from the first portion of the pin member.

The end portion of the first portion of the pin member may face outward.

The camera device comprises: a stiffener being disposed on a lower surface of the first substrate, wherein in the optical axis direction, the thickness of the stiffener is thicker than the thickness of the first portion of the pin member or may be the same as the thickness of the first portion of the pin member.

The camera device comprises a conductive member being disposed on at least a portion of the second portion and the third portion of the pin member, wherein the diameter of the conductive member in a direction perpendicular to the optical axis may be smaller than the diameter of the hole of the first substrate.

The conductive member may be connected to the terminal of the connection substrate by hot air.

The upper end of the third portion of the pin member may be disposed at a position corresponding to or lower than the middle region of the connection substrate in the optical axis direction of the terminal.

It may comprise an adhesive that secures the third portion of the pin member to a lower surface of the first substrate.

The hole of the first substrate may comprise pluralities of holes, wherein the diameter of each of the plurality of holes may be smaller than the gap among the pluralities of holes.

The width of the connection substrate in a direction perpendicular to the optical axis of the terminal may be larger than a diameter of the hole of the first substrate in a corresponding direction.

The camera device comprises a lens being disposed on the image sensor and may comprise a second drive unit that moves the lens in an optical axis direction with respect to the image sensor.

The optical apparatus according to the second embodiment of the present invention may comprise: a main body; the camera device being disposed in the main body; and a display being disposed in the main body and outputting images photographed by the camera device.

Advantageous Effects

Through the first embodiment of the present invention, an image stabilization function can be performed by moving the image sensor.

In addition, the heat dissipation performance of the image sensor can be enhanced in a structure that moves the image sensor.

In more detail, as a heat sink structure is applied to the opposite side of the stiffener where the image sensor is disposed, the heat dissipation area can be increased and heat dissipation performance can be improved.

Through the second embodiment of the present invention, the image stabilization function can be performed by moving the image sensor.

In addition, the quality of electrical connection work of a large number of terminals with narrow spacing can be improved. In other words, the poor electrical conduction of the manufactured camera device can be improved.

In addition, electrical connections between terminals can be made with just hot air heating, so soldering equipment is not needed or may be simplified, thereby reducing manufacturing costs.

BRIEF DESCRIPTION OF DRAWINGS

FIG. 25 is a diagram illustrating how an image sensor of a camera device according to a first embodiment of the present invention is shifted along an x-axis. FIG. 26 is a diagram illustrating how an image sensor of a camera device according to a first embodiment of the present invention is shifted along a y-axis. FIG. 27 is a diagram illustrating how an image sensor of a camera device according to a first embodiment of the present invention is rolling around a z-axis.

FIG. 47 is a diagram illustrating an actuator being seated on a first substrate. FIG. 48 is a diagram illustrating inserting a pin member with a conductive member disposed in a hole of a first substrate. FIG. 49 is a diagram illustrating a pin member inserted into a hole of a first substrate and a portion of the pin member and a conductive member being more protruded than an upper surface of a first substrate. FIG. 50 is a diagram illustrating hot air being applied to a conductive member through a blower (BL) so that the conductive member is connected to a terminal of a connection substrate. FIG. 51 is a view illustrating the portion connecting pluralities of pin members to one another after being cut from an edge of a first substrate.

FIG. 56 is a diagram to explain how the image sensor of a camera device according to a second embodiment of the present invention is shifted along an x-axis. FIG. 57 is a diagram to explain how an image sensor of a camera device is shifted along a y-axis according to a second embodiment of the present invention. FIG. 58 is a diagram for explaining a rolling operation of an image sensor of a camera device according to a second embodiment of the present invention around the z-axis.

BEST MODE

Figure 1:
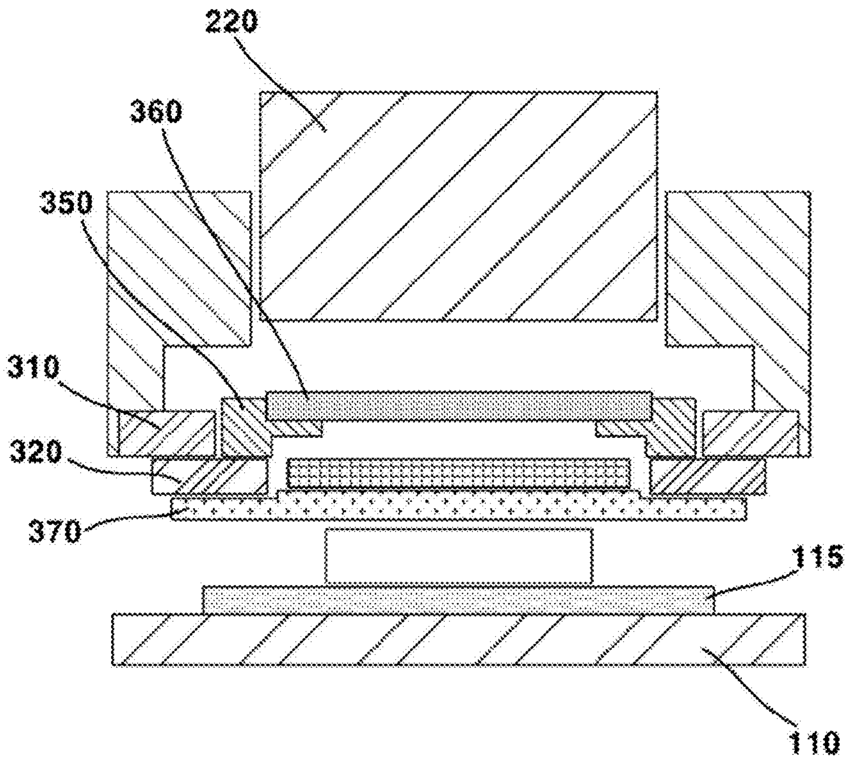
FIG. 1 is a conceptual diagram of a camera device according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction with respect to one component may be comprised.

Hereinafter, one of an 'AF drive unit' and an 'OIS drive unit' may be referred to as a 'first drive unit' and the other may be referred to as a 'second drive unit'. Hereinafter, one of an 'AF coil 430' and an 'OIS coil 440' may be referred to as a 'first coil' and the other may be referred to as a 'second coil'. Hereinafter, one among an 'AF magnet 410', an 'OIS magnet 420', a 'sensing magnet 450', and a 'correction magnet 460' is referred to as a 'first magnet', the other is referred to as a 'second magnet', yet the other is referred to as a 'third magnet', and still the other may be referred to as a 'fourth magnet'. Hereinafter, any one among a 'first substrate 110', a 'second substrate 310', a 'third substrate 320', a 'sensing substrate 470', and a 'connection substrate 600' is referred to as a 'first substrate', the other is referred to as a 'second substrate', yet the other is referred to as a 'third substrate', still the other may be referred to as a 'fourth substrate' and yet still the other may be referred to as a 'fifth substrate'. Hereinafter, one of the 'first stiffener 370' and the 'second stiffener 115' may be referred to as a 'first stiffener' and the other may be referred to as a 'second stiffener'. Hereinafter, one of the 'first cover member 140' and the 'second cover member 150' may be referred to as a 'first cover member' and the other may be referred to as a 'second cover member'.

Hereinafter, one of the 'AF drive unit' and the 'OIS drive unit' may be referred to as a 'first drive unit' and the other may be referred to as a 'second drive unit'. Hereinafter, one of the 'AF coil 1430' and the 'OIS coil 1440' may be referred to as a 'first coil' and the other may be referred to as a 'second coil'. Hereinafter, one among an 'AF magnet 1410', an 'OIS magnet 1420', a 'sensing magnet 1450', and a 'correction magnet 1460' is referred to as a 'first magnet', and the other is referred to as a 'second magnet', yet the other is referred to as a 'third magnet', and still the other may be referred to as a 'fourth magnet'. Hereinafter, any one among a 'first substrate 1110', a 'second substrate 1310', a 'sensor substrate 1320', a 'sensing substrate 1470', and a 'connection substrate 1600' is referred to as 'first substrate'. One can be referred to as a 'substrate', another can be referred to as a 'second substrate', another can be referred to as a 'third substrate', another can be referred to as a 'fourth substrate', and another can be referred to as a 'fifth substrate'.

Hereinafter, a camera device according to a first embodiment of the present invention will be described with reference to the drawings.

Figure 2:
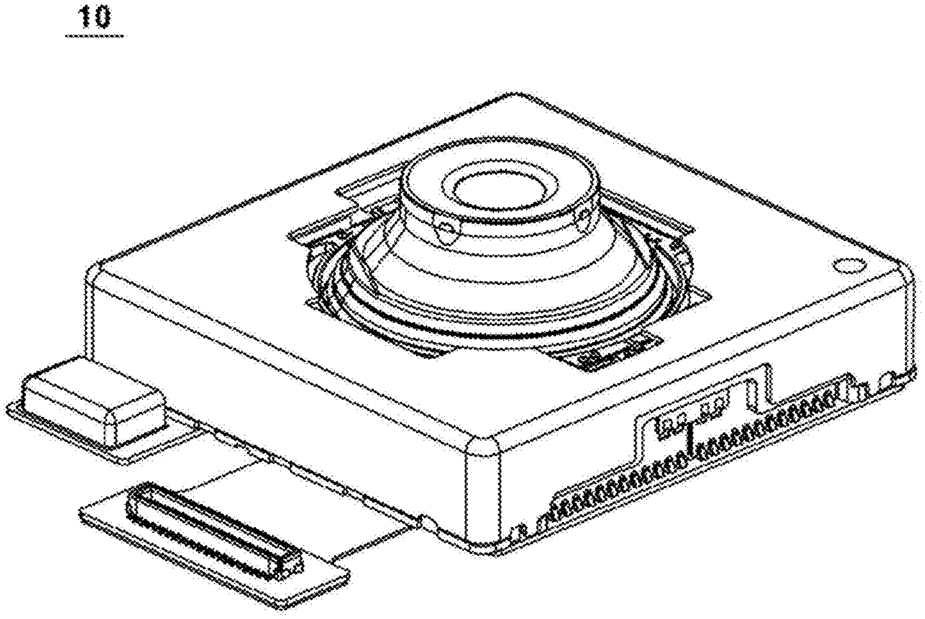
FIG. 2 is a perspective view of a camera device according to a first embodiment of the present invention.
Figure 3:
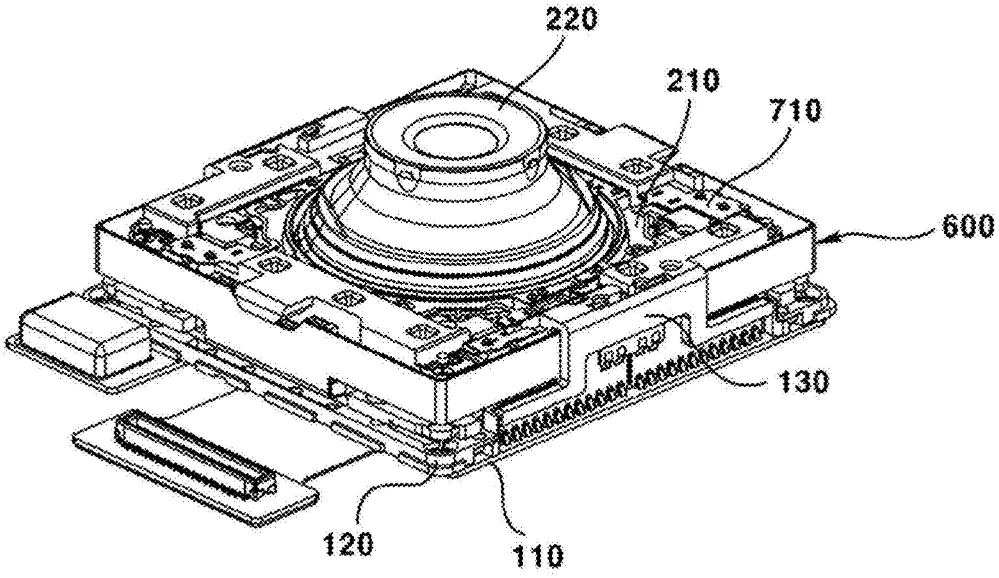
FIG. 3 is a perspective view of a camera device according to a first embodiment of the present invention with the first cover member omitted.
Figure 4:
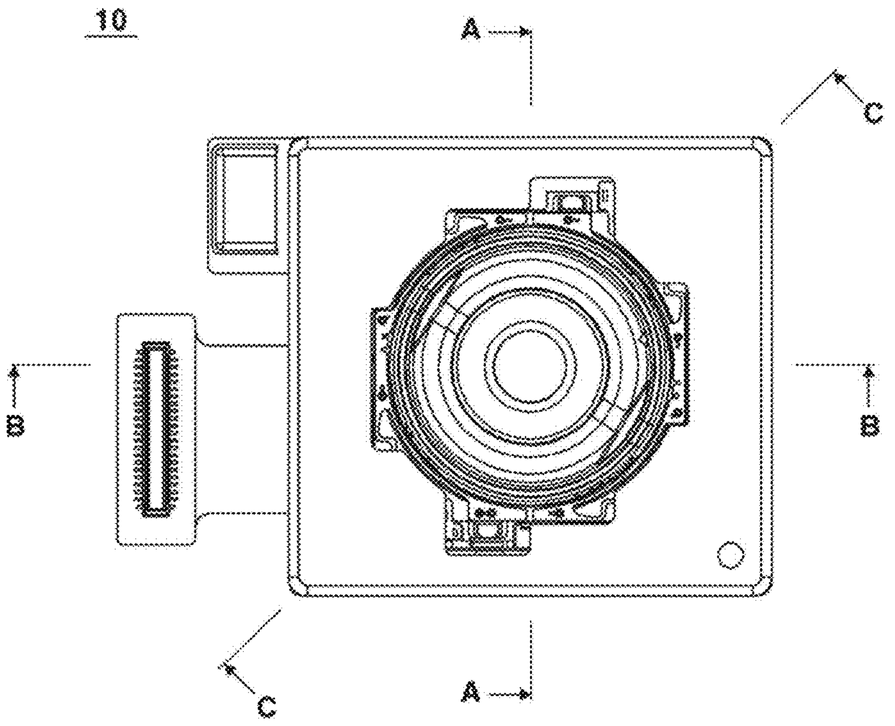
FIG. 4 is a plan view of a camera device according to a first embodiment of the present invention.
Figure 5:
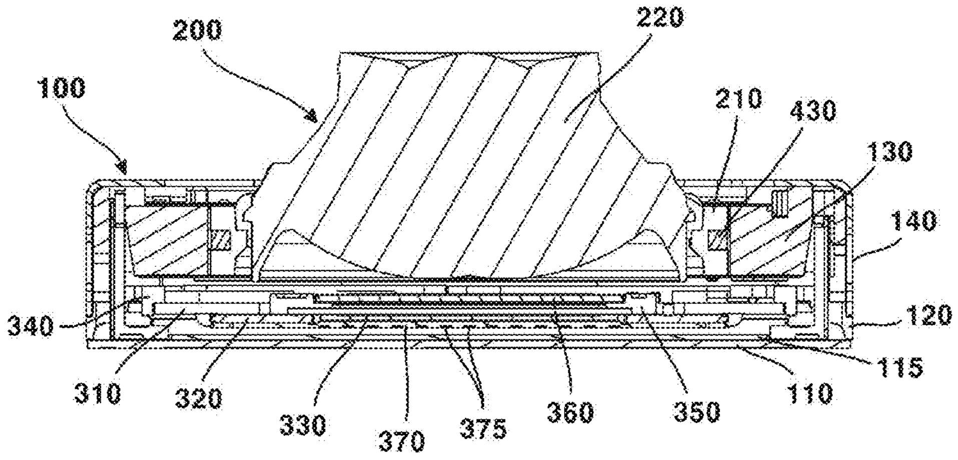
FIG. 5 is a cross-sectional view taken along line A-A in FIG. 4.
Figure 6:
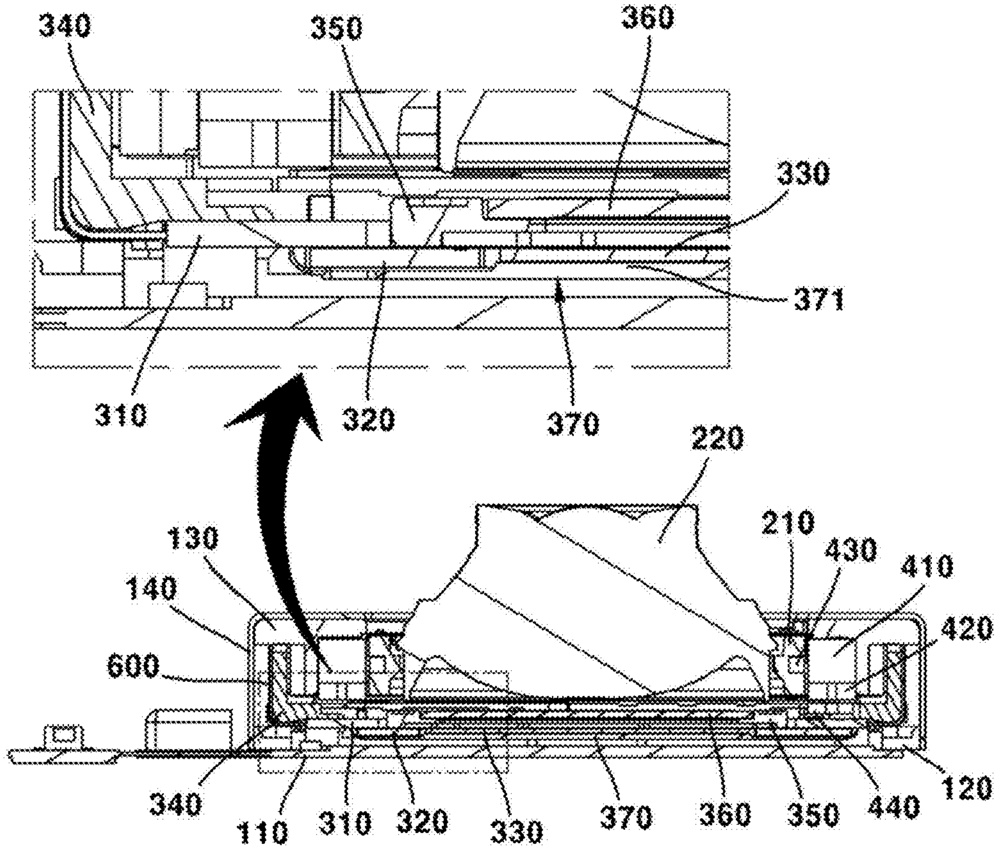
FIG. 6 is a cross-sectional view taken along line B-B in FIG. 4 and a partially enlarged view thereof.
Figure 7:
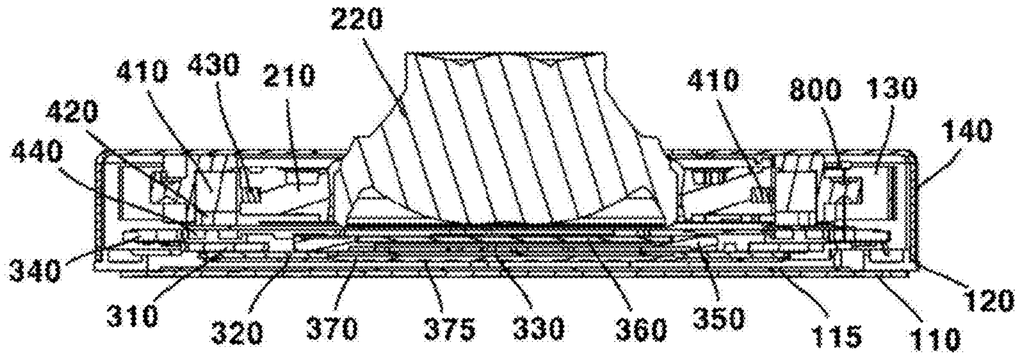
FIG. 7 is a cross-sectional view taken along line C-C in FIG. 4.
Figure 8:
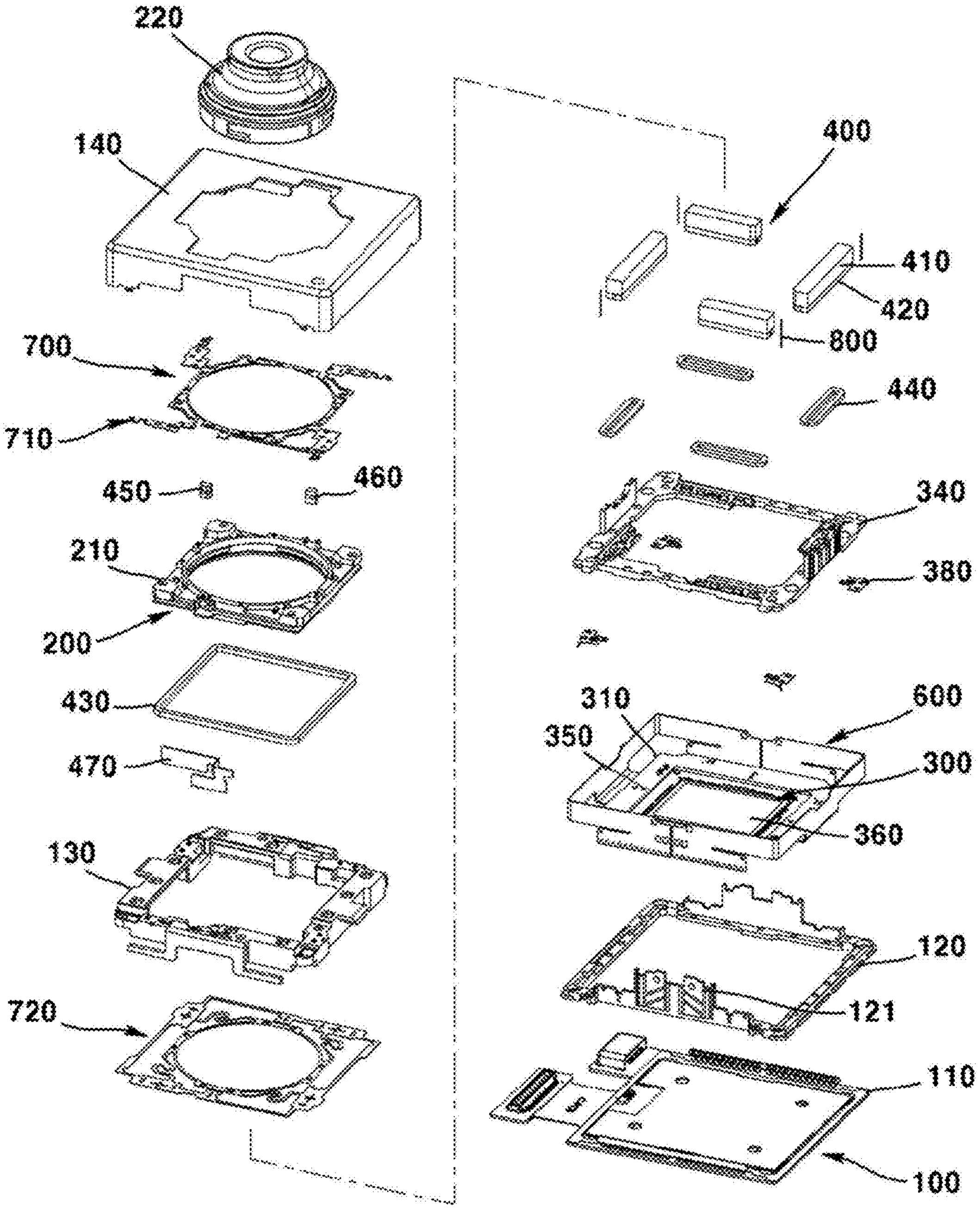
FIG. 8 is an exploded perspective view of a camera device according to a first embodiment of the present invention.
Figure 9:
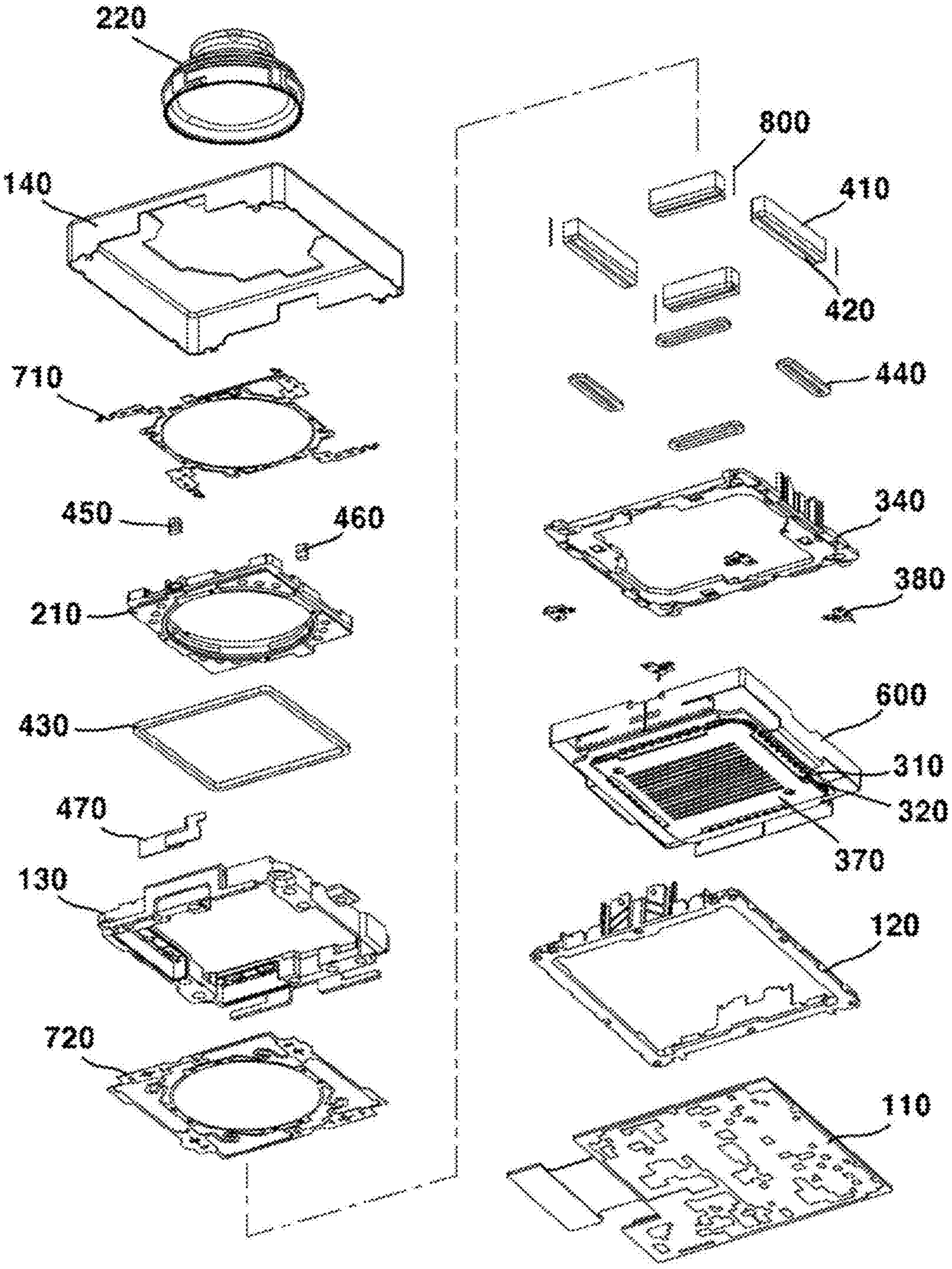
FIG. 9 is an exploded perspective view of a camera device according to a first embodiment of the present invention seen from a direction different from that of FIG. 8.
Figure 10:
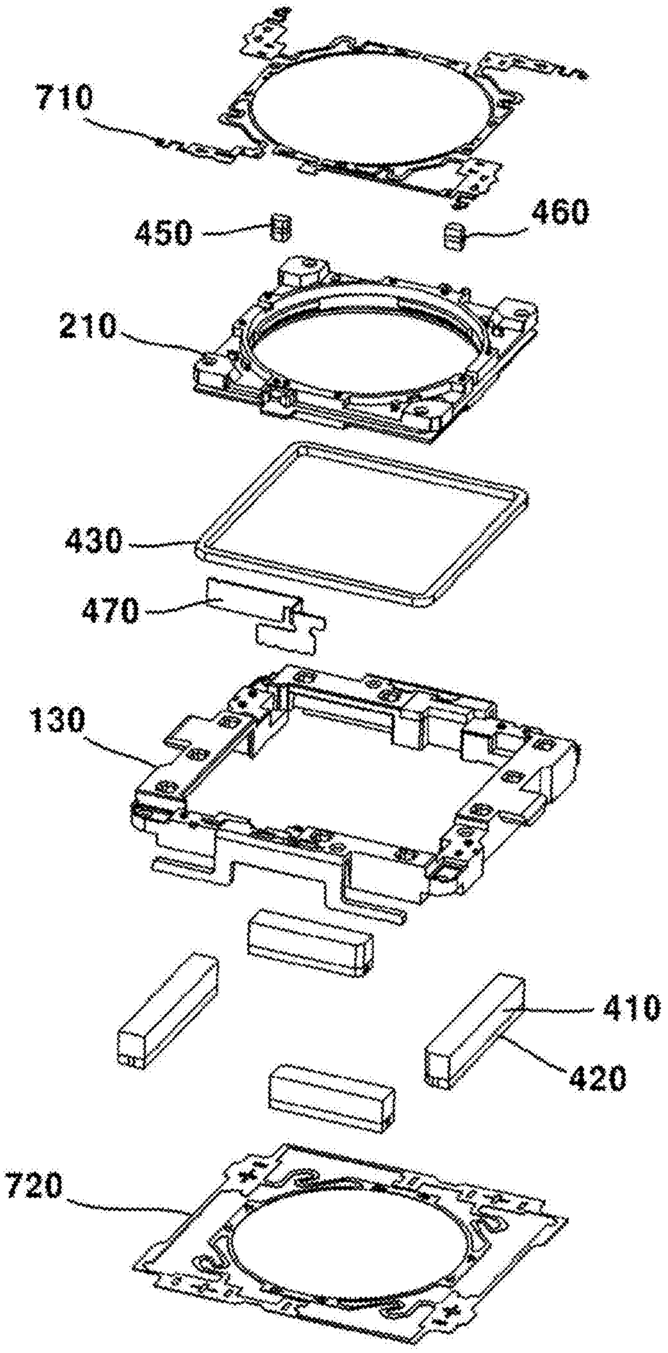
FIG. 10 is an exploded perspective view of a first moving part and related components of a camera device according to a first embodiment of the present invention.
Figure 11:
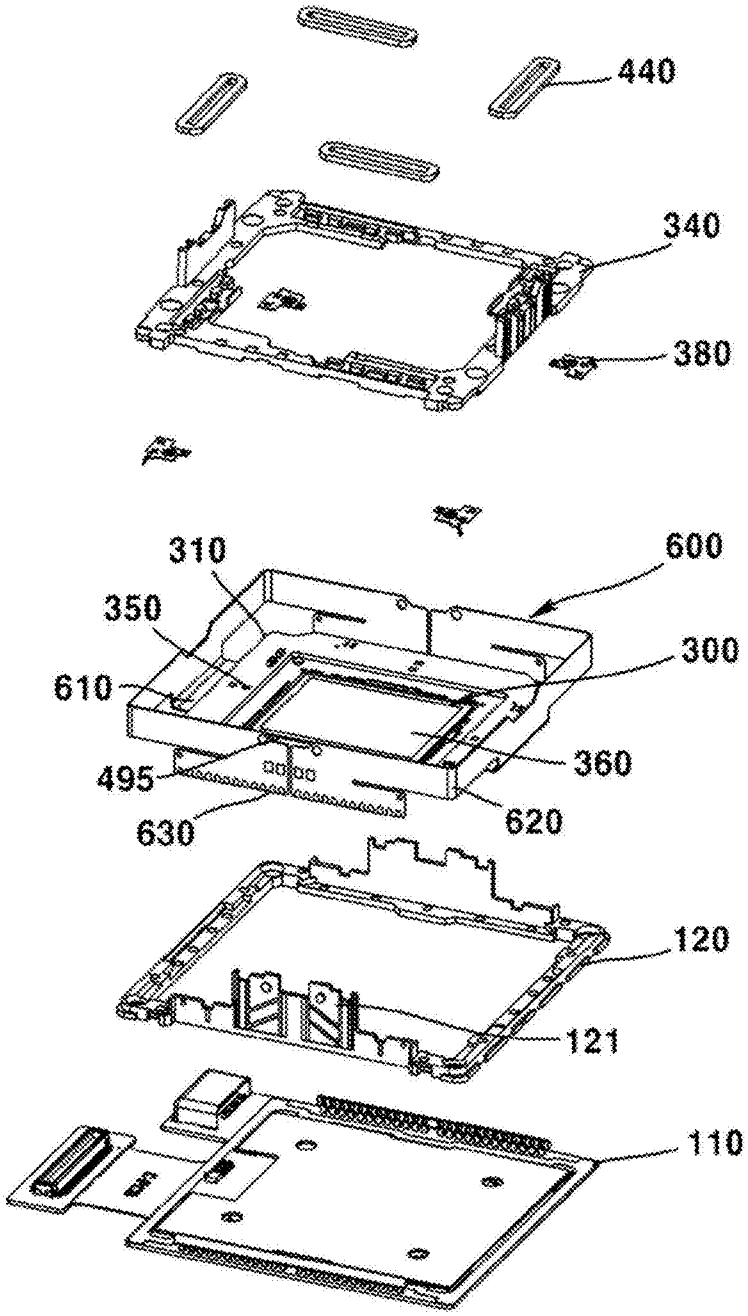
FIG. 11 is an exploded perspective view of a second moving part and related components of a camera device according to a first embodiment of the present invention.
Figure 12:
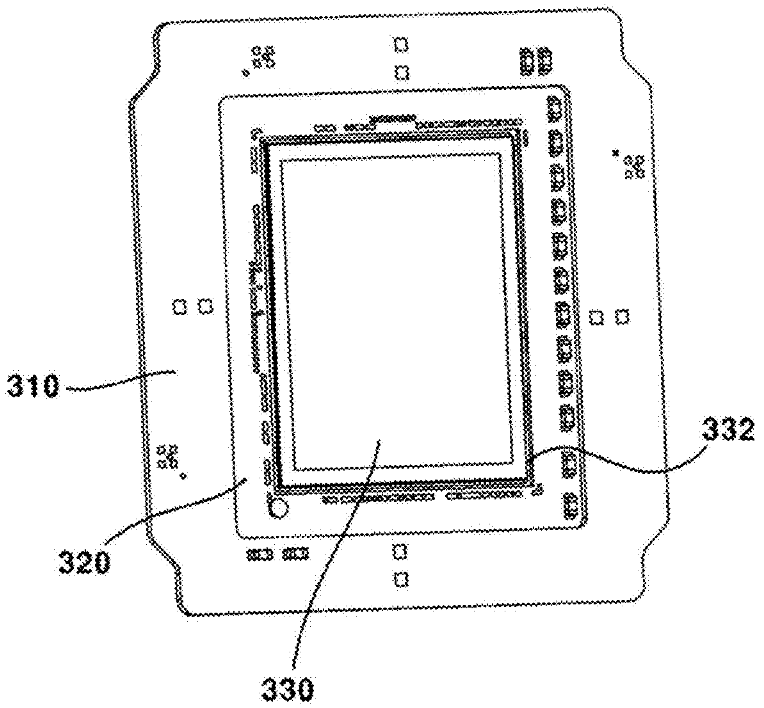
FIG. 12 is a perspective view illustrating a coupled structure of an image sensor and related components of a camera device according to a first embodiment of the present invention.
Figure 13:
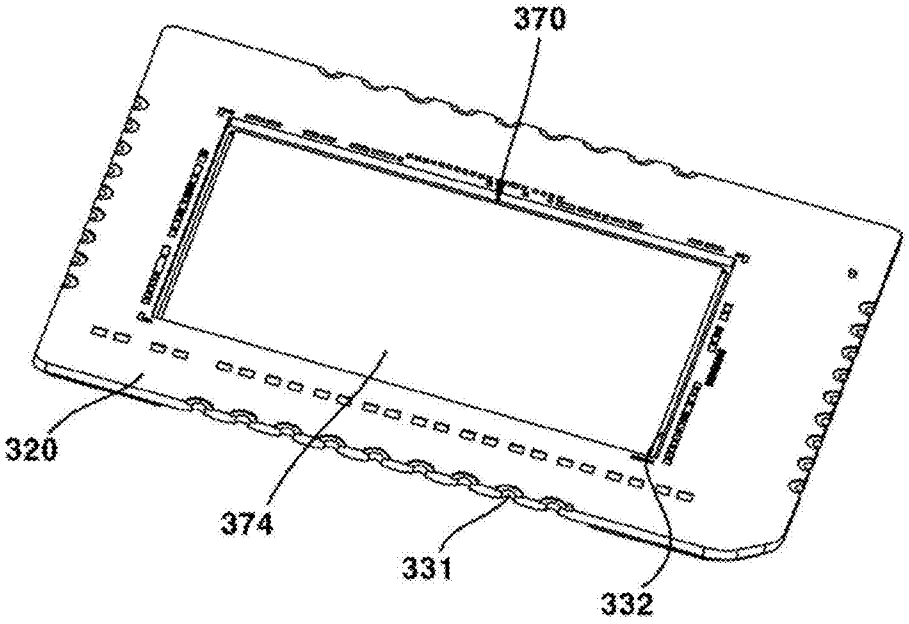
FIG. 13 is a perspective view illustrating a state in which a second substrate and a first stiffener are coupled in a camera device according to a first embodiment of the present invention.
Figure 14:
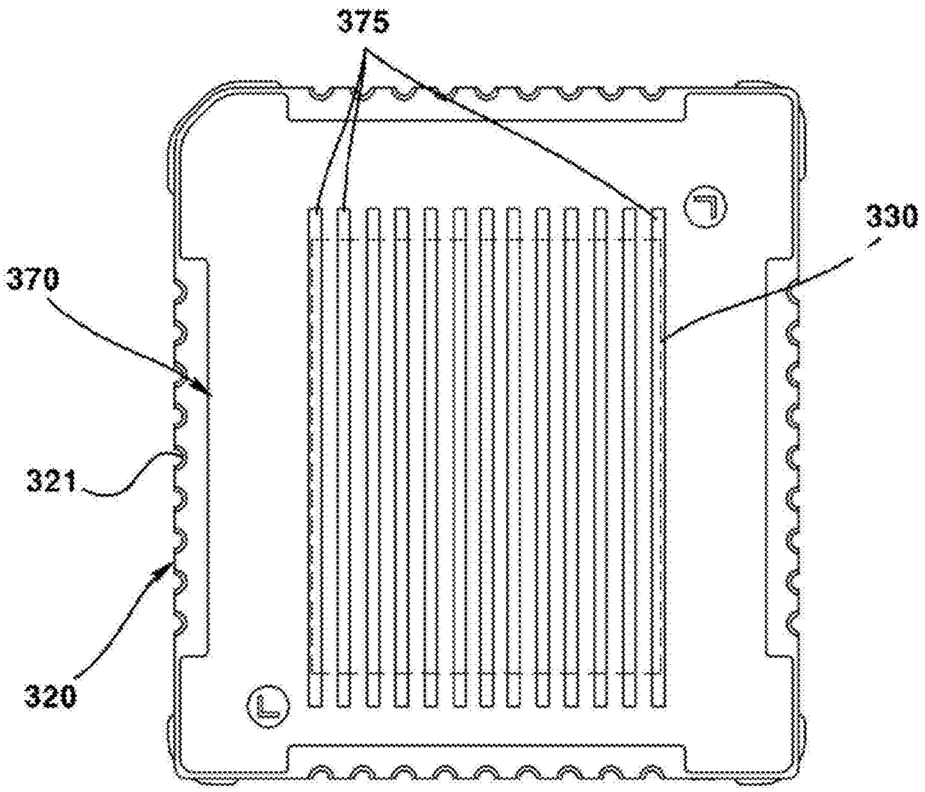
FIG. 14 is a see-through view of an image sensor projected onto a first stiffener in a camera device according to a first embodiment of the present invention.
Figure 15:
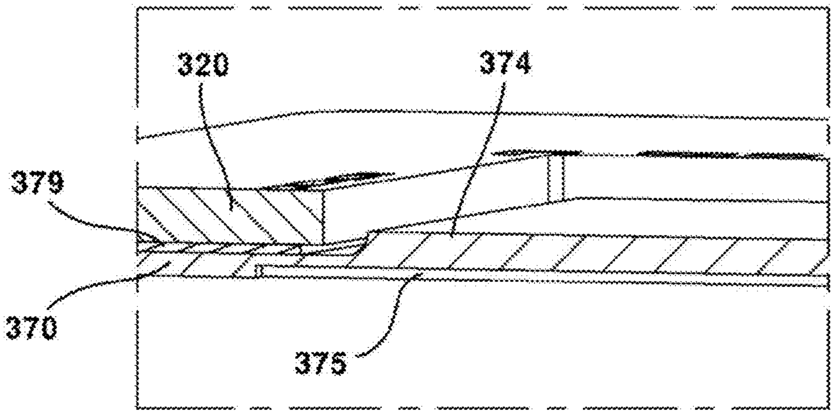
FIG. 15 is a cross-sectional perspective view illustrating a state in which a second substrate and a first stiffener are coupled in a camera device according to a first embodiment of the present invention.
Figure 16:
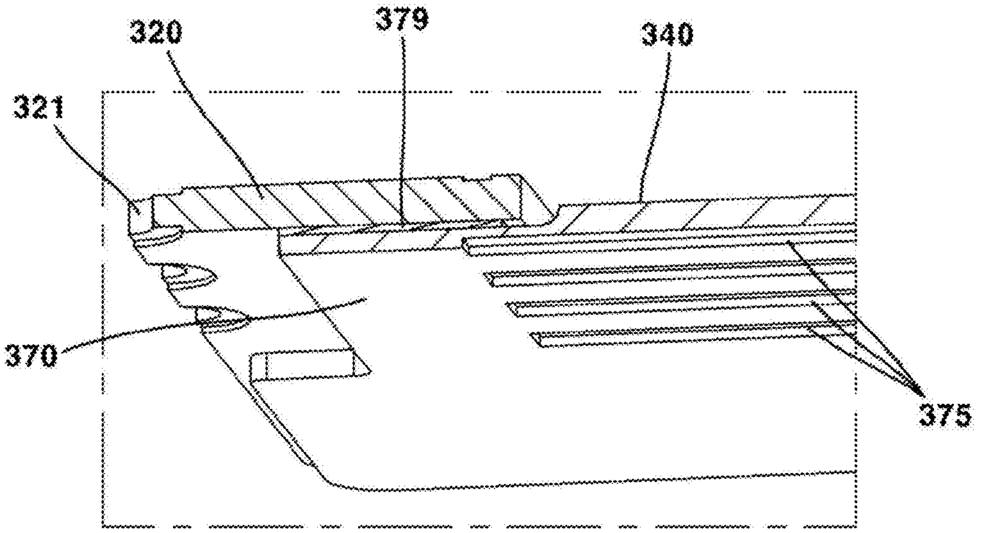
FIG. 16 is a cross-sectional perspective view of a state in which a second substrate and a first stiffener are coupled in a camera device according to a first embodiment of the present invention, viewed from a direction different from that of FIG. 15.
Figure 17:
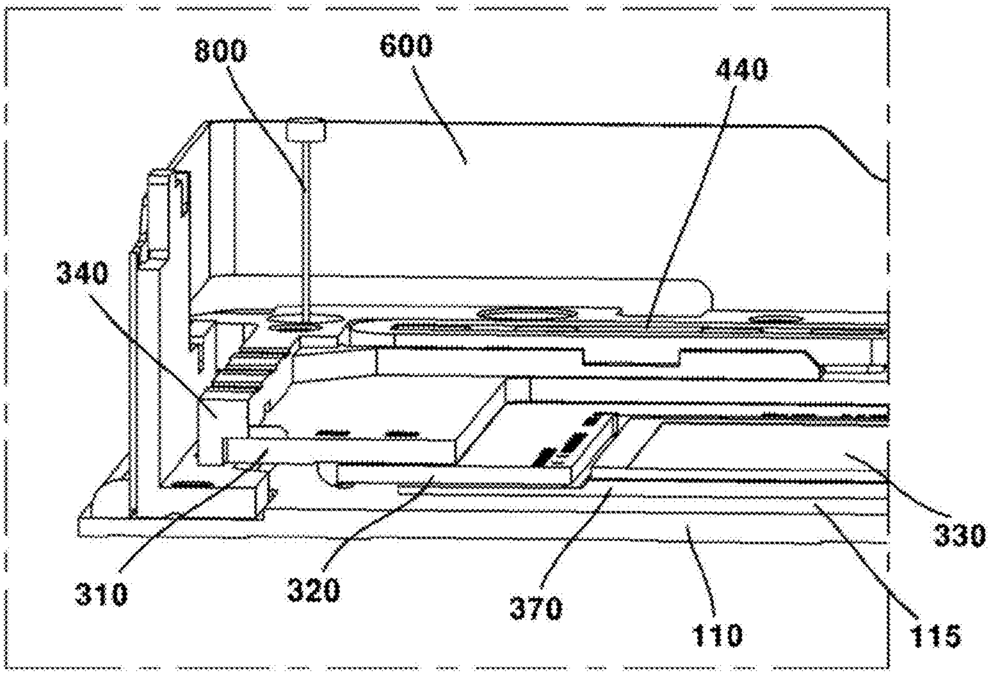
FIG. 17 is a cross-sectional perspective view illustrating a coupled state of a fixed part, a second moving part, and a connection substrate in a camera device according to a first embodiment of the present invention.
Figure 18:
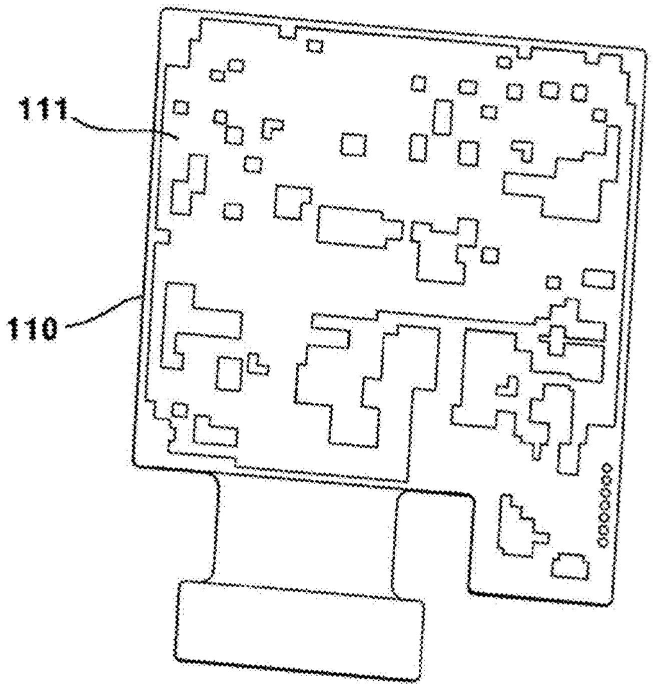
FIG. 18 is a bottom perspective view of a first substrate of a camera device according to a first embodiment of the present invention.
Figure 19:
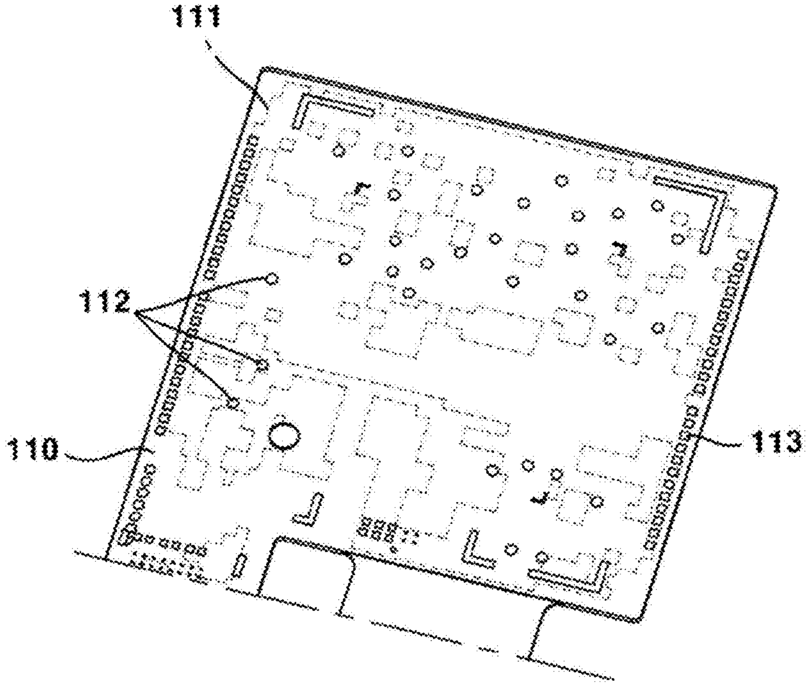
FIG. 19 is a perspective view of a first substrate of a camera device according to a first embodiment of the present invention.
Figure 20:
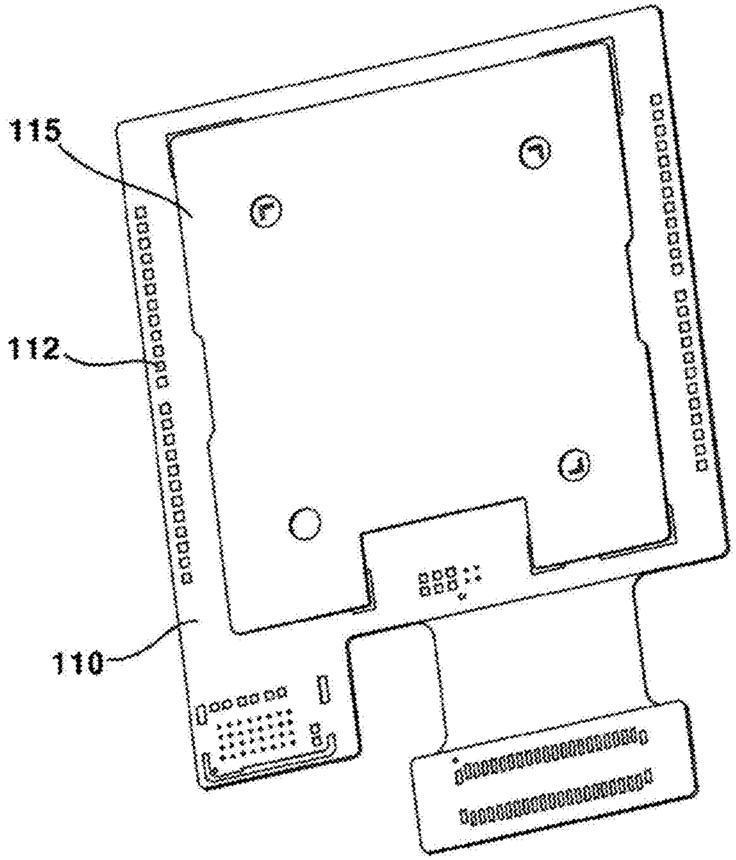
FIG. 20 is a perspective view illustrating a state in which a second stiffener is disposed on a first substrate of a camera device according to a first embodiment of the present invention.
Figure 21:
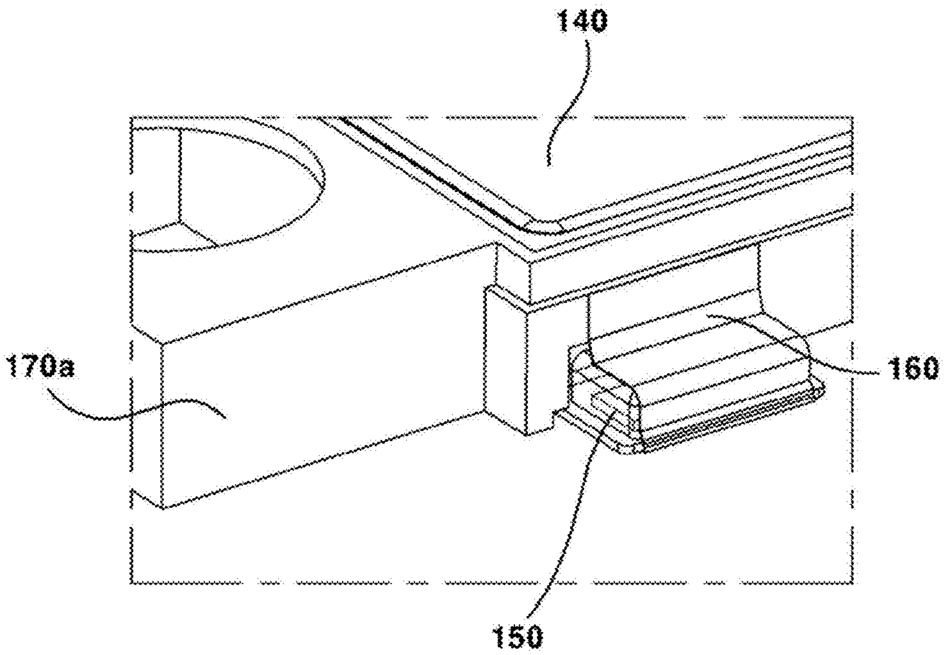
FIG. 21 is a diagram illustrating a conductive tape and related components of a camera device according to a first embodiment of the present invention.
Figure 22:
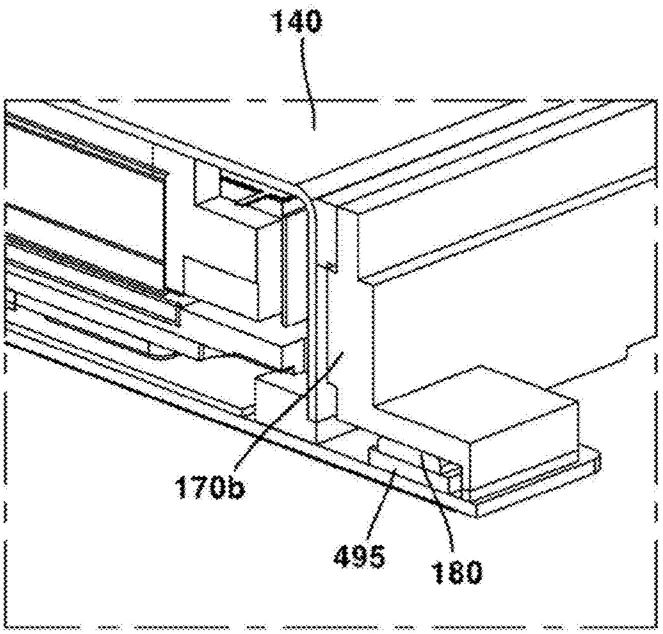
FIG. 22 is a diagram illustrating a conductive epoxy and related components of a camera device according to a modified embodiment.
Figure 23:
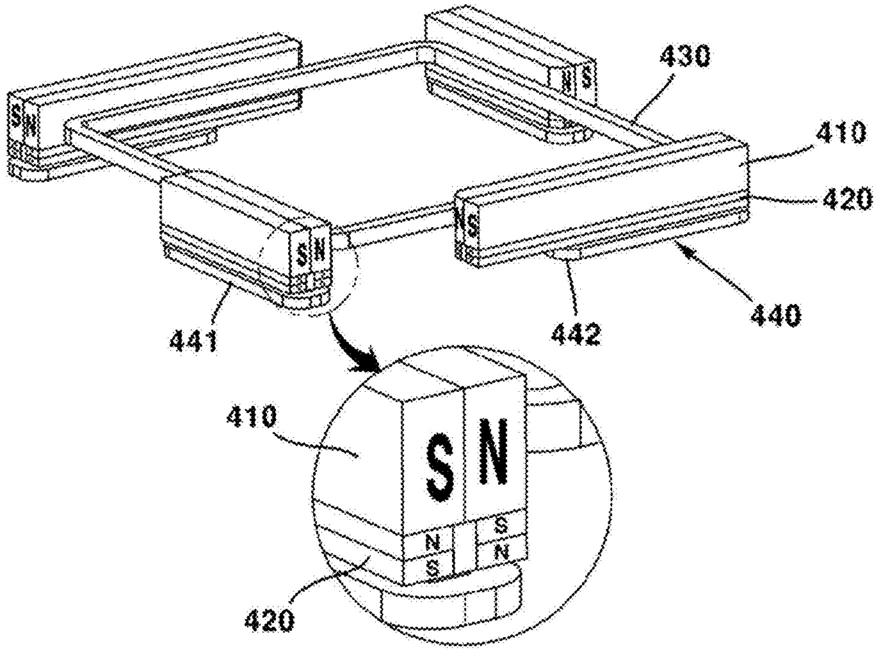
FIG. 23 is a perspective view illustrating an arrangement of a coil and a magnet of a camera device of a first embodiment of the present invention.

FIG. 1 is a conceptual diagram of a camera device according to a first embodiment of the present invention; FIG. 2 is a perspective view of a camera device according to a first embodiment of the present invention; FIG. 3 is a perspective view of a camera device according to a first embodiment of the present invention with the first cover member omitted; FIG. 4 is a plan view of a camera device according to a first embodiment of the present invention; FIG. 5 is a cross-sectional view taken along line A-A in FIG. 4; FIG. 6 is a cross-sectional view taken along line B-B in FIG. 4 and a partially enlarged view thereof; FIG. 7 is a cross-sectional view taken along line C-C in FIG. 4; FIG. 8 is an exploded perspective view of a camera device according to a first embodiment of the present invention; FIG. 9 is an exploded perspective view of a camera device according to a first embodiment of the present invention seen from a direction different from that of FIG. 8; FIG. 10 is an exploded perspective view of a first moving part and related components of a camera device according to a first embodiment of the present invention; FIG. 11 is an exploded perspective view of a second moving part and related components of a camera device according to a first embodiment of the present invention; FIG. 12 is a perspective view illustrating a coupled structure of an image sensor and related components of a camera device according to a first embodiment of the present invention; FIG. 13 is a perspective view illustrating a state in which a second substrate and a first stiffener are coupled in a camera device according to a first embodiment of the present invention; FIG. 14 is a see-through view of an image sensor projected onto a first stiffener in a camera device according to a first embodiment of the present invention; FIG. 15 is a cross-sectional perspective view illustrating a state in which a second substrate and a first stiffener are coupled in a camera device according to a first embodiment of the present invention; FIG. 16 is a cross-sectional perspective view of a state in which a second substrate and a first stiffener are coupled in a camera device according to a first embodiment of the present invention, viewed from a direction different from that of FIG. 15; FIG. 17 is a cross-sectional perspective view illustrating a coupled state of a fixed part, a second moving part, and a connection substrate in a camera device according to a first embodiment of the present invention; FIG. 18 is a bottom perspective view of a first substrate of a camera device according to a first embodiment of the present invention; FIG. 19 is a perspective view of a first substrate of a camera device according to a first embodiment of the present invention; FIG. 20 is a perspective view illustrating a state in which a second stiffener is disposed on a first substrate of a camera device according to a first embodiment of the present invention; FIG. 21 is a diagram illustrating a conductive tape and related components of a camera device according to a first embodiment of the present invention; FIG. 22 is a diagram illustrating a conductive epoxy and related components of a camera device according to a modified embodiment; and FIG. 23 is a perspective view illustrating an arrangement of a coil and a magnet of a camera device of a first embodiment of the present invention.

The camera device 10 can photograph one or more of images and videos. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device 10 may comprise an autofocus assembly. The camera device 10 may comprise an image stabilization assembly. The camera device 10 may comprise an autofocus device. The camera device 10 may comprise an image stabilization device. The camera device 10 may comprise an actuator. The camera device 10 may comprise a lens driving actuator. The camera device 10 may comprise a sensor-driven actuator. The camera device 10 may comprise an autofocus actuator. The camera device 10 may comprise an image stabilization actuator.

The camera device 10 may comprise a fixed part 100. The fixed part 100 may be a relatively fixed portion when the moving parts 200 and 300 move. The fixed part 100 may be a relatively fixed portion when at least one of the first moving part 200 and the second moving part 300 moves. The fixed part 100 can accommodate the first moving part 200 and the second moving part 300. The fixed part 100 may be disposed outside the first moving part 200 and the second moving part 300.

Throughout the specification, the first substrate 110 is described as a component of the fixed part 100, but the first substrate 110 may be understood as a separate component from the fixed part 100. The fixed part 100 may be disposed in the first substrate 110. The fixed part 100 may be disposed on the first substrate 110. The fixed part 100 may be disposed above the first substrate 110.

The camera device 10 may comprise a first substrate 110. The fixed part 100 may comprise a first substrate 110. The first substrate 110 may be a main substrate. The first substrate 110 may be a substrate. The first substrate 110 may be a printed circuit board (PCB). The first substrate 110 may be connected to a power source of the optical apparatus 1. The first substrate 110 may comprise a connector connected to a power source of the optical apparatus 1. The first substrate 110 may be spaced apart from the second substrate 310.

The first substrate 110 may comprise an insulation layer. The first substrate 110 may comprise a conductive layer. The conductive layer of the first substrate 110 may comprise an open region 111 that is opened by omitting the insulation layer from a lower surface of the first substrate 110. The area of the open region 111 of the conductive layer may be more than 70% of the total area of the lower surface of the first substrate 110. The area of the open region 111 of the conductive layer may be 70 to 90% of the total area of the lower surface of the first substrate 110. The area of the open region 111 of the conductive layer may be 75 to 85% of the total area of the lower surface of the first substrate 110.

The open region 111 of the conductive layer may be connected to the second stiffener 115 through a via hole 112 formed in the first substrate 110. The via hole 112 may be formed from an upper surface to a lower surface of the first substrate 110. The via hole 112 may connect the second stiffener 115 being disposed on an upper surface of the first substrate 110 and the open region 111 of the first substrate 110. Through this, the heat transferred to the second stiffener 115 can be discharged to the open region 111 of the first substrate 110. The via hole 112 may comprise a plurality of via holes. The via hole 112 may comprise a plurality of via holes spaced apart from one another.

The camera device 10 may comprise a second stiffener 115. The fixed part 100 may comprise a second stiffener 115. The second stiffener 115 may be disposed in the first substrate 110. The second stiffener 115 may be disposed on an upper surface of the first substrate 110. The second stiffener 115 may be disposed to be in contact with the first substrate 110. The second stiffener 115 may be coupled to the first substrate 110. The second stiffener 115 may be fixed to the first substrate 110.

In a first embodiment of the present invention, a gap (see a in FIG. 1) may be formed between the first stiffener 370 and the second stiffener 115. The first stiffener 370 and the second stiffener 115 may be spaced apart at a minimum distance that does not interfere with the second stiffener 115 when the first stiffener 370 moves. In an optical axis direction, the gap between the first stiffener 370 and the second stiffener 115 may be smaller than the thickness of the first substrate 110. In an optical axis direction, the gap between the first stiffener 370 and the second stiffener 115 may be larger than the thickness of the second stiffener 115. The lower surface of the first stiffener 370 and the upper surface of the second stiffener 115 can face each other directly. Other members may not be disposed between the first stiffener 370 and the second stiffener 115. Heat generated from the image sensor 330 and transferred to the first stiffener 370 may be transferred to the second stiffener 115.

In a first embodiment of the present invention, a second stiffener 115 made of metal may be disposed on an upper surface of the first substrate 110 to reduce the air gap between the third substrate 320 and the first substrate 110. The first substrate 110 may be a connector PCB. The third substrate 320 may be a sensor substrate. To prevent an increase in the overall thickness of the camera device 10, the second stiffener 115 may be disposed only at an inner region of the base 120. In a modified embodiment, the second stiffener 115 may be disposed on a lower surface of the first substrate 110. However, in this case, there is a problem that the thickness of the base 120 may become thin, making it structurally vulnerable, such as non-forming, bending, and reduced impact strength. At this time, if the thickness of the base 120 is stably secured, the thickness of the camera device 10 can be increased.

In a first embodiment of the present invention, the contact area between the second stiffener 115 and the metal region, for example, the Cu region, of the first substrate 110 can be increased to increase heat conduction. The second stiffener 115 may be brought into contact with a region where the rigid upper insulation layer SR of the first substrate 110 is opened. In addition, the inner layer pattern of the first substrate 110 may be connected to the second stiffener 115. The open region of the rigid lower insulation layer SR of the first substrate 110 can be maximized. Through this, heat being discharged through a lower surface of the first substrate 110 can be maximized. The OIS driver IC 495, which generates a lot of heat, can be disposed outside the actuator or VCM. The first substrate 110 can be disposed at a lowermost end of the camera device 10, which can facilitate avoidance design when designing a set connection.

The camera device 10 may comprise a base 120. The fixed part 100 may comprise a base 120. The base 120 may be disposed in the first substrate 110. The base 120 may be disposed on the first substrate 110. The base 120 may be disposed above the first substrate 110. The base 120 may be fixed to the first substrate 110. The base 120 may be coupled to the first substrate 110. The base 120 may be attached to the first substrate 110 using an adhesive. The base 120 may be disposed between the first substrate 110 and the housing 130. The base 120 may be disposed to be in contact with an upper surface of the first substrate 110. The base 120 may be disposed to be spaced apart above the first substrate 110.

The connection substrate 600 may be disposed in the base 120. The connection substrate 600 may be connected to the base 120. The connection substrate 600 may be fixed to the base 120. The connection substrate 600 may be coupled to the base 120. The connection substrate 600 may be attached to the base 120. The connection substrate 600 may be fixed to the base 120 with an adhesive. The connection substrate 600 may be in contact with the base 120.

The base 120 may comprise a protruding portion 121. The base 120 may comprise a protruding portion 121 being protruded upward. The protruding portion 121 may be protruded from an upper surface of the base 120. The protruding portion 121 may be protruded upward from an outer surface of the base 120. The connection substrate 600 may be disposed in the protruding portion 121 of the base 120. The connection substrate 600 may be connected to the protruding portion 121 of the base 120. The connection substrate 600 may be fixed to the protruding portion 121 of the base 120. The connection substrate 600 may be coupled to the protruding portion 121 of the base 120. The connection substrate 600 may be attached to the protruding portion 121 of the base 120. The connection substrate 600 may be fixed to the protruding portion 121 of the base 120 with an adhesive. The connection substrate 600 may be in contact with the protruding portion 121 of the base 120. A protruding structure of the base 120 may be formed in the base 120 for assembly of the connection substrate 600.

The terminal portion 630 of the connection substrate 600 may be disposed in the protruding portion 121 of the base 120. The terminal portion 630 of the connection substrate 600 may be connected to the protruding portion 121 of the base 120. The terminal portion 630 of the connection substrate 600 may be fixed to the protruding portion 121 of the base 120. The terminal portion 630 of the connection substrate 600 may be coupled to the protruding portion 121 of the base 120. The terminal portion 630 of the connection substrate 600 may be attached to the protruding portion 121 of the base 120. The terminal portion 630 of the connection substrate 600 may be fixed to the protruding portion 121 of the base 120 with an adhesive. The terminal portion 630 of the connection substrate 600 may be in contact with the protruding portion 121 of the base 120.

The camera device 10 may comprise a housing 130. The fixed part 100 may comprise a housing 130. The housing 130 may be disposed in base 120. The housing 130 may be disposed on base 120. The housing 130 may be disposed above the base 120. The housing 130 may be fixed to base 120. The housing 130 may be fixed to the first cover member 140. The housing 130 may be coupled to base 120. The housing 130 may be attached to the base 120 with an adhesive. The housing 130 may be disposed on the first substrate 110. The housing 130 may be disposed above the first substrate 110. The housing 130 may be formed as a separate member from the base 120. The housing 130 may be disposed on the holder 340. The housing 130 may be disposed between the base 120 and the first cover member 140. The housing 130 may remain fixed without moving during AF driving. The housing 130 may remain fixed without moving during OIS driving.

The housing 130 may comprise a first side surface and a second side surface being disposed to be opposite to each other and a third side surface and a fourth side surface being disposed to be opposite to each other. A wing portion may be formed on each of a first side surface and a second side surface of the housing 130. A protruding portion 132 may be formed on each of a third side surface and a fourth side surface of the housing 130.

The housing 130 may comprise a wing portion. The wing portion may be disposed between the connection substrate 600 and the side plate of the first cover member 140. At least a portion of the terminal portion 630 of the connection substrate 600 may be disposed between the protruding portion 121 of the base 120 and the wing portion of the housing 130. The wing portion may be a wing structure. The wing portion can block foreign substances from entering between the connection substrate 600 and the side plate of the first cover member 140. The wing portion can alleviate external shock applied to the side plate of the first cover member 140. The housing 130 may be formed of an insulating member. The wing portion may be a spacer portion. The wing portion may be a sealing portion. The wing portion may be a compensation portion. The wing portion may be an extension portion. The wing portion may comprise a horizontal extension portion and a vertical extension portion being extended downward from the horizontal extension portion. The wing portion may comprise a first portion being extended in a first direction, and a second portion being extended from the first portion in a second direction different from the first direction. The wing portion may be spaced apart from the protruding portion 121 of the base 120. The wing portion may be spaced apart from the protruding portion 121 of the base 120 inside a tolerance range. Or, the wing portion may be in contact with the protruding portion 121 of the base 120. The wing portion may be coupled with the protruding portion 121 of the base 120. The horizontal width of an upper portion of the wing portion may correspond to the width of the shortest portion among the horizontal widths of the terminal portion 630 of the connection substrate 600. Or, the horizontal width of the upper portion of the wing portion may be longer than the horizontal width of the terminal portion 630 of the connection substrate 600. The horizontal width of the upper portion of the wing portion may be shorter than the width of the shortest portion among the horizontal widths of the terminal portion 630 of the connection substrate 600. The wing portion may be disposed for sealing only on a side where the terminal portion 630 is exposed.

In the sensor shift OIS actuator using the FPCB of the connection substrate 600, a required separation distance may be required for the FPCB to drive. At this time, the required separation distance may be the separation distance between the FPCB and the stop part. In other words, a separation distance vulnerable to foreign substances may be created. However, due to the difficulty in applying the separation distance sealing structure, vulnerability to foreign matter defects may occur.

In a first embodiment of the present invention, the wing portion, which is a wing structure descending from the housing 130, may be inserted between the first cover member 140 and the connection substrate 600, which serves as a side surface stopper. In a modified embodiment, a separate spacing member may be disposed instead of the wing portion descending from the housing 130.

The sealing structure can be completed by inserting the wing structure deployed from the housing 130, which is an essential fixing structure, into the space between the connection substrate 600 and the side plate of the first cover member 140. Through this, the product can be protected from external shock and foreign matter intrusion.

The housing 130 may comprise a hole. The hole may be a wire passing hole. A wire 800 may be disposed in the hole. The wire 800 may pass through the hole. The wire 800 may penetrate the hole. The hole may be formed to have a larger diameter than the wire 800 so as not to interfere with the wire 800.

The camera device 10 may comprise a first cover member 140. The fixed part 100 may comprise a first cover member 140. The first cover member 140 may be disposed in the base 140. The first cover member 140 may be disposed on the base 140. The first cover member 140 may be fixed to the base 120. The first cover member 140 may be coupled to the base 120. The first cover member 140 may be coupled to the housing 130. The first cover member 140 may be coupled to the first substrate 110. The first cover member 140 may be fixed to the base 120. The first cover member 140 may be fixed to the housing 130. The first cover member 140 may be fixed to the first substrate 110. The first cover member 140 may cover at least a portion of the base 120. The first cover member 140 may cover at least a portion of the housing 130. The first cover member 140 can accommodate the housing 130 therein.

The first cover member 140 may be a ‘cover can’ or a ‘shield can’. The first cover member 140 may be formed of a metal material. The first cover member 140 can block electromagnetic interference (EMI). The first cover member 140 may be electrically connected to the first substrate 110. The first cover member 140 may be grounded to the first substrate 110.

The first cover member 140 may comprise an upper plate. The first cover member 140 may comprise a hole formed in the upper plate. The hole may be formed at a location corresponding to the lens 220. The first cover member 140 may comprise a side plate. The side plate may comprise pluralities of side plates. The side plate may comprise four side plates. The side plate may comprise first to fourth side plates. The side plates may comprise first and second side plates being disposed to be opposite to each other, and third and fourth side plates being disposed to be opposite to each other. The first cover member 140 may comprise pluralities of corners between the pluralities of side plates.

The first cover member 140 may comprise a ground terminal. The ground terminal may be extended downward from the side plate. The ground terminal may be coupled to the first substrate 110. The ground terminal may be connected to the first substrate 110. The ground terminal may be electrically connected to the first substrate 110. The ground terminal may be coupled to the first substrate 110 and a conductive member. The ground terminal may be soldered to the terminal of the first substrate 110. The first cover member 140 may be electrically connected to the first substrate 110. The first cover member 140 may be grounded to the first substrate 110.

The ground terminal of the first cover member 140 may be disposed at a position corresponding to the groove of the base 120. Or, in a modified embodiment, the ground terminal **144*a* may be bent. The ground terminal 144*a* may be bent inward. At least a portion of the ground terminal 144*a* may be bent inward and disposed inside the groove of the base 120**.

Throughout the specification, the first cover member 140 is described as a component of the fixed part 100, but the first cover member 140 may be understood as a separate component from the fixed part 100. The first cover member 140 may be coupled with the fixed part 100. The first cover member 140 may cover the first moving part 200.

The camera device 10 may comprise a control unit. The control unit may be disposed in the first substrate 110. The control unit may be disposed next to the first cover member 140. The control unit may comprise an individual shield can that is smaller than the first cover member 140. The control unit may comprise a driver IC. The control unit may comprise an OIS driver IC 495 that applies current to the second coil 440. The control unit may control the operation of the camera device 10.

The camera device 10 may comprise a second cover member 150. The fixed part 100 may comprise a second cover member 150. The second cover member 150 may be disposed in the first substrate 110. The second cover member 150 may be disposed next to the first cover member 140. The second cover member 150 may cover the OIS driver IC 495. The OIS driver IC 495 may be disposed inside the second cover member 150. The second cover member 150 may be formed as a separate member from the first cover member 140. Or, the second cover member 150 may be formed integrally with the first cover member 140.

As illustrated in FIG. 21, the camera device 10 may comprise a conductive member. The conductive member may comprise conductive tape 160. The conductive member may be attached to the second cover member 150 and the bracket 170*a*. The conductive tape 160 may be attached to the second cover member 150 and the bracket 170*a*. The conductive member can connect the second cover member 150 and the bracket 170*a*. The conductive tape 160 can connect the second cover member 150 and the bracket 170*a*. Through this structure, the conductive tape 160 can transfer the heat generated by the OIS driver IC 495 and transferred to the second cover member 150 to the bracket 170*a* through the conductive tape 160. The conductive tape 160 may be formed of a thermally conductive material. The camera device 10 may comprise a bracket 170*a*. The bracket 170*a* may be disposed outside the first cover member 140. The first cover member 140 may be disposed inside the bracket 170*a*. The conductive tape 160 may be a member that transmits heat. The conductive tape 160 may be an electric heating member. The conductive tape 160 may have adhesive properties. In a modified embodiment, the bracket 170*a* may be omitted.

In a modified embodiment, as illustrated in FIG. 22, the camera device 10 may comprise a bracket 170*b* of a different shape from that of FIG. 21. At this time, the camera device 10 may comprise a conductive member. The conductive member may comprise conductive epoxy 180. The conductive member can connect the OIS driver IC 495 and the bracket 170*b*. The conductive epoxy 180 can connect the OIS driver IC 495 and the bracket 170*b*. Through this, heat generated from the OIS driver IC 495 can be transferred to the bracket 170*b* through the conductive epoxy 180. The conductive epoxy 180 may be formed of a thermally conductive material. The conductive epoxy 180 may be a member that transmits heat. The conductive epoxy 180 may be an electric heating member. The conductive epoxy 180 may have viscosity.

The first embodiment of the present invention may be provided with a heat improvement structure for the OIS driver IC 495 disposed in the external area of the first substrate 110. According to the set fastening design, the OIS driver IC 495 can be formed in various ways. In the case of the main camera, brackets 170*a* and 170*b* can be comprised as the dual or triple camera trend. For example, the second cover member 150 may be an IC can for the purpose of protecting and dissipating heat from the OIS driver IC 495. At this time, a conductive tape can connect the bracket 170*a* and the second cover member 150 to increase the heat dissipation effect. In a modified embodiment, in the case of a structure that protects the OIS driver IC 495 with only the bracket 170*b* without IC can, the heat dissipation effect can be increased by applying conductive epoxy 180 between the OIS driver IC 495 and the bracket 170*b*. The camera device 10 may comprise a first moving part 200. The first moving part 200 can move with respect to the fixed part 100. The first moving part 200 can move in an optical axis direction based on the fixed part 100. The first moving part 200 can be disposed inside the fixed part 100. The first moving part 200 may be movably disposed inside the fixed part 100. The first moving part 200 may be movably disposed inside the fixed part 100 in an optical axis direction. An autofocus (AF) function may be performed as the first moving part 200 moves in an optical axis direction with respect to the fixed part 100. The first moving part 200 may be disposed on the second moving part 300.

The camera device 10 may comprise a bobbin 210. The first moving part 200 may comprise a bobbin 210. The bobbin 210 may be disposed on the first substrate 110. The bobbin 210 may be disposed above the first substrate 110. The bobbin 210 may be disposed to be spaced apart above the first substrate 110. The bobbin 210 may be disposed inside the housing 130. The bobbin 210 may be disposed at an inner side of the housing 130. At least a portion of the bobbin 210 may be accommodated in the housing 130. The bobbin 210 may be movably disposed in the housing 130. The bobbin 210 may be movably disposed in the housing 130 in an optical axis direction. The bobbin 210 may be coupled with the lens 220. The bobbin 210 may comprise a hollow or a hole. The lens 220 may be disposed in the hollow or hole of the bobbin 210. The outer circumferential surface of the lens 220 may be coupled to the inner circumferential surface of the bobbin 210.

The camera device 10 may comprise a lens 220. The first moving part 200 may comprise a lens 220. The lens 220 may be coupled to bobbin 210. The lens 220 may be fixed to bobbin 210. The lens 220 can move integrally with the bobbin 210. The lens 220 may be screw-coupled to bobbin 210. The lens 220 may be attached to the bobbin 210 using an adhesive. The lens 220 may be disposed at a location corresponding to the image sensor 330. The optical axis of the lens 220 may coincide with the optical axis of the image sensor 330. The optical axis may be a z-axis. The lens 220 may comprise pluralities of lenses. The lens 220 may comprise a 5-element or a 6-element lens.

The camera device 10 may comprise a lens module. The lens module may be coupled to the bobbin 210. The lens module may comprise a barrel and one or more lenses 220 being disposed inside the barrel.

The camera device 10 may comprise a second moving part 300. The second moving part 300 can move with respect to the fixed part 100. The second moving part 300 can move in a direction perpendicular to the optical axis direction based on the fixed part 100. The second moving part 300 can be disposed inside the fixed part 100. The second moving part 300 can be movably disposed inside the fixed part 100. The second moving part 300 may be movably disposed inside the fixed part 100 in a direction perpendicular to the optical axis direction. Optical image stabilization (OIS) function may be performed by the second moving part 300 moving in a direction perpendicular to the optical axis direction with respect to the fixed part 100. The second moving part 300 may be disposed between the first moving part 200 and the first substrate 110.

The camera device 10 may comprise a second substrate 310. The second moving part 300 may comprise a second substrate 310. The second substrate 310 may be a substrate. The second substrate 310 may be a printed circuit board (PCB). The second substrate 310 may be disposed in the first substrate 110. The second substrate 310 may be disposed on the first substrate 110. The second substrate 310 may be spaced apart from the first substrate 110. The second substrate 310 may be disposed between the first moving part 200 and the first substrate 110. The second substrate 310 may be disposed between the bobbin 210 and the first substrate 110. The second substrate 310 may be disposed between the lens 220 and the first substrate 110. The second substrate 310 may be spaced apart from the fixed part 100. The second substrate 310 may be spaced apart from the fixed part 100 in an optical axis direction and in a direction perpendicular to the optical axis direction. The second substrate 310 may move in a direction perpendicular to the optical axis direction. The second substrate 310 may be electrically connected to the image sensor 330. The second substrate 310 can be moved integrally with the image sensor 330. The second substrate 310 may comprise a hole. The image sensor 330 may be disposed in the hole of the second substrate 310. The second substrate 310 may be coupled to an upper surface of the third substrate 320. The second substrate 310 may be disposed on an upper surface of the third substrate 320. The second substrate 310 may be fixed to an upper surface of the third substrate 320. The second substrate 310 may be spaced apart from the housing 130. The second substrate 310 may be disposed in the holder 340.

The second substrate 310 may comprise a terminal 311. The terminal 311 may be disposed on a lower surface of the second substrate 310. The terminal 311 may be coupled to a terminal of the third substrate 320. The second substrate 310 may be formed separately from the third substrate 320. The second substrate 310 may be formed separately from the third substrate 320 and then coupled with the third substrate 320. The terminal of the third substrate 320 may be soldered to the terminal 311 of the second substrate 310.

The camera device 10 may comprise a third substrate 320. The second moving part 300 may comprise a third substrate 320. The third substrate 320 may be a substrate. The third substrate 320 may be a printed circuit board (PCB). The third substrate 320 may be coupled with the image sensor 330. The third substrate 320 may be coupled to the second substrate 310. The third substrate 320 may be disposed in the second substrate 310. The third substrate 320 may be disposed on a lower surface of the second substrate 310.

The third substrate 320 may comprise a hole 322. The hole 322 may be hollow. The image sensor 330 may be disposed in the hole 322 of the third substrate 320. A portion of the first stiffener 370 may be disposed in the hole 322 of the third substrate 320. The protruding portion 374 of the first stiffener 370 may be disposed in the hole 322 of the third substrate 320. The hole 322 of the sensing substrate 320 may be formed in a size and shape corresponding to the protruding portion 374 of the first stiffener 370.

The third substrate 320 may comprise a terminal. The terminal of the third substrate 320 may be coupled to the terminal 311 of the second substrate 310. The third substrate 320 may be coupled to a lower surface of the second substrate 310. The third substrate 320 may be disposed below the second substrate 310. The third substrate 320 may be coupled below the second substrate 310 with the image sensor 330 being coupled thereto.

The camera device 10 may comprise an image sensor 330. The second moving part 300 may comprise an image sensor 330. The image sensor 330 may be disposed in the third substrate 320. The image sensor 330 may be disposed between the third substrate 320 and the sensor base 350. The image sensor 330 may be disposed inside the base 120. The image sensor 330 may be electrically connected to the second substrate 310. The image sensor 330 can move integrally with the second substrate 310. The image sensor 330 may be disposed below the lens 220. The image sensor 330 may be disposed in the first stiffener 330. The image sensor 330 may be disposed in the first stiffener 370 and electrically connected to the third substrate 320 through wire bonding. The image sensor 330 may be movably disposed. The image sensor 330 may move in a direction perpendicular to the optical axis direction. The image sensor 330 may rotate about an optical axis. The image sensor 330 may be disposed on an upper surface of the first stiffener 370. The image sensor 330 may be disposed in the hole 322 of the third substrate 320. The image sensor 330 may be wire-bonded to the third substrate 320.

Light passing through the lens 220 and the filter 360 may be incident on the image sensor 330 to form an image. The image sensor 330 may be electrically connected to the third substrate 320, the second substrate 310, and the first substrate 110. The image sensor 330 may comprise an effective image area. The image sensor 330 can convert light irradiated to the effective image area into an electrical signal. The image sensor 330 may comprise one or more among a charge coupled device (CCD), a metal oxide semiconductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or hole in which the image sensor 330 is disposed. The OIS coil 440 may be disposed in the holder 340. The holder 340 may comprise a protrusion around which the OIS coil 440 is wound. The holder 340 may comprise a hole where the sensor 445 is disposed. The holder 340 may be spaced apart from the housing 130. The holder 340 may move in a direction perpendicular to the optical axis direction or rotate about an optical axis by the interaction of the driving magnet and the OIS coil 440 together with the image sensor 330. The holder 340 is a member on which the OIS coil 440 is disposed and may be a coil holder.

The connection substrate 600 may be disposed in the holder 340. The connection substrate 600 may be connected to the holder 340. The connection substrate 600 may be fixed to the holder 340. The connection substrate 600 may be coupled to the holder 340. The connection substrate 600 may be attached to the holder 340. The connection substrate 600 may be fixed to the holder 340 with an adhesive. The connection substrate 600 may be in contact with the holder 340.

The holder 340 may comprise a protruding portion 341. The protruding portion 341 may be protruded from an upper surface of the holder 340. The protruding portion 341 may be protruded upward from an outer side surface of the holder 340. The connection substrate 600 may be disposed in the protruding portion 341 of the holder 340. The connection substrate 600 may be connected to the protruding portion 341 of the holder 340. The connection substrate 600 may be fixed to the protruding portion 341 of the holder 340. The connection substrate 600 may be coupled to the protruding portion 341 of the holder 340. The connection substrate 600 may be attached to the protruding portion 341 of the holder 340. The connection substrate 600 may be fixed to the protruding portion 341 of the holder 340 with an adhesive. The connection substrate 600 may be in contact with the protruding portion 341 of the holder 340.

The camera device 10 may comprise a sensor base 350. The second moving part 300 may comprise a sensor base 350. The sensor base 350 may be disposed in the third substrate 320. The sensor base 350 may comprise a hole being formed at a position corresponding to the image sensor 330. The sensor base 350 may comprise a groove in which the filter 360 is disposed.

The camera device 10 may comprise a filter 360. The second moving part 300 may comprise a filter 360. The filter 360 may be disposed between the lens 220 and the image sensor 330. The filter 360 may be disposed in the sensor base 350. The filter 360 may block light in a specific frequency band from light passing through the lens 220 from entering the image sensor 330. The filter 360 may comprise an infrared blocking filter. The filter 360 may block infrared rays from being incident on the image sensor 330.

The camera device 10 may comprise a first stiffener 370. The second moving part 300 may comprise a first stiffener 370. The first stiffener 370 may be SUS. The first stiffener 370 may be formed of SUS. The first stiffener 370 may be formed of a copper alloy. The first stiffener 370 may comprise copper. The first stiffener 370 may be a reinforcement plate. The first stiffener 370 may be a plate member. The first stiffener 370 may be disposed in the second substrate 310. The first stiffener 370 may be disposed in the second substrate 310 through the third substrate 320. The first stiffener 370 may be coupled to a lower surface of the third substrate 320. The first stiffener 370 may be disposed on a lower surface of the third substrate 320. The first stiffener 370 may be in contact with a lower surface of the third substrate 320. The first stiffener 370 may be fixed to a lower surface of the third substrate 320. The first stiffener 370 may be attached to a lower surface of the third substrate 320 with an adhesive.

In a first embodiment of the present invention, the image sensor 330 may be disposed directly in the first stiffener 370. Meanwhile, the flatness of the first stiffener 370 may be easier to manage than that of the third substrate 320. Through this, the flatness of the mounting surface of the image sensor 330 can be easily managed. The image sensor 330 may be electrically connected to the third substrate 320 through wire bonding. The image sensor 330 may be electrically connected to the third substrate 320.

The first stiffener 370 may comprise the shape of a heat sink. The first stiffener 370 may comprise a heat sink structure. The first stiffener 370 may comprise a shape that increases the surface area of the first stiffener 370. The first stiffener 370 may comprise a heat dissipation structure. In a first embodiment of the present invention, an improvement in heat dissipation performance of about-20 degrees was confirmed through the heat sink structure compared to the comparative example without a heat sink. In a modified embodiment, a heat sink shape may be formed in the second stiffener 115. Or, the heat sink shape may be formed in both the first stiffener 370 and the second stiffener 115. A heat sink shape may be formed on an upper surface of the second stiffener 115. Or, the heat sink shape may be formed on a lower surface of the second stiffener 115. Or, the heat sink shape may be formed on both an upper surface and a lower surface of the second stiffener 115.

The first stiffener 370 may comprise a first surface on which the image sensor 330 is disposed. The first stiffener 370 may comprise a second surface opposite to the first surface. At this time, the first surface may be an upper surface and the second surface may be a lower surface. The first stiffener 370 may comprise a groove 375. The first stiffener 370 may comprise pluralities of grooves 375. Or, the first stiffener 370 may comprise pluralities of protruding portions. A plurality of grooves 375 may be formed between the pluralities of protruding portions by the pluralities of protruding portions. The groove 375 may be formed on a second surface of the first stiffener 370. The groove 375 may be formed to be recessed in a second surface of the first stiffener 370. The pluralities of grooves 375 may be spaced apart from one another. The surface area of a second surface of the first stiffener 370 may be increased by the pluralities of grooves 375. Through this, heat dissipation performance on a second surface of the first stiffener 370 can be improved. Or, pluralities of grooves 375 may be formed on a first surface of the first stiffener 370. A heat sink structure may be formed on a lower surface of the first stiffener 370. Or, a heat sink structure may be formed on an upper surface of the first stiffener 370.

For an example, the first surface of the first stiffener 370 may be formed flat and the second surface may comprise a heat sink structure. That is, the first and second surfaces of the first stiffener 370 may be formed in shapes that do not correspond to each other. However, in a modified embodiment, the first surface of the first stiffener 370 may comprise pluralities of protruding portions and the second surface may comprise pluralities of grooves at corresponding positions. That is, one surface of the first stiffener 370 may be protruded and a groove may be formed at a corresponding position on the opposite side.

As illustrated in FIG. 14, each of the pluralities of grooves 375 of the first stiffener 370 may be formed in a first direction perpendicular to the optical axis to be longer than the length of the image sensor 330 in the corresponding direction. The pluralities of grooves 375 of the first stiffener 370 may be spaced apart from one another in a second direction perpendicular to both the optical axis and the first direction. The first stiffener 370 may comprise a first groove and a second groove being disposed furthest away in a second direction perpendicular to both the optical axis and the first direction. At this time, the distance between the first groove and the second groove may be shorter than the length of the image sensor 330 in the corresponding direction. In a modified embodiment, the distance between the first groove and the second groove may be equal to the length of the image sensor 330 in the corresponding direction. Or, the distance between the first groove and the second groove may be longer than the length of the image sensor 330 in the corresponding direction.

One or more of the pluralities of grooves 375 of the first stiffener 370 may be formed in a first direction perpendicular to the optical axis to be longer than the length of the image sensor 330 in the corresponding direction. That is, only one of the pluralities of grooves 375 of the first stiffener 370 may be formed to be longer than the image sensor 330. Furthermore, all of the pluralities of grooves 375 of the first stiffener 370 may be formed to be longer than the image sensor 330.

The heat sink structure of the first stiffener 370 is an example, and the heat sink structure may be omitted in the first stiffener 370 according to a modified embodiment.

The first stiffener 370 may comprise a protruding portion 374. The protruding portion 374 may be formed on an upper surface of the first stiffener 370. The protruding portion 374 may be protruded from an upper surface of the first stiffener 370. The protruding portion 374 may be disposed in the hole 322 of the third substrate 320. At least a portion of the protruding portion 374 may be inserted into the hole 322 of the third substrate 320. At least a portion of the protruding portion 374 may be overlapped with the third substrate 320 in a direction perpendicular to the optical axis. The image sensor 330 may be disposed on an upper surface of the protruding portion 374 of the first stiffener 370. An upper surface of the image sensor 330 may be disposed to a height corresponding to an upper surface of the third substrate 320. In a modified embodiment, an upper surface of the image sensor 330 may be disposed higher than an upper surface of the third substrate 320. An upper surface of the image sensor 330 may be disposed lower than an upper surface of the third substrate 320.

In a first embodiment of the present invention, an etched cavity PCB structure in which a first stiffener 370 made of a metal material with high thermal conductivity is coupled can be applied to the third substrate 320. The first stiffener 370 may be formed of C7035. The first stiffener 370 may be made of a metal material. The first stiffener 370 may be made of a metal material considering processability, strength, thermal deformation, and heat conduction. Since the heat transfer rate is proportional to the medium area, the portion where the image sensor 330 of the first stiffener 370 is disposed can be formed in the form of an etched cavity to expand the area. When increasing the overall thickness of the first stiffener 370, the weight of the PCB increases further, and because the air gap between the second stiffener 115 is additionally required for the increase in thickness, it can be partially increased by applying the etching cavity method. Furthermore, in order to further increase the cross-sectional area, a heat sink structure may be applied to a lower surface of the first stiffener 370. The width of the heat sink may be at least 0.5 mm, and the gap may be at least 0.5 mm. That is, the width of each groove of the heat sink and the spacing between the pluralities of grooves may be the same. The second stiffener 115 may also be formed of the same material as the first stiffener 370. The second stiffener 115 may be made of a metal material. The second stiffener 115 may be made of a metal material with high thermal conductivity.

The camera device 10 may comprise an adhesive 379. The adhesive 379 may be disposed between the third substrate 320 and the first stiffener 370. The adhesive 379 may secure the first stiffener 370 to a lower surface of the third substrate 320.

The camera device 10 may comprise a coupling member 380. The second moving part 300 may comprise a coupling member 380. The coupling member 380 may be disposed in the holder 340. The coupling member 380 may be coupled to the wire 800. The coupling member 380 may be connected to the wire 800 through soldering. The coupling member 380 may be formed of metal. The coupling member 380 may comprise a hole through which the wire 800 passes. The coupling member 380 may comprise a buffer portion to relieve impact. The coupling member 380 may comprise a shape that is bent multiple times. The coupling member 380 may comprise pluralities of terminals. The coupling member 380 may comprise four terminals being disposed in four corner regions of the holder 340. The coupling member 380 may be a metal plate. The coupling member 380 may be formed of metal. The coupling member 380 may be a plate. The coupling member 380 may be a terminal member. The coupling member 380 may be a terminal.

In a modified embodiment, the coupling member 380 may be omitted. For an example, a lower end portion of the wire 800 may be coupled to the base 120. The base 120 may comprise a surface electrode for coupling to the wire 800. The lower end portion of the wire 800 may be soldered to the surface electrode of the base 120.

The camera device 10 may comprise a drive unit. The drive unit can move the moving parts 200 and 300 with respect to the fixed part 100. The drive unit can perform an autofocus (AF) function. The drive unit can perform image stabilization (OIS) function. The drive unit can move the lens 220. The drive unit may move the image sensor 330. The drive unit may comprise a magnet and a coil. The drive unit may comprise shape memory alloy (SMA).

The drive unit may comprise a driving magnet. The driving magnet may be disposed in the housing. The driving magnet may comprise pluralities of magnets. The driving magnet may comprise first to fourth magnets. The driving magnet may comprise first and second magnets being disposed to be opposite to each other. The driving magnet may comprise third and fourth magnets being disposed to be opposite to each other.

The distance between the first magnet and the third magnet may be different from the distance between the first magnet and the fourth magnet. The distance between the first magnet and the third magnet may be greater than the distance between the first magnet and the fourth magnet. The distance between the second magnet and the fourth magnet may be different from the distance between the second magnet and the third magnet. The distance between the second magnet and the fourth magnet may be greater than the distance between the second magnet and the third magnet. In a modified embodiment, the distance between the first magnet and the third magnet may be shorter than the distance between the first magnet and the fourth magnet. The distance between the second magnet and the fourth magnet may be shorter than the distance between the second magnet and the third magnet.

The sensing magnet 450 may be disposed between the first magnet and the third magnet. The sensing magnet 450 may be overlapped with the first magnet and the third magnet in a direction perpendicular to the optical axis direction. The sensing magnet 450 may be overlapped with the first magnet in a direction perpendicular to the optical axis direction. The sensing magnet 450 may be overlapped with the third magnet in a direction perpendicular to the optical axis direction. The sensing magnet 450 may be overlapped with the first magnet and the third magnet in a first direction perpendicular to the optical axis direction. The sensing magnet 450 may be disposed on a virtual straight line connecting the first magnet and the third magnet.

The sensing magnet 450 may be overlapped with the third magnet in a direction perpendicular to an inner surface of the first magnet. The sensing magnet 450 may be overlapped with the first magnet in a direction perpendicular to an inner surface of the first magnet.

The correction magnet 460 may be disposed between the second magnet and the fourth magnet. The correction magnet 460 may be overlapped with the second magnet and the fourth magnet in a direction perpendicular to the optical axis direction. The correction magnet 460 may be overlapped with the second magnet in a direction perpendicular to the optical axis direction. The correction magnet 460 may be overlapped with the fourth magnet in a direction perpendicular to the optical axis direction. The correction magnet 460 may be overlapped with the second magnet and the fourth magnet in a first direction perpendicular to the optical axis direction. The correction magnet 460 may be disposed on a virtual straight line connecting the second magnet and the fourth magnet.

The correction magnet 460 may be overlapped with the fourth magnet in a direction perpendicular to the inner surface of the second magnet. The correction magnet 460 may be overlapped with the second magnet in a direction perpendicular to the inner surface of the second magnet.

Each of the first to fourth magnets may comprise an AF magnet 410 being disposed at a position corresponding to the AF coil 430. Each of the first to fourth magnets may comprise an OIS magnet 420 being disposed at a position corresponding to the OIS coil 440.

Each of the first to fourth magnets may comprise a first width, which is the length between the inner surface and the outer surface, and a second width, which is the length between both side surfaces. The first width of the first magnet and the first width of the third magnet may be the same. The first width of the second magnet and the first width of the fourth magnet may be the same. The first width of the first magnet and the first width of the second magnet may be the same. The first to fourth magnets may all have the same first width, which is the length between the inner surface and the outer surface.

The second width of the first magnet may be different from the second width of the third magnet. The second width of the first magnet may be longer than the second width of the third magnet. The second width of the second magnet may be longer than the second width of the fourth magnet. In a modified embodiment, the second width of the first magnet may be shorter than the second width of the third magnet. The second width of the second magnet may be shorter than the second width of the fourth magnet.

The camera device 10 may comprise an AF drive unit. The AF drive unit may be an autofocus drive unit. The AF drive unit may be a drive unit for autofocus operation. The AF drive unit may move the first moving part 200 in an optical axis direction. The AF drive unit may move the bobbin 210 in an optical axis direction. The lens 220 can be moved in an optical axis direction. The lens 220 may be moved in an optical axis direction with respect to the image sensor 330. The AF drive unit can perform an autofocus (AF) function. The AF drive unit may move the first moving part 200 in an upward direction of the optical axis direction. The AF drive unit may move the first moving part 200 in a downward direction of the optical axis direction.

The camera device 10 may comprise an OIS drive unit. The OIS drive unit may be an optical image stabilization drive unit. The OIS drive unit may be a drive unit for driving image stabilization. The OIS drive unit can move the second moving part 300 in a direction perpendicular to the optical axis direction. The OIS drive unit may move the second substrate 310 in a direction perpendicular to the optical axis direction. The OIS drive unit may move the third substrate 320 in a direction perpendicular to the optical axis direction. The OIS drive unit may move the image sensor 330 in a direction perpendicular to the optical axis direction. The OIS drive unit may move the image sensor 330 in a direction perpendicular to the optical axis direction with respect to the first substrate 110. The OIS drive unit can move the holder 340 in a direction perpendicular to the optical axis direction. The OIS drive unit can move the sensor base 350 in a direction perpendicular to the optical axis direction. The OIS drive unit may move the filter 360 in a direction perpendicular to the optical axis direction. The OIS drive unit can perform optical image stabilization (OIS) function.

The OIS drive unit may move the second moving part 300 in a first direction perpendicular to the optical axis direction. The OIS drive unit may move the second moving part 300 in a second direction perpendicular to the optical axis direction and the first direction. The OIS drive unit can rotate the second moving part 300 about an optical axis.

In a first embodiment of the present invention, the AF drive unit may comprise an AF coil 430. The OIS drive unit may comprise an OIS coil 440. The AF drive unit may comprise an AF magnet 410. The OIS drive unit may comprise an OIS magnet 420. In a modified embodiment, the AF drive unit and the OIS drive unit may comprise a driving magnet commonly used for interaction with the AF coil 430 and the OIS coil 440. That is, the AF drive unit and the OIS drive unit may comprise individually controlled coils and common magnets.

The camera device 10 may comprise an AF magnet 410. The drive unit may comprise an AF magnet 410. The AF magnet 410 may be a magnet. The AF magnet 410 may be a permanent magnet. The AF magnet 410 may be a common magnet. The AF magnet 410 can be used for autofocus (AF).

The AF magnet 410 can be disposed in the fixed part 100. The AF magnet 410 can be fixed to the fixed part 100. The AF magnet 410 can be coupled to the fixed part 100. The AF magnet 410 can be attached to the fixed part 100 with an adhesive. The AF magnet 410 may be disposed in the housing 130. The AF magnet 410 may be fixed to the housing 130. The AF magnet 410 may be coupled to the housing 130. The AF magnet 410 may be attached to the housing 130 with an adhesive. The AF magnet 410 may be disposed at a corner of the housing 130. The AF magnet 410 may be biased toward a corner of the housing 130.

The AF magnet 410 may be a two-pole magnetized magnet comprising one N-pole region and one S-pole region. In a modified embodiment, the AF magnet 410 may be a four-pole magnetized magnet comprising two N-pole regions and two S-pole regions.

The AF magnet 410 may comprise pluralities of magnets. The AF magnet 410 may comprise four magnets. The AF magnet 410 may comprise first to fourth magnets. The first to fourth magnets may be disposed symmetrically to an optical axis. The first to fourth magnets may be formed to have the same size and shape.

The camera device 10 may comprise an OIS magnet 420. The drive unit may comprise an OIS magnet 420. The OIS magnet 420 may be a magnet. The OIS magnet 420 may be a permanent magnet. The OIS magnet 420 may be a common magnet. The OIS magnet 420 can be used for optical image stabilization (OIS).

The OIS magnet 420 can be disposed on the fixed part 100. The OIS magnet 420 can be fixed to the fixed part 100. The OIS magnet 420 can be combined with the fixed part 100. The OIS magnet 420 can be attached to the fixed part 100 with an adhesive. The OIS magnet 420 may be disposed in the housing 130. The OIS magnet 420 may be fixed to the housing 130. The OIS magnet 420 may be coupled to the housing 130. The OIS magnet 420 may be attached to the housing 130 with an adhesive. The OIS magnet 420 may be disposed at a corner of the housing 130. The OIS magnet 420 may be disposed to be biased toward a corner of the housing 130.

The OIS magnet 420 may be a two-pole magnetized magnet comprising one N-pole region and one S-pole region. In a modified embodiment, the OIS magnet 420 may be a four-pole magnetized magnet comprising two N-pole regions and two S-pole regions.

The OIS magnet 420 may comprise a plurality of magnets. The OIS magnet 420 may comprise four magnets. The OIS magnet 420 may comprise first to fourth magnets. The first to fourth magnets may be disposed symmetrically to an optical axis. The first to fourth magnets may be formed to have the same size and shape.

The OIS magnet 420 may be disposed below the AF magnet 410. The OIS magnet 420 can be disposed on a lower surface of the AF magnet 410. The OIS magnet 420 may be in contact with a lower surface of the AF magnet 410. The OIS magnet 420 can be fixed to a lower surface of the AF magnet 410. The OIS magnet 420 can be coupled to a lower surface of the AF magnet 410 by an adhesive. In an optical axis direction, the length of the OIS magnet 420 may be shorter than the length of the AF magnet 410. The size of the OIS magnet 420 may be smaller than the length of the AF magnet 410.

The camera device 10 may comprise an AF coil 430. The drive unit may comprise an AF coil 430. The AF coil 430 may be disposed in the first moving part 200. The AF coil 430 may be fixed to the first moving part 200. The AF coil 430 may be coupled to the first moving part 200. The AF coil 430 may be attached to the first moving part 200 with an adhesive. The AF coil 430 may be disposed on bobbin 210. The AF coil 430 may be fixed to the bobbin 210. The AF coil 430 may be coupled to the bobbin 210. The AF coil 430 may be attached to the bobbin 210 with an adhesive. The AF coil 430 may be electrically connected to the AF driver IC. The AF coil 430 may be electrically connected to a lower elastic member 720, a sensing substrate 470, and an AF driver IC. The AF coil 430 can receive current from the AF driver IC.

The AF coil 430 may be disposed at a location corresponding to the AF magnet 410. The AF coil 430 may be disposed in the bobbin 210 at a position corresponding to the AF magnet 410. The AF coil 430 may face the AF magnet 410. The AF coil 430 may comprise a surface facing the AF magnet 410. The AF coil 430 may be disposed adjacent to the AF magnet 410. The AF coil 430 may interact with the AF magnet 410. The AF coil 430 may electromagnetically interact with the AF magnet 410.

The AF coil 430 can move the first moving part 200 in an optical axis direction. The AF coil 430 can move the bobbin 210 in an optical axis direction. The AF coil 430 can move the lens 220 in an optical axis direction. The AF coil 430 can move the first moving part 200 upward in an optical axis direction. The AF coil 430 can move the bobbin 210 upward in an optical axis direction. The AF coil 430 can move the lens 220 upward in an optical axis direction. The AF coil 430 can move the first moving part 200 in a downward direction of the optical axis direction. The AF coil 430 can move the bobbin 210 in a downward direction of the optical axis direction. The AF coil 430 can move the lens 220 in a downward direction of the optical axis direction. The AF magnet 410 and AF coil 430 can move the lens 220 in an optical axis direction.

The camera device 10 may comprise an OIS coil 440. The drive unit may comprise an OIS coil 440. The OIS coil 440 may be disposed in the second moving part 300. The OIS coil 440 may be fixed to the second moving part 300. The OIS coil 440 may be coupled to the second moving part 300. The OIS coil 440 may be attached to the second moving part 300 with an adhesive. The OIS coil 440 may be disposed in the holder 340. The OIS coil 440 may be fixed to the holder 340. The OIS coil 440 may be coupled to the holder 340. The OIS coil 440 may be attached to the holder 340 with an adhesive. The OIS coil 440 can be disposed by being wound around the protrusion of the holder 340. The OIS coil 440 may be disposed on the holder 340. The OIS coil 440 may be disposed on an upper surface of the holder 340. The OIS coil 440 may be disposed in the second substrate 310. The OIS coil 440 may be electrically connected to the second substrate 310. Both ends of the OIS coil 440 may be soldered to the second substrate 310. The OIS coil 440 may be electrically connected to the OIS driver IC 495. The OIS coil 440 may be electrically connected to the second substrate 310 and the OIS driver IC 495. The OIS coil 440 can receive current from the OIS driver IC 495.

The OIS coil 440 may be disposed at a location corresponding to the OIS magnet 420. The OIS coil 440 may be disposed at a location corresponding to the driving magnet. The OIS coil 440 may be disposed in the holder 340 at a position corresponding to the OIS magnet 420. The OIS coil 440 may face the OIS magnet 420. The OIS coil 440 may comprise a surface facing the OIS magnet 420. The OIS coil 440 may be disposed adjacent to the OIS magnet 420. The OIS coil 440 may interact with the OIS magnet 420. The OIS coil 440 may electromagnetically interact with the OIS magnet 420.

The OIS coil 440 can move the second moving part 300 in a direction perpendicular to the optical axis direction. The OIS coil 440 can move the second substrate 310 in a direction perpendicular to the optical axis direction. The OIS coil 440 can move the third substrate 320 in a direction perpendicular to the optical axis direction. The OIS coil 440 can move the image sensor 330 in a direction perpendicular to the optical axis direction. The OIS coil 440 can move the holder 340 in a direction perpendicular to the optical axis direction. The OIS coil 440 can rotate the second moving part 300 about an optical axis. The OIS coil 440 can rotate the second substrate 310 about an optical axis. The OIS coil 440 can rotate the third substrate 320 about an optical axis. The OIS coil 440 may rotate the image sensor 330 about an optical axis. The OIS coil 440 can rotate the holder 340 about an optical axis. The OIS magnet 420 and the OIS coil 440 can move the image sensor 330 in a direction perpendicular to the optical axis direction with respect to the base 120.

The OIS coil 440 may comprise a plurality of coils. The OIS coil 440 may comprise four coils. The OIS coil 440 may comprise a coil for x-axis shift. The OIS coil 440 may comprise a coil for y-axis shift.

The OIS coil 440 may comprise a first coil 441. The first coil 441 may be a first sub-coil. The first coil 441 may be a coil for x-axis shift. The first coil 441 can move the second moving part 300 in an x-axis direction. The first coil 441 may be disposed long along a y-axis. The first coil 441 may comprise a plurality of coils. The first coil 441 may comprise two coils. The two coils of the first coil 441 may be electrically connected to each other. The first coil 441 may comprise a connection coil connecting two coils. In this case, the two coils of the first coil 441 can receive current together. Or, the two coils of the first coil 441 may be electrically separated from each other and receive current individually.

The OIS coil 440 may comprise a second coil 442. The second coil 442 may be a second sub-coil. The second coil 442 may be a coil for y-axis shift. The second coil 442 can move the second moving part 300 in a y-axis direction. The second coil 442 may be disposed long along an x-axis. The first coil 441 may comprise a plurality of coils. The second coil 442 may comprise two coils. The two coils of the second coil 442 may be electrically connected to each other. The second coil 442 may comprise a connection coil connecting two coils. In this case, the two coils of the second coil 442 can receive current together. Or, the two coils of the second coil 442 may be electrically separated from each other and receive current individually.

The camera device 10 may comprise a sensor 445. The sensor 445 may be disposed in the second substrate 310. The sensor 445 may be disposed in the hole of the holder 340. The sensor 445 may comprise a Hall sensor. The sensor 445 may comprise a Hall element (Hall IC). The sensor 445 can detect the OIS magnet 420. The sensor 445 can detect the magnetic force of the OIS magnet 420. The sensor 445 may face the OIS magnet 420. The sensor 445 may be disposed at a location corresponding to the OIS magnet 420. The sensor 445 may be disposed adjacent to the OIS magnet 420.

The sensor 445 can detect the position of the second moving part 300. The sensor 445 can detect the movement of the second moving part 300. The sensor 445 may be disposed in a hollow of the OIS coil 440. The sensing value detected by the sensor 445 can be used to feedback the image stabilization operation. The sensor 445 may be electrically connected to the OIS driver IC 495.

The sensor 445 may comprise a plurality of sensors. The sensor 445 may comprise three sensors. The sensor 445 may comprise first to third sensors. The first sensor can detect the displacement of the second moving part 300 in an x-axis direction. The second sensor can detect the displacement of the second moving part 300 in a y-axis direction. The third sensor may detect rotation of the second moving part 300 about a z-axis alone or together with one or more of the first Hall sensor and the second Hall sensor. Each of the first to third sensors may comprise a Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be attached to the first moving part 200 with an adhesive. The sensing magnet 450 may be disposed in the bobbin 210. The sensing magnet 450 may be fixed to the bobbin 210. The sensing magnet 450 may be coupled to the bobbin 210. The sensing magnet 450 may be attached to the bobbin 210 with an adhesive. The sensing magnet 450 may be formed in a smaller size than the AF magnet 410. The sensing magnet 450 may be formed in a smaller size than the OIS magnet 420. Through this, the influence of the sensing magnet 450 on driving can be minimized.

The sensing magnet 450 may be disposed at an opposite side of the correction magnet 460. The sensing magnet 450 and the correction magnet 460 may be disposed to be opposite to each other in the first moving part 200. The sensing magnet 450 and the correction magnet 460 may be disposed to be opposite to each other in the bobbin 210.

The camera device 10 may comprise a correction magnet 460. The correction magnet 460 may be a compensation magnet. The correction magnet 460 may be disposed in the first moving part 200. The correction magnet 460 may be fixed to the first moving part 200. The correction magnet 460 may be coupled to the first moving part 200. The correction magnet 460 may be attached to the first moving part 200 with an adhesive. The correction magnet 460 may be disposed in the bobbin 210. The correction magnet 460 may be fixed to the bobbin 210. The correction magnet 460 may be coupled to the bobbin 210. The correction magnet 460 may be attached to the bobbin 210 with an adhesive. The correction magnet 460 may be formed in a smaller size than the AF magnet 410. The correction magnet 460 may be formed in a smaller size than the OIS magnet 420. Through this, the impact of the correction magnet 460 on driving can be minimized. In addition, the correction magnet 460 may be disposed at an opposite side of the sensing magnet 450 to form magnetic force balance with the sensing magnet 450. Through this, tilt that may be caused by the sensing magnet 450 can be prevented.

The camera device 10 may comprise a sensing substrate 470. The sensing substrate 470 may be a substrate. The sensing board 470 may be a printed circuit board (PCB). The sensing substrate 470 may be a flexible substrate. The sensing substrate 470 may be an FPCB. The sensing substrate 470 may be coupled with the first substrate 110. The sensing substrate 470 may be connected to the first substrate 110. The sensing substrate 470 may be electrically connected to the first substrate 110. The sensing substrate 470 may be soldered to the first substrate 110. The sensing substrate 470 may be disposed in the housing 130. The sensing substrate 470 may be fixed to the housing 130. The sensing substrate 470 may be coupled to the housing 130. The housing 130 may comprise a groove or hole of a shape corresponding to the sensing substrate 470. The sensing substrate 470 may be disposed in a groove or hole of the housing 130. The sensing substrate 470 may be connected to a terminal of the connection substrate 600 after bending.

In a direction perpendicular to the optical axis direction, a portion of the sensing substrate 470 may be disposed between the connection substrate 600 and the wing portion of the housing 130. The sensing substrate 470 may be disposed in the groove 131*a* of the wing portion of the housing 130.

The camera device 10 may comprise an AF driver IC. The AF driver IC may be an AF driver IC. The AF driver IC may be electrically connected to the AF coil 430. The AF driver IC may apply current to the AF coil 430 to perform AF driving. The AF driver IC can apply power to the AF coil 430. The AF driver IC can apply current to the AF coil 430. The AF driver IC can apply voltage to the AF coil 430. The AF driver IC may be disposed in the sensing substrate 470. The AF driver IC may be disposed at a location corresponding to the sensing magnet 450. The AF driver IC can be disposed to face the sensing magnet 450. The AF driver IC may be disposed adjacent to the sensing magnet 450.

The AF driver IC may comprise a sensor. The sensor may comprise a Hall element (Hall IC). The sensor may be disposed at a location corresponding to the sensing magnet 450. The sensor may be disposed to face the sensing magnet 450. The sensor may be disposed adjacent to the sensing magnet 450. The sensor can detect the sensing magnet 450. The sensor can detect the magnetic force of the sensing magnet 450. The sensor can detect the position of the first moving part 200. The sensor can detect the movement of the first moving part 200. The detection value detected by the sensor can be used as feedback for autofocus driving. The sensor can be disposed inside the AF driver IC. The sensor can be built into the AF driver IC. The sensor may be comprised in the AF driver IC. The sensor may be a component of the AF driver IC. The sensor may be disposed in the sensing substrate 470.

The camera device 10 may comprise a gyro sensor. The gyro sensor may be disposed in the first substrate 110. The gyro sensor can detect shaking of the camera device 10. The gyro sensor can sense the angular velocity or linear velocity caused by the shaking of the camera device 10. The gyro sensor may be electrically connected to the OIS driver IC 495. The shaking of the camera device 10 detected by the gyro sensor can be used to drive image stabilization (OIS).

The camera device 10 may comprise an OIS driver IC 495. The OIS driver IC 495 may be an OIS driver IC. The OIS driver IC 495 may be electrically connected to the OIS coil 440. The OIS driver IC 495 may apply current to the OIS coil 440 to perform OIS driving. The OIS driver IC 495 can apply power to the OIS coil 440. The OIS driver IC 495 can apply current to the OIS coil 440. The OIS driver IC 495 may apply voltage to the OIS coil 440. The OIS driver IC 495 may be disposed in the second substrate 310.

The camera device 10 may comprise a connection member. The connection member may be an interposer. The connection member may support the movement of the second moving part 300. The connection member can movably support the second moving part 300. The connection member can connect the second moving part 300 and the fixed part 100. The connection member may connect the first substrate 110 and the second substrate 310. The connection member may electrically connect the first substrate 110 and the second substrate 310. The connection member may connect the first substrate 110 and the second moving part 300. The connection member can guide the movement of the second moving part 300. The connection member may guide the second moving part 300 to move in a direction perpendicular to the optical axis direction. The connection member may guide the second moving part 300 to rotate about an optical axis. The connection member may restrict movement of the second moving part 300 in an optical axis direction.

The connection member may comprise a connection substrate 600. The connection member may comprise an elastic member connecting the fixed part 100 and the second moving part 300. The connecting member may comprise a leaf spring. The connection member may comprise a wire 800. The connection member may comprise a ball being disposed between the fixed part 100 and the second moving part 300. A connection member can comprise conductive members. The connecting member may comprise conductive tape. The connection member may comprise an EMI tape.

The camera device 10 may comprise a connection substrate 600. The connection substrate 600 may be a connection portion. The connection substrate 600 may be a connection member. The connection substrate 600 may be a flexible substrate. The connection substrate 600 may be a flexible substrate. The connection substrate 600 may be a flexible printed circuit board. The connection substrate 600 may be a flexible printed circuit substrate (FPCB). The connection substrate 600 may be flexible at least in part. The second substrate 310 and the connection substrate 600 may be formed integrally.

The connection substrate 600 may support the second moving part 300. The connection substrate 600 may support the movement of the second moving part 300. The connection substrate 600 can movably support the second moving part 300. The connection substrate 600 can connect the second moving part 300 and the fixed part 100. The connection substrate 600 can connect the first substrate 110 and the second substrate 310. The connection substrate 600 can electrically connect the first substrate 110 and the second substrate 310. The connection substrate 600 may guide the movement of the second moving part 300. The connection substrate 600 may guide the second moving part 300 to move in a direction perpendicular to the optical axis direction. The connection substrate 600 may guide the second moving part 300 to rotate about an optical axis. The connection substrate 600 may restrict movement of the second moving part 300 in an optical axis direction. A portion of the connection substrate 600 may be coupled to the base 120. The connection substrate 600 may movably support the image sensor 330. The connection substrate 600 may be disposed inside the first cover member 140.

The connection substrate 600 may comprise two connection substrates 600 spaced apart from each other and formed symmetrically. Two connection substrates 600 may be disposed at both sides of the second substrate 310. The connection substrate 600 may be bent a total of six times to connect the first substrate 110 and the second substrate 310.

The connection substrate 600 may comprise a first region connected to the second substrate 310 and bent in an optical axis direction. The first region is connected to the second substrate 310 and can be bent in an optical axis direction. The first region is connected to the second substrate 310 and may be extended in an optical axis direction. The first region is connected to the second substrate 310 and can be bent and extended in an optical axis direction. The connection substrate 600 may comprise a second region being extended from a first region. The connection substrate 600 may comprise a third region bent in a direction perpendicular to the optical axis direction in a second region. The third region may be bent in a direction perpendicular to the optical axis direction in a second region. The third region may be extended from a second region in a direction perpendicular to the optical axis direction. A third region may be bent and extended from a second region in a direction perpendicular to the optical axis direction.

The connection substrate 600 may comprise a connection portion 610 comprising a first region. The connection substrate 600 may comprise an extension portion 620 comprising a second region and a third region. The connection substrate 600 may comprise a connection portion 610 connected to the second substrate 310. The connection substrate 600 may comprise an extension portion 620 being extended from the connection portion 610. The connection substrate 600 may comprise a terminal portion 630 being connected to the extension portion 620 and comprising a terminal.

The terminal portion 630 may comprise a first terminal. The first terminal may be connected to the first substrate 110. The first terminal may be electrically connected to the first substrate 110. The first terminal may be coupled to the first substrate 110. The first terminal may be coupled to the first substrate 110 by a conductive member. The first terminal may be coupled to the first substrate 110 through soldering.

The terminal portion 630 may comprise a second terminal. The second terminal may be connected to the sensing substrate 470. The second terminal may be electrically connected to the sensing substrate 470. The second terminal may be coupled to the sensing substrate 470. The second terminal may be coupled to the sensing substrate 470 by a conductive member. The second terminal may be connected to the sensing substrate 470 through soldering. The second terminal of the connection substrate 600 may be overlapped with the first terminal of the connection substrate 600 in an optical axis direction. The second terminal may be disposed above the first terminal. The second terminal may be spaced apart from the first terminal. The second terminal may be disposed higher than the first terminal.

In a first embodiment of the present invention, the camera device 10 may comprise a flexible substrate. The flexible substrate can connect the fixed part 100 and the second moving part 300. The flexible substrate may comprise: a connection portion 610 connected to the second moving part 300; an extension portion 620 being extended from the connection portion 610; and a terminal portion 630 connected to the extension portion 620 and comprising a terminal.

In a first embodiment of the present invention, the connection substrate 600 may comprise: a first portion coupled to the first substrate 110; a second portion coupled to the second substrate 310; and a third portion connecting the first portion and the second portion. The third portion may be disposed at least partially parallel to an optical axis. The third portion may be formed so that the length in an optical axis direction is longer than the thickness. The second portion of the connection substrate 600 may be disposed parallel to the second substrate 310 at least in part. The third portion of the connection substrate 600 may be disposed perpendicular to the second portion at least in part. The third portion of the connection substrate 600 may be bent roundly at the portion corresponding to the corner of the second substrate 310. The second substrate 310 may comprise a first side surface and a second side surface being disposed to be opposite to each other and a third side surface and a fourth side surface being disposed to be opposite to each other. The second portion of the connection substrate 600 may be coupled with the first side surface and the second side surface of the second substrate 310. The first portion of the connection substrate 600 may be coupled to the portion of the first substrate 110 that corresponds to the third side surface and the fourth side surface of the second substrate 310.

The camera device 10 may comprise a shielding member. The shielding member may be disposed on one surface of the connection substrate 600. The shielding member may be a conductive tape. The shielding member may be EMI tape. In a modified embodiment, the shielding member may be disposed separately from the connection substrate 600. The camera device 10 may comprise a conductive tape. The connecting member may comprise a conductive tape. The connection substrate 600 may comprise a conductive tape. However, the conductive tape may be understood as a separate component from the connection substrate 600. The conductive tape may comprise electromagnetic interference (EMI) tape. The conductive tape can be a metal member. The conductive tape can be metal. The conductive tape can be a metal layer. The conductive tape can be a thin metal film. The conductive tape can be formed from metal. The conductive tape can be formed from alloys. The conductive tape can be formed from conductive materials. The conductive tape can have adhesive properties. The conductive tape can be distinguished from the conductive layer 602 of the connection substrate 600. The conductive tape may be formed of a material different from the conductive layer 602 of the connection substrate 600.

The conductive tape can be disposed in the connection substrate 600. The conductive tape can be bonded to the connection substrate 600. The conductive tape can be fixed to the connection substrate 600. The conductive tape can be formed integrally with the connection substrate 600. The conductive tape can be elastic. The conductive tape can be attached to an outer surface of the connection substrate 600. Or, the conductive tape may be attached to an inner surface of the connection substrate 600.

In an optical axis direction, the length of the conductive tape may, at least in part, be equal to the length of the extension 620. The conductive tape may be extended the same length in an optical axis direction as the extension portion 620. The thickness of the conductive tape may be thinner than the thickness of the connection substrate 600. The thickness of the conductive tape may be the same as the thickness of the connection substrate 600. The conductive tape can be connected to ground (GND) and used for impedance matching and noise suppression.

At least a portion of the conductive tape may be disposed in the extension portion 620 of the connection substrate 600. The extension portion 620 may comprise a bending region that is bent in a direction perpendicular to the optical axis direction. At this time, the conductive tape can be disposed in the bending region. The conductive tape may be disposed on an inner surface of the extension portion 620. The conductive tape may be disposed on an outer surface of the extension portion 620.

The conductive tape can be formed from conductive materials. The conductive tape may be electrically connected to the second substrate 310. The conductive tape may be electrically connected to the image sensor 330. The conductive tape can be electrically connected to the OIS driver IC 495. The conductive tape may be connected to a first terminal of the connection substrate 600. The conductive tape may be electrically connected to the first terminal of the connection substrate 600. The conductive tape may be in direct contact with the first terminal of the connection substrate 600. The conductive tape can be used as ground (GND). The conductive tape can be connected to a ground terminal of the connection substrate 600. The conductive tape may be electrically connected to the first substrate 110. In this case, the number of power connection patterns of the connection substrate 600 may be reduced. The conductive tape may be electrically connected to the ground terminal of the image sensor 330.

The camera device 10 may comprise an elastic member 700. The elastic member 700 may be a support member. The elastic member 700 can connect the fixed part 100 and the first moving part 200. The elastic member 700 can elastically connect the fixed part 100 and the first moving part 200. The elastic member 700 may connect the bobbin 210 and the housing 130. The elastic member 700 can elastically connect the bobbin 210 and the housing 130. The elastic member 700 can movably support the first moving part 200 with respect to the fixed part 100. The elastic member 700 may be deformed when the first moving part 200 moves. When the movement of the first moving part 200 is completed, the elastic member 700 can position the first moving part 200 to the initial position through restoring force (elastic force). The elastic member 700 may comprise a leaf spring. The elastic member 700 may comprise a spring. The elastic member 700 may have elasticity at least in part. The elastic member 700 may provide restoring force (elastic force) to the first moving part.

The camera device 10 may comprise an upper elastic member 710. The elastic member 700 may comprise an upper elastic member 710. The upper elastic member 710 may be an upper spring. The upper elastic member 710 may be disposed on a lower elastic member 720. The upper elastic member 710 may connect the housing 130 and the bobbin 210. The upper elastic member 710 may be coupled to the housing 130. The upper elastic member 710 may be coupled to the bobbin 210.

The upper elastic member 710 may comprise a plurality of upper elastic units. The upper elastic member 710 may comprise two upper elastic units. The upper elastic member 710 may comprise first and second upper elastic units. The first and second upper elastic units may be spaced apart from each other. The first and second upper elastic units may electrically connect the sensing substrate 470 and the AF coil 430. In a modified embodiment, the lower elastic member 720 may comprise a plurality of lower elastic units. The lower elastic member 720 may comprise two lower elastic units.

The AF driver IC may be disposed on an inner surface of the sensing substrate 470. The first upper elastic unit may be coupled to an inner surface of the sensing substrate 470. The second upper elastic unit may be coupled to an outer surface opposite to an inner surface of the sensing substrate 470.

The upper elastic member 710 may comprise an outer side portion coupled to the housing 130. The outer side portion of the upper elastic member 710 may be coupled to an upper portion of the housing 130. The outer side portion of the upper elastic member 710 may be disposed on an upper surface of the housing 130. The upper elastic member 710 may comprise an inner side portion coupled to the bobbin 210. The inner side portion of the upper elastic member 710 may be coupled to an upper portion of the bobbin 210. The inner side portion of the upper elastic member 710 may be disposed on an upper surface of the bobbin 210. The upper elastic member 710 may comprise a connection portion connecting the outer side portion and the inner side portion. The connection portion may have elasticity.

The upper elastic member 710 may comprise a coupling portion. The coupling portion may be coupled to a wire 800. The coupling portion may be extended from the outer side portion. The coupling portion may comprise a hole. The upper elastic member 710 may comprise a hole in which the wire 800 is disposed. The upper elastic member 710 may comprise a hole through which the wire 800 passes.

The upper elastic member 710 may comprise a terminal portion. The terminal portion may be coupled with the sensing substrate 470. The terminal unit may be connected to a terminal of the sensing substrate 470. The terminal portion may be coupled to the second terminal 472 of the sensing substrate 470 through a conductive member.

The camera device 10 may comprise a lower elastic member 720. The elastic member 700 may comprise a lower elastic member 720. The lower elastic member 720 may be a lower spring. The lower elastic member 720 may be disposed below the upper elastic member 710. The lower elastic member 720 may connect the housing 130 and the bobbin 210. The lower elastic member 720 may be coupled to the housing 130. The lower elastic member 720 may be coupled to the bobbin 210.

The lower elastic member 720 may comprise an outer side portion coupled to the housing 130. The outer side portion of the lower elastic member 720 may be coupled to the lower portion of the housing 130. The outer side portion of the lower elastic member 720 may be disposed on a lower surface of the housing 130. The lower elastic member 720 may comprise an inner side portion coupled to the bobbin 210. The inner side portion of the lower elastic member 720 may be coupled to a lower portion of the bobbin 210. The inner side portion of the lower elastic member 720 may be disposed on a lower surface of the bobbin 210. The lower elastic member 720 may comprise a connection portion connecting the outer side portion and the inner side portion. The connection portion may have elasticity.

The camera device 10 may comprise a wire 800. The wire 800 may be a wire spring. The wire 800 may be an elastic member. The wire 800 may be a leaf spring in a modified embodiment. The wire 800 can connect the fixed part 100 and the second moving part 300. The wire 800 can elastically connect the fixed part 100 and the second moving part 300. The wire 800 may connect the housing 130 and the second substrate 310. The wire 800 can elastically connect the housing 130 and the second substrate 310. The wire 800 may movably support the second moving part 300. The wire 800 may movably support the second moving part 300 with respect to the fixed part 100. The wire 800 may support the movement of the image sensor 330. The wire 800 may movably support the image sensor 330. The wire 800 may be disposed in an optical axis direction. The wire 800 may support the second moving part 300 to move or rotate in a direction perpendicular to the optical axis direction. The wire 800 may connect the upper elastic member 710 and the coupling member 380. The wire 800 may electrically connect the upper elastic member 710 and the coupling member 380. The wire 800 may be coupled to the upper elastic member 710 through soldering. The wire 800 may be coupled to the coupling member 380 through soldering.

The wire 800 may comprise a first portion coupled to the upper elastic member 710. At this time, the first portion may be the upper end of the wire 800. However, the first portion may be spaced apart from the upper end of the wire 800. The wire 800 may comprise a second portion coupled to the coupling member 380. At this time, the second portion may be the lower end of the wire 800. However, the second portion may be spaced apart from the lower end of the wire 800.

Hereinafter, the driving of a camera device according to a first embodiment of the present invention will be described with reference to the drawings.

Figure 24:
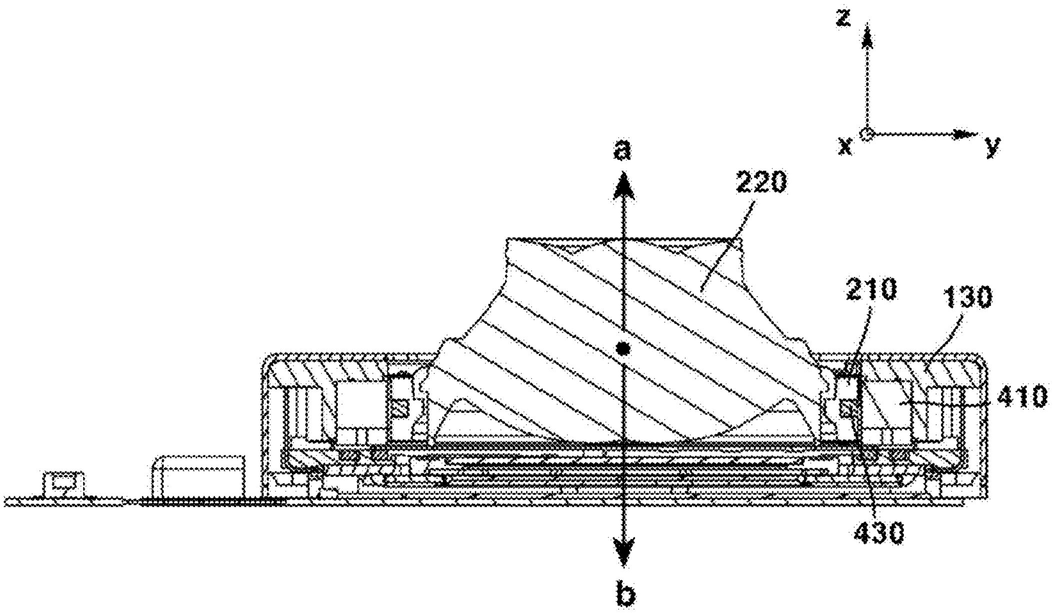
FIG. 24 is a diagram for explaining an operation of the autofocus function of a camera device according to a first embodiment of the present invention.

FIG. 24 is a diagram for explaining an operation of the autofocus function of a camera device according to a first embodiment of the present invention.

When power is applied to an AF coil 430 of a camera device 10 according to a first embodiment of the present invention, an electromagnetic field is formed in the AF coil 430, and the AF coil 430 can move in an optical axis direction (z-axis direction) through electromagnetic interaction with the AF magnet 410. At this time, the AF coil 430 may move in an optical axis direction together with the first moving part 200 comprising the lens 220. In this case, the lens 220 moves away from or approaches the image sensor 330, so the focus of the subject can be adjusted. To apply power to the AF coil 430, one or more of current and voltage may be applied.

When a current in a first direction is applied to the AF coil 430 of the camera device 10 according to a first embodiment of the present invention, the AF coil 430 can move upward in an optical axis direction (see a in FIG. 24) through electromagnetic interaction with the AF magnet 410. At this time, the AF coil 430 may move the lens 220 upward in an optical axis direction away from the image sensor 330.

When a current in a second direction opposite to a first direction is applied to the AF coil 430 of the camera device 10 according to a first embodiment of the present invention, the AF coil 430 can move in a downward direction (see b in FIG. 24) in an optical axis direction through electromagnetic interaction with the AF magnet 410. At this time, the AF coil 430 may move the lens 220 downward in an optical axis direction to become closer to the image sensor 330.

Figure 25:
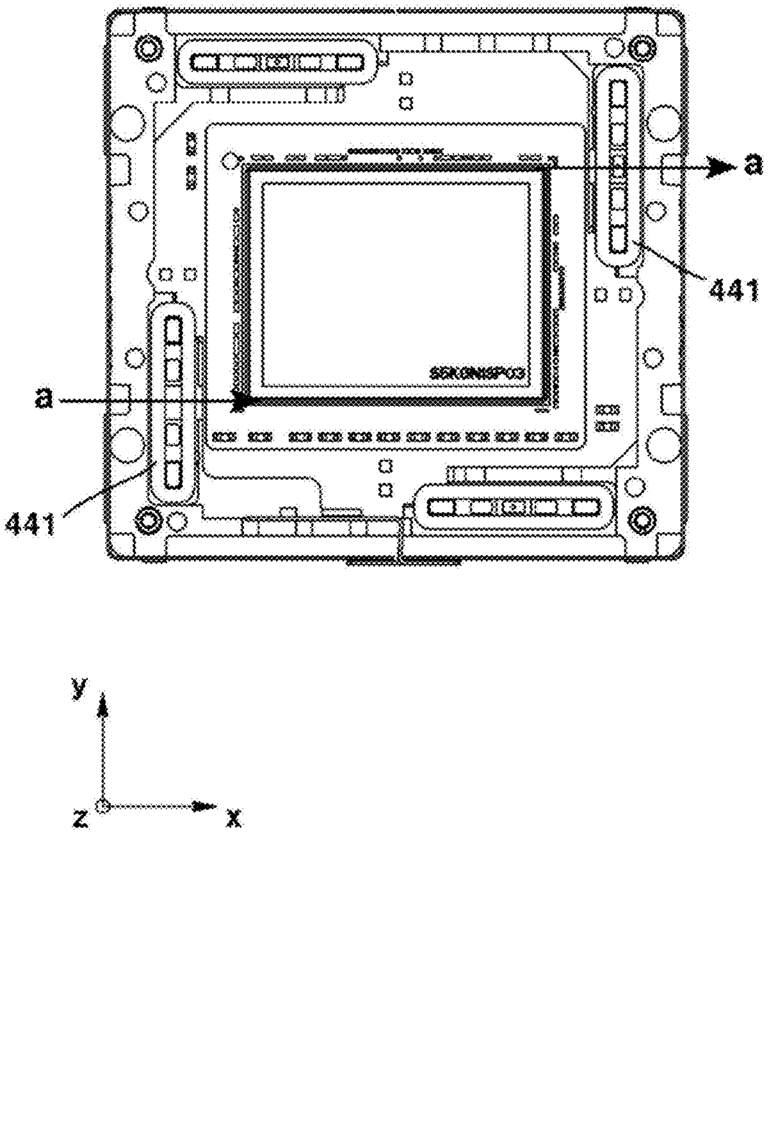
FIGS. 25 to 27 are diagrams for explaining an operation of an image stabilization function of a camera device according to a first embodiment of the present invention. In more detail.
Figure 26:
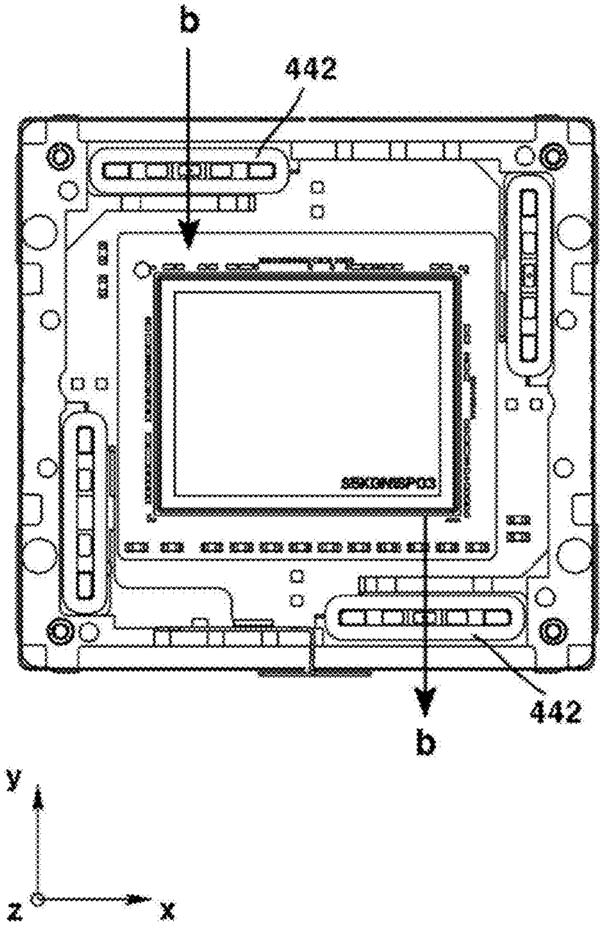
Figure 27:
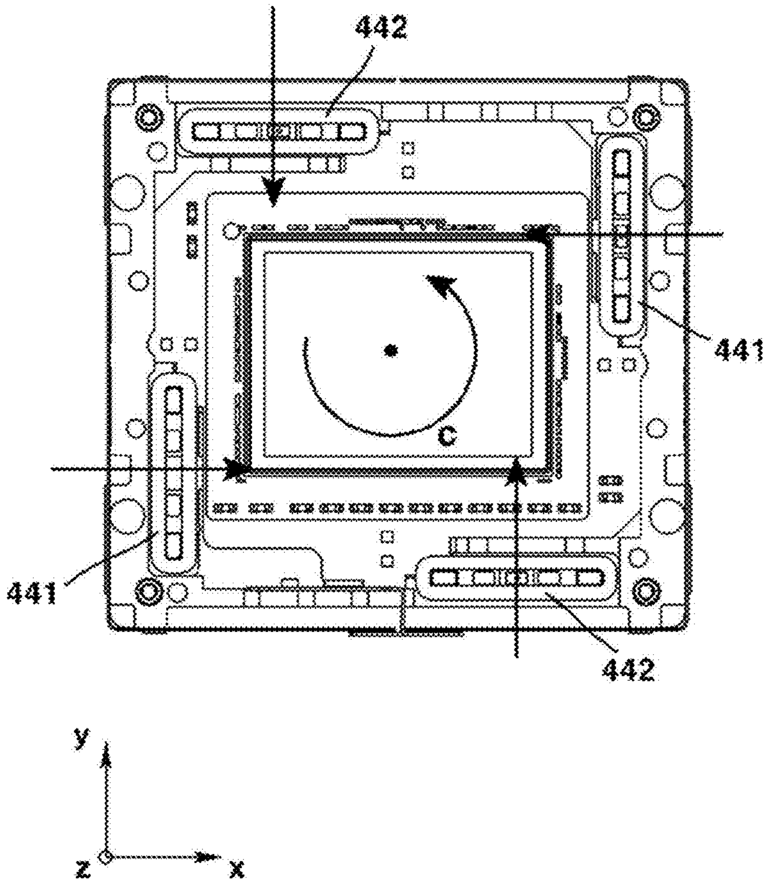

FIGS. 25 to 27 are diagrams for explaining an operation of an image stabilization function of a camera device according to a first embodiment of the present invention.

When power is applied to the OIS coil 440 of the camera device 10 according to a first embodiment of the present invention, an electromagnetic field is formed in the OIS coil 440, so that the OIS coil 440 can move in a direction perpendicular to the optical axis direction through electromagnetic interaction with the OIS magnet 420. In addition, the OIS coil 440 can rotate about an optical axis through electromagnetic interaction with the OIS magnet 420. At this time, the OIS coil 440 may move or rotate together with the second moving part 300 comprising the image sensor 330. In a first embodiment of the present invention, the OIS coil 440 may move the image sensor 330 to compensate for the shaking of the camera device 10 detected by the gyro sensor 490.

FIG. 25 is a diagram illustrating how the image sensor of the camera device according to a first embodiment of the present invention is shifted along an x-axis.

When a current in a first direction is applied to the first coil 441 of a camera device 10 according to a first embodiment of the present invention, the first coil 441 can move in one direction (see a in FIG. 25) of a first direction (x-axis direction) perpendicular to the optical axis direction through electromagnetic interaction with the OIS magnet 420. At this time, the first coil 441 may move the image sensor 330 in one direction among the first directions perpendicular to the optical axis direction. Conversely, when a current in a second direction opposite to a first direction is applied to the first coil 441, the first coil 441 can move in the other direction among the first directions (x-axis direction) perpendicular to the optical axis direction through electromagnetic interaction with the OIS magnet 420. At this time, the first coil 441 may move the image sensor 330 in another direction among the first directions perpendicular to the optical axis direction.

FIG. 26 is a diagram illustrating how an image sensor of a camera device according to a first embodiment of the present invention is shifted along a y-axis.

When a current in a first direction is applied to the second coil 442 of a camera device 10 according to a first embodiment of the present invention, the second coil 442 can move in one direction (see b in FIG. 26) among the second directions (y-axis direction) perpendicular to the optical axis direction through electromagnetic interaction with the OIS magnet 420. At this time, the second coil 442 may move the image sensor 330 in one direction among the second directions perpendicular to the optical axis direction. Conversely, when a current in a second direction opposite to a first direction is applied to the second coil 442, the second coil 442 can move in the other direction among the second directions (y-axis direction) perpendicular to the optical axis direction through electromagnetic interaction with the OIS magnet 420. At this time, the second coil 442 may move the image sensor 330 in another direction among the second directions perpendicular to the optical axis direction.

FIG. 27 is a diagram illustrating how an image sensor of a camera device according to a first embodiment of the present invention is rolling around a z-axis.

When current in a first direction is applied to the first coil 441 and the second coil 442 of a camera device 10 according to a first embodiment of the present invention, the first coil 441 and the second coil 442 can rotate in one direction about the optical axis through electromagnetic interaction with the OIS magnet 420 (see c in FIG. 27). At this time, the first coil 441 and the second coil 442 can rotate the image sensor 330 in one direction about an optical axis. At this time, one direction may be counterclockwise. Conversely, when a current in a second direction opposite to a first direction is applied to the first coil 441 and the second coil 442, the first coil 441 and the second coil 442 can rotate in other direction about an optical axis through electromagnetic interaction with the OIS magnet 420. At this time, the first coil 441 and the second coil 442 may rotate the image sensor 330 in other direction about an optical axis. At this time, the other direction may be clockwise.

Hereinafter, an optical apparatus according to a first embodiment of the present invention will be described with reference to the drawings.

Figure 28:
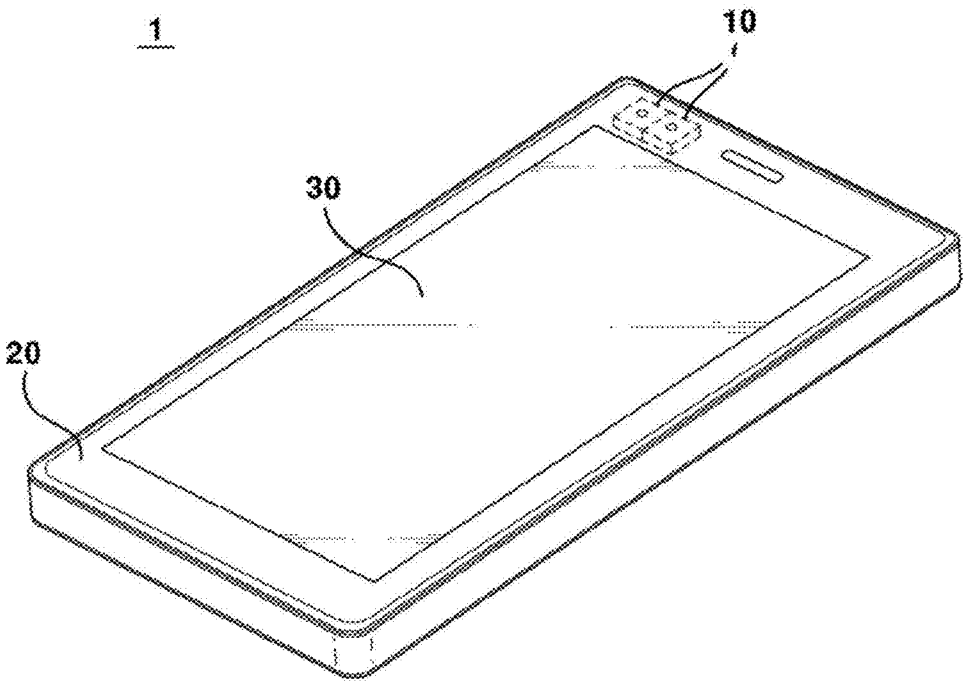
FIG. 28 is a perspective view of an optical apparatus according to a first embodiment of the present invention.
Figure 29:
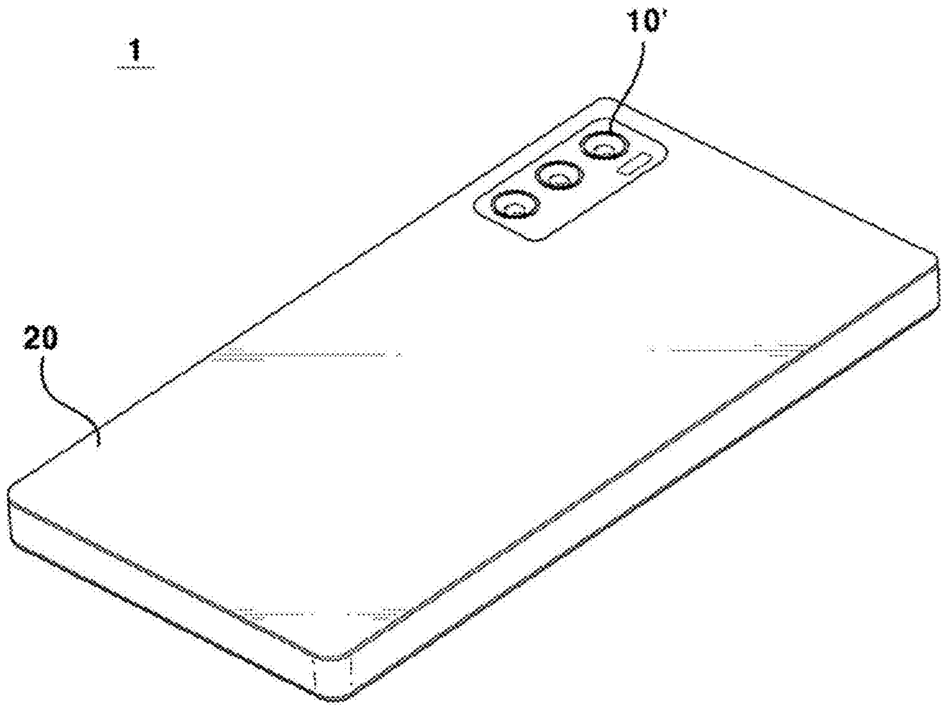
FIG. 29 is a perspective view of an optical apparatus according to a first embodiment of the present invention as seen from a direction different from that of FIG. 28.
Figure 30:
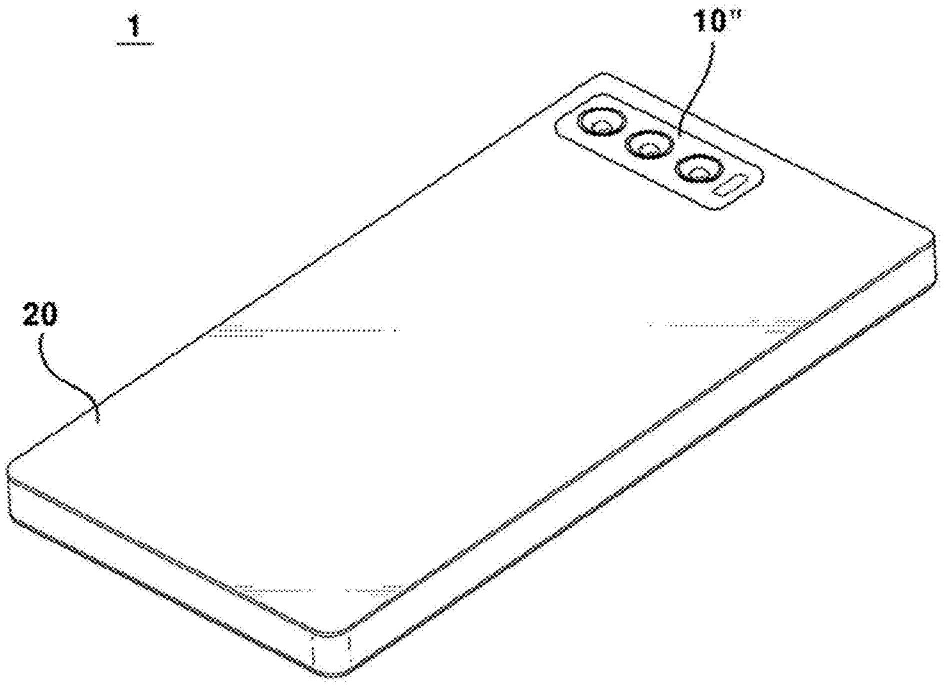
FIG. 30 is a perspective view of an optical apparatus according to a modified embodiment.

FIG. 28 is a perspective view of an optical apparatus according to a first embodiment of the present invention; FIG. 29 is a perspective view of an optical apparatus according to a first embodiment of the present invention as seen from a direction different from that of FIG. 28; and FIG. 30 is a perspective view of an optical apparatus according to a modified embodiment.

An optical apparatus 1 may comprise any one or more among a hand phone, a portable phone, a portable terminal, a mobile terminal, a smart phone, a smart pad, a portable smart device, a digital camera, a laptop computer, a digital broadcasting terminal, a personal digital assistant (PDA), a portable multimedia player (PMP), and a navigation. The optical apparatus 1 may comprise any device for photographing images or photos.

The optical apparatus 1 may comprise a main body 20. The optical apparatus 1 may comprise a camera device 10. The camera device 10 may be disposed in the main body 20. The camera device 10 may photograph a subject. The optical apparatus 1 may comprise a display 30. The display 30 may be disposed in the main body 20. The display 30 may output any one or more of a video and an image photographed by the camera device 10. The display 30 may be disposed on the first surface of the main body 20. The camera device 10 may be disposed on any one or more of a first surface of the main body 20 and a second surface opposite to the first surface.

The camera device 10 may be disposed on the front side of the main body 20 as illustrated in FIG. 28. That is, the camera device 10 may be disposed on the same surface as the display 30. However, the additional camera device 10' may be disposed on the back side of the main body 20 as illustrated in FIG. 29. At this time, the camera device 10' may have a plurality of camera devices disposed parallel to the long side of the main body 20. The camera device according to a first embodiment of the present invention may be disposed on one or more of the front and back sides of the main body 20. In addition, as illustrated in FIG. 30 in a modified embodiment, the camera device 10" may have a plurality of camera devices disposed on the back side of the main body 20 and parallel to the short side of the main body 20.

Hereinafter, a camera device according to a second embodiment of the present invention will be described with reference to the drawings.

Figure 31:
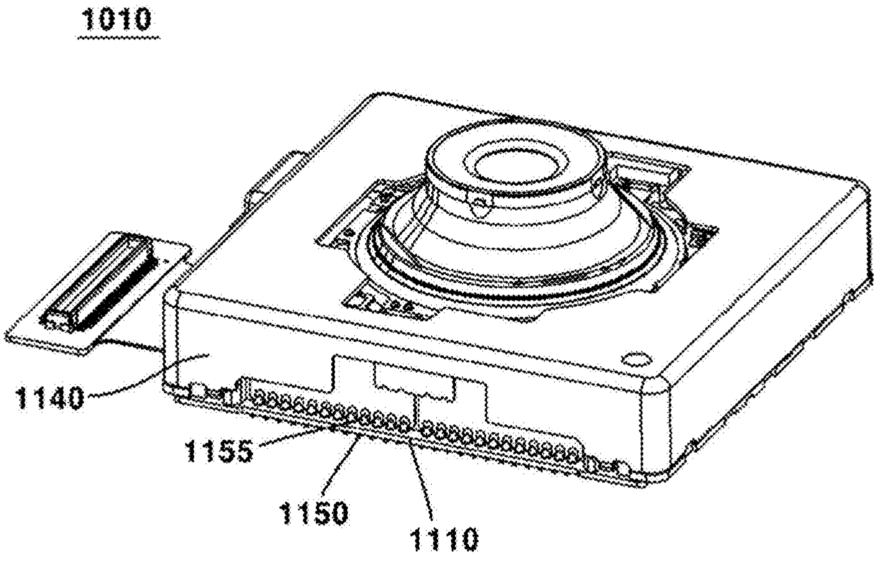
FIG. 31 is a perspective view of a camera device according to a second embodiment of the present invention.
Figure 32:
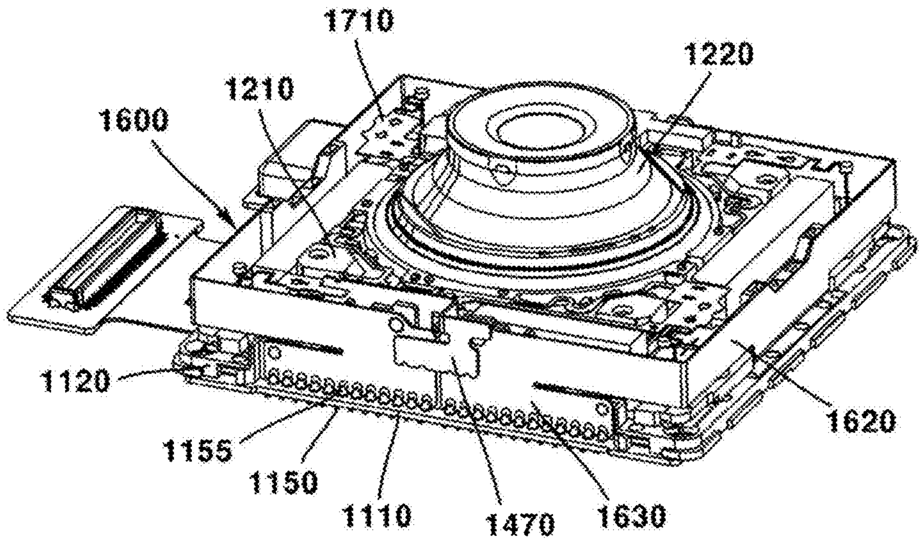
FIG. 32 is a perspective view of a camera device according to a second embodiment of the present invention with some components omitted.
Figure 33:
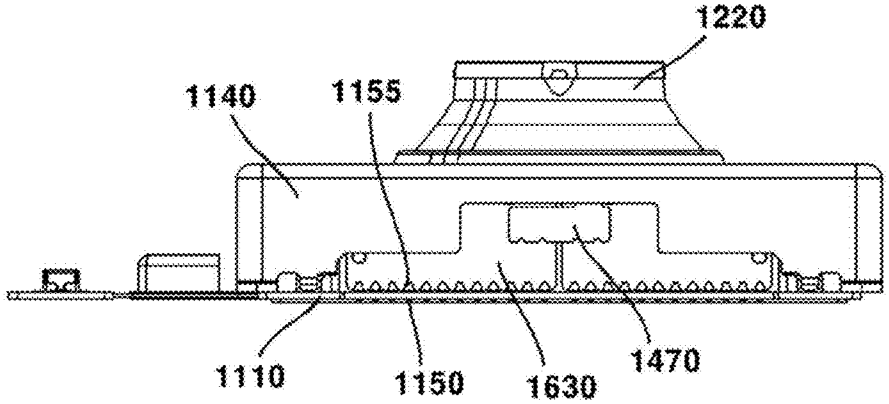
FIG. 33 is a side view of a camera device according to a second embodiment of the present invention.
Figure 34:
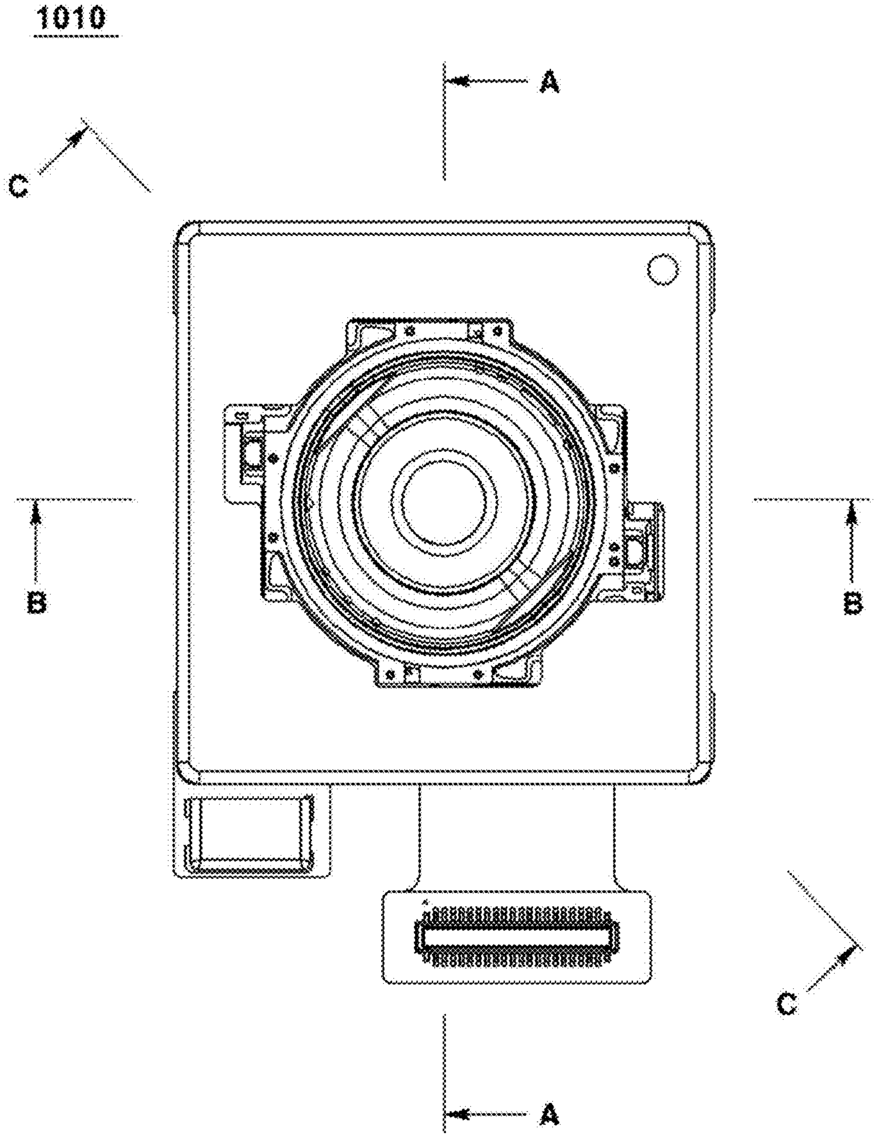
FIG. 34 is a plan view of a camera device according to a second embodiment of the present invention.
Figure 35:
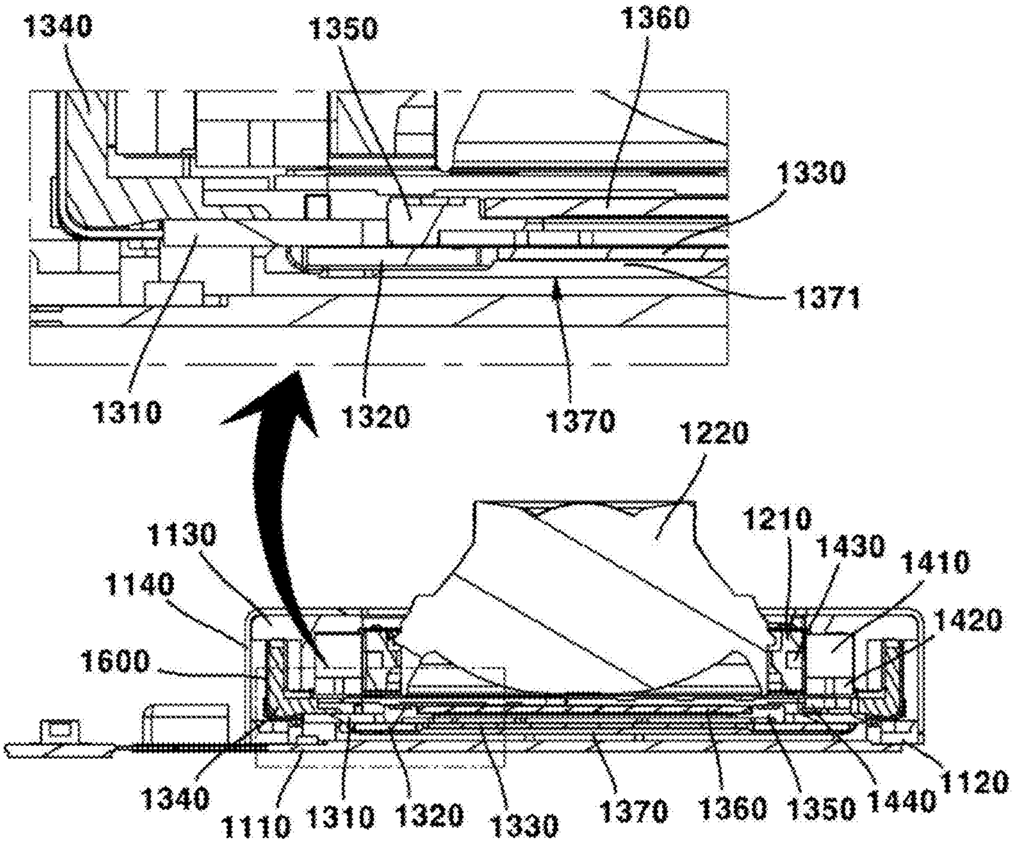
FIG. 35 is a cross-sectional view and a partially enlarged view viewed from A-A in FIG. 34.
Figure 36:
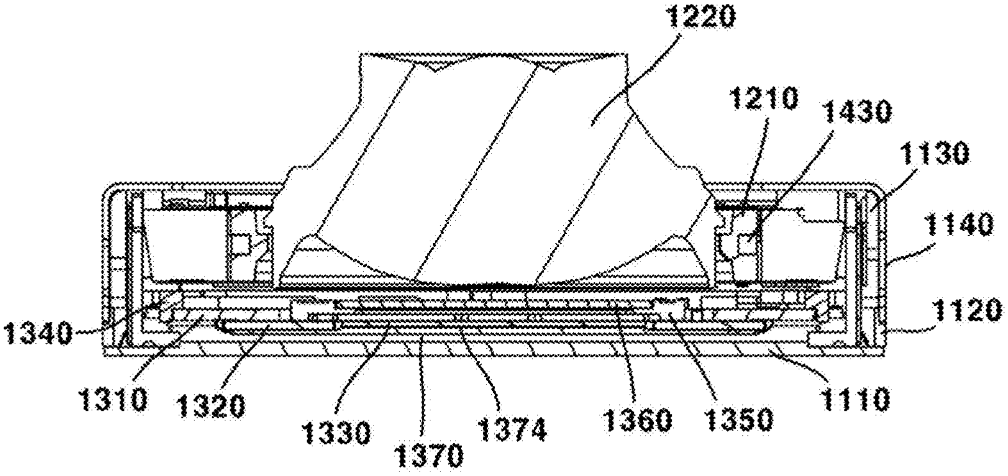
FIG. 36 is a cross-sectional view taken along line B-B of FIG. 34.
Figure 37:
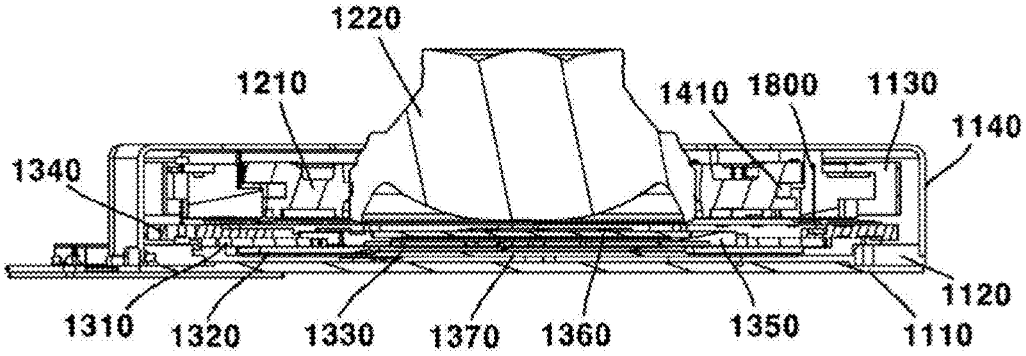
FIG. 37 is a cross-sectional view taken along line C-C of FIG. 34.
Figure 38:
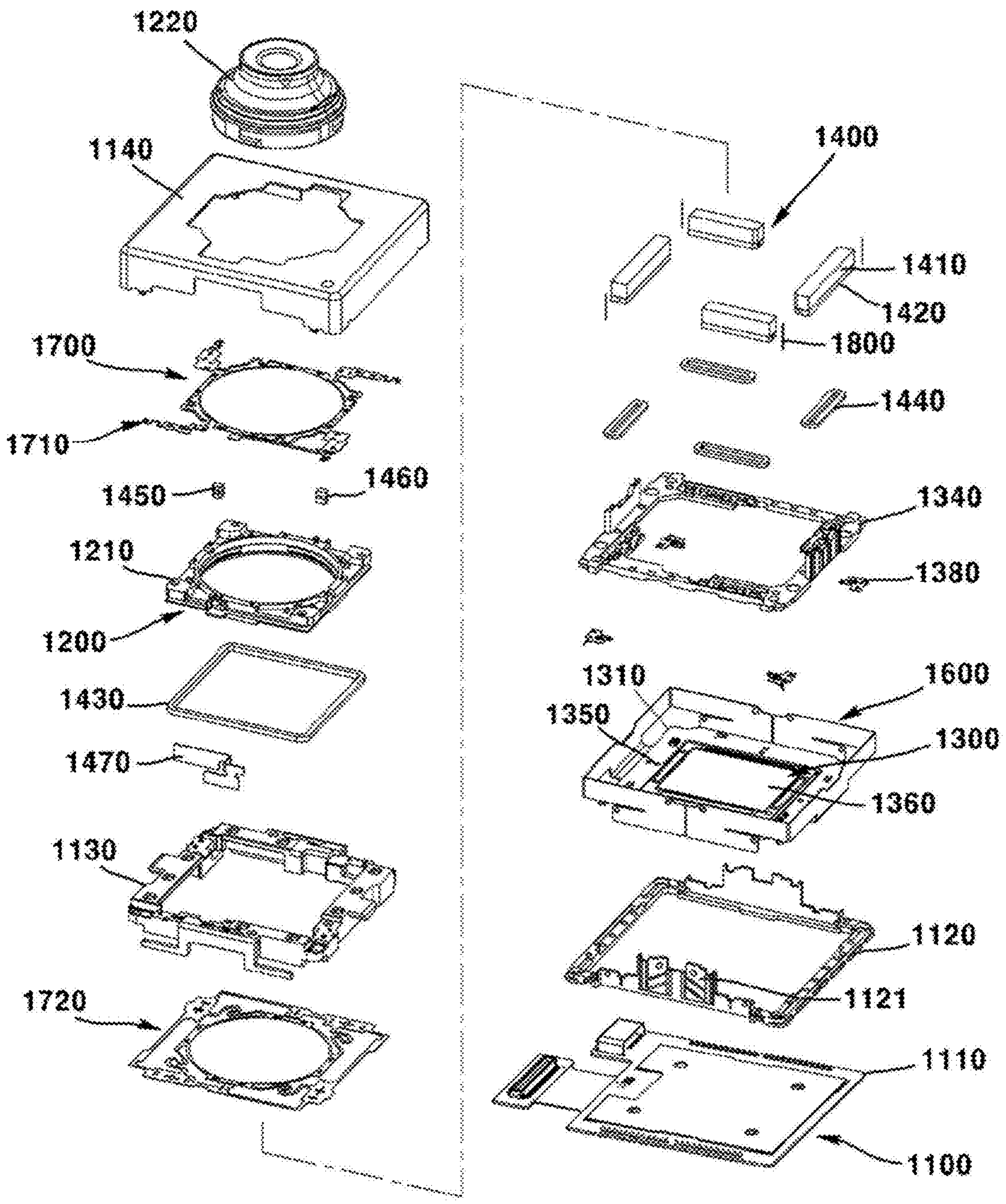
FIG. 38 is an exploded perspective view of a camera device according to a second embodiment of the present invention.
Figure 39:
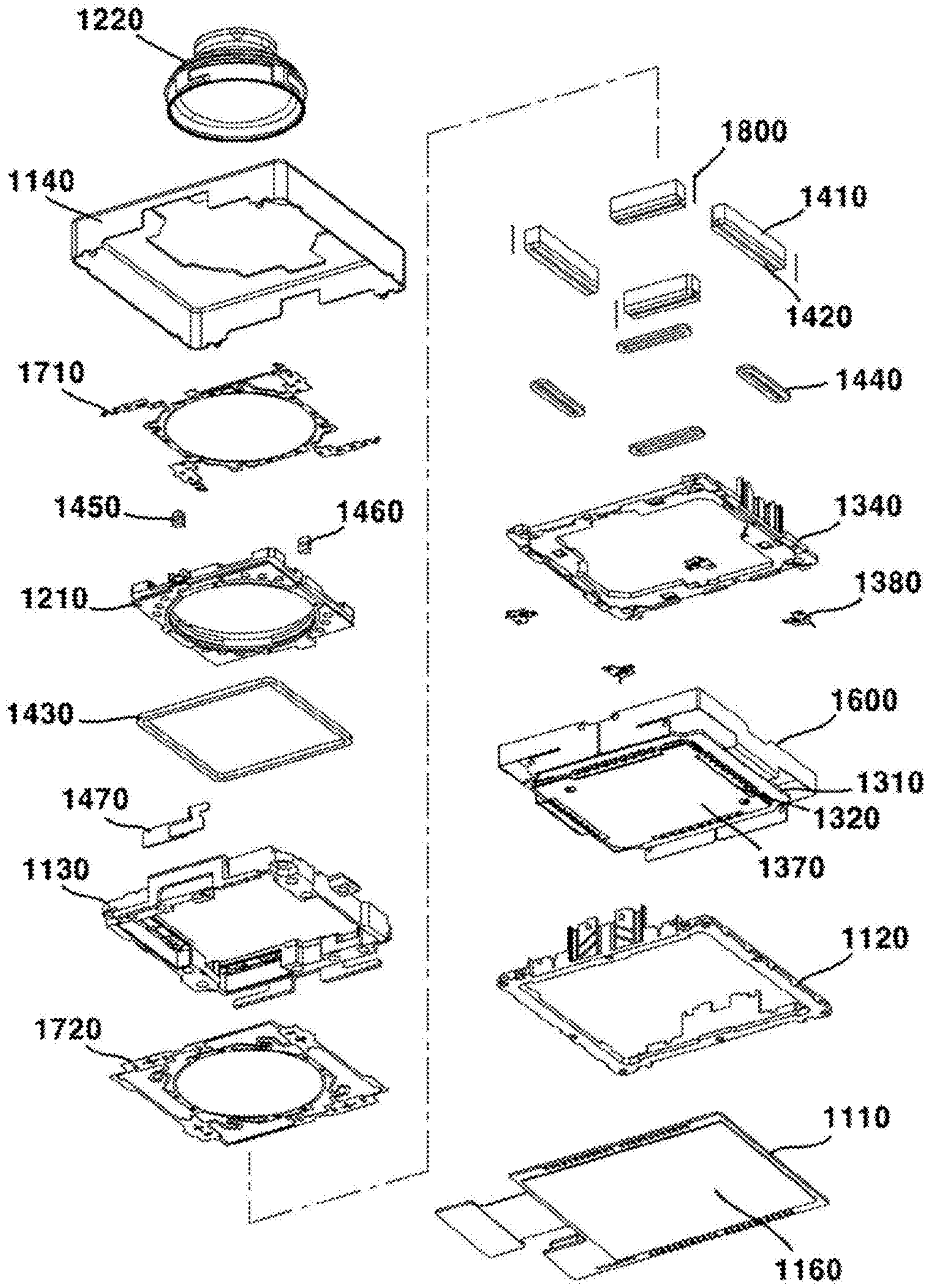
FIG. 39 is an exploded perspective view of a camera device according to a second embodiment of the present invention viewed from a direction different from that of FIG. 38.
Figure 40:
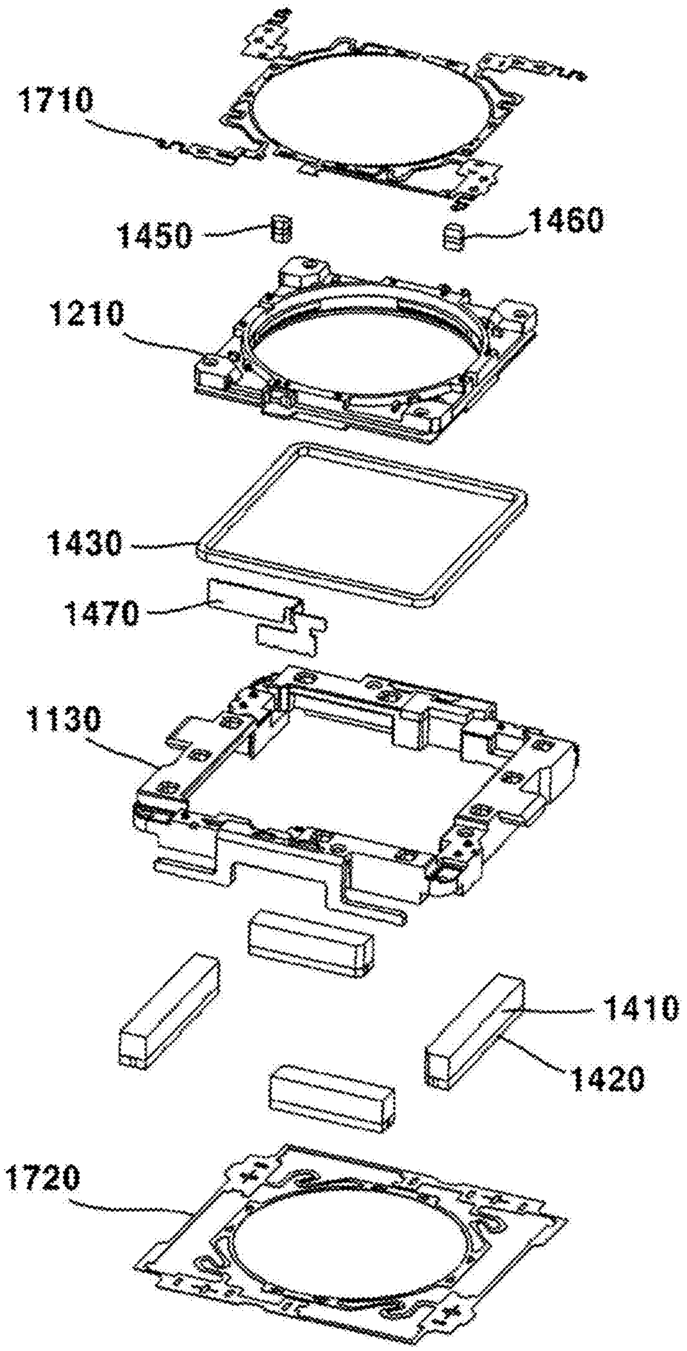
FIG. 40 is an exploded perspective view of a first moving part and related components of a camera device according to a second embodiment of the present invention.
Figure 41:
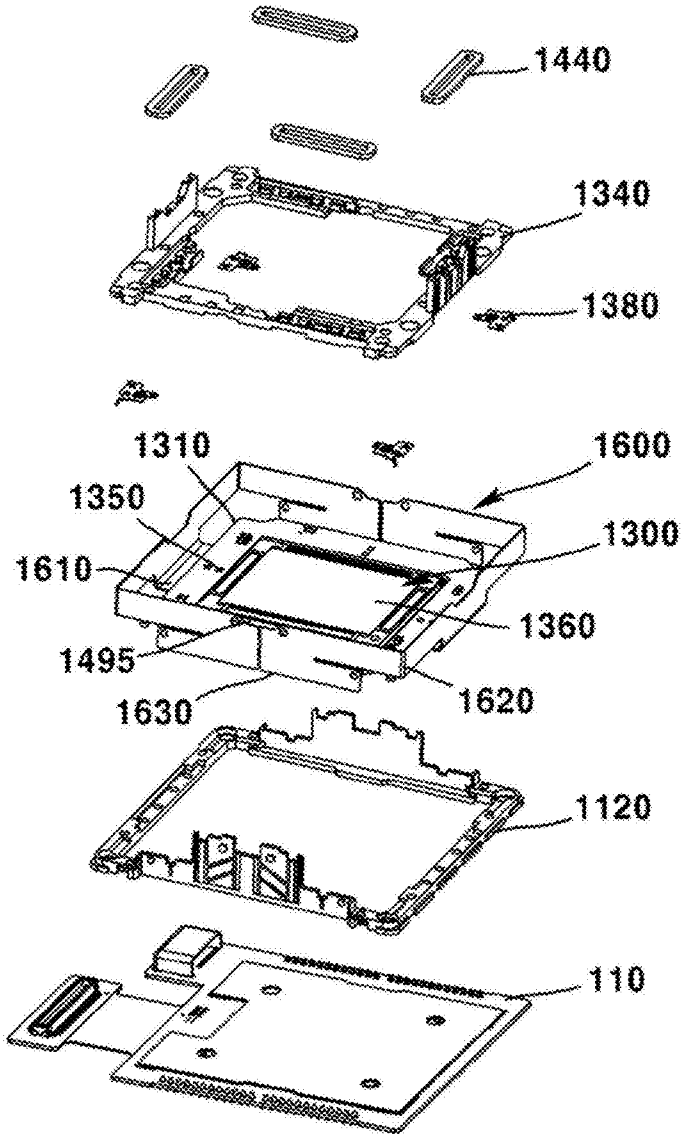
FIG. 41 is an exploded perspective view of a second moving part and related components of a camera device according to a second embodiment of the present invention.
Figure 42:
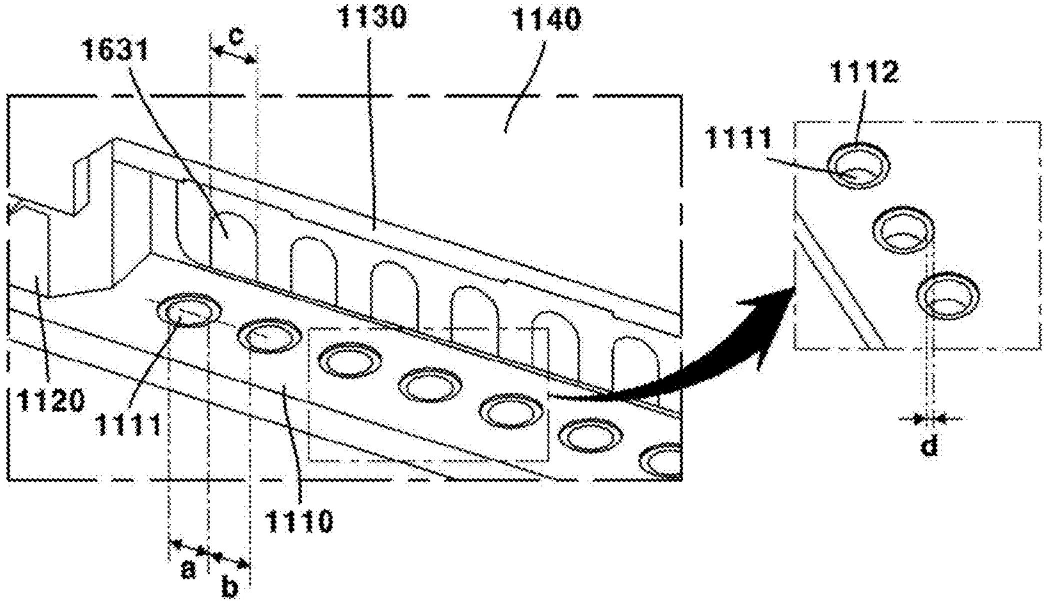
FIG. 42 is a perspective view and a partially enlarged view illustrating a hole and related components of a first substrate of a camera device according to a second embodiment of the present invention.
Figure 43:
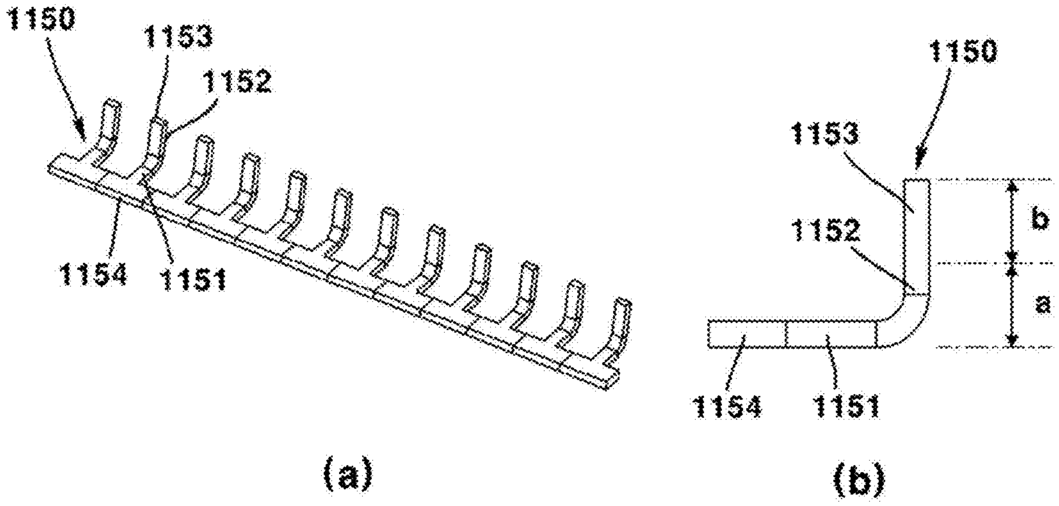
FIG. 43(*a*) is a perspective view of a pin member of a second embodiment of the present invention, and (b) is a side view.
Figure 44:
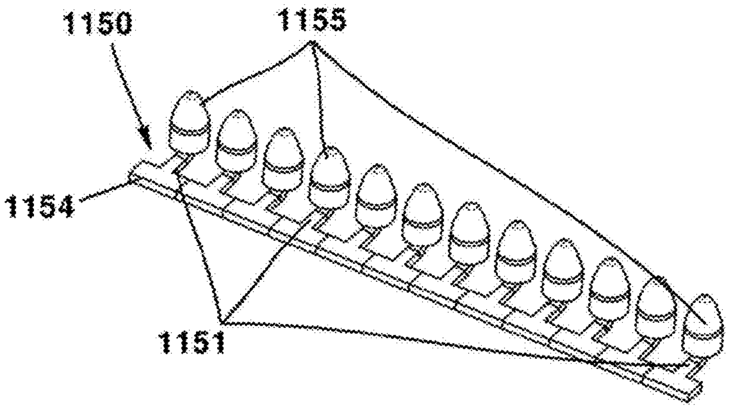
FIG. 44 is a perspective view illustrating a conductive member disposed in a pin member of a second embodiment of the present invention.
Figure 45:
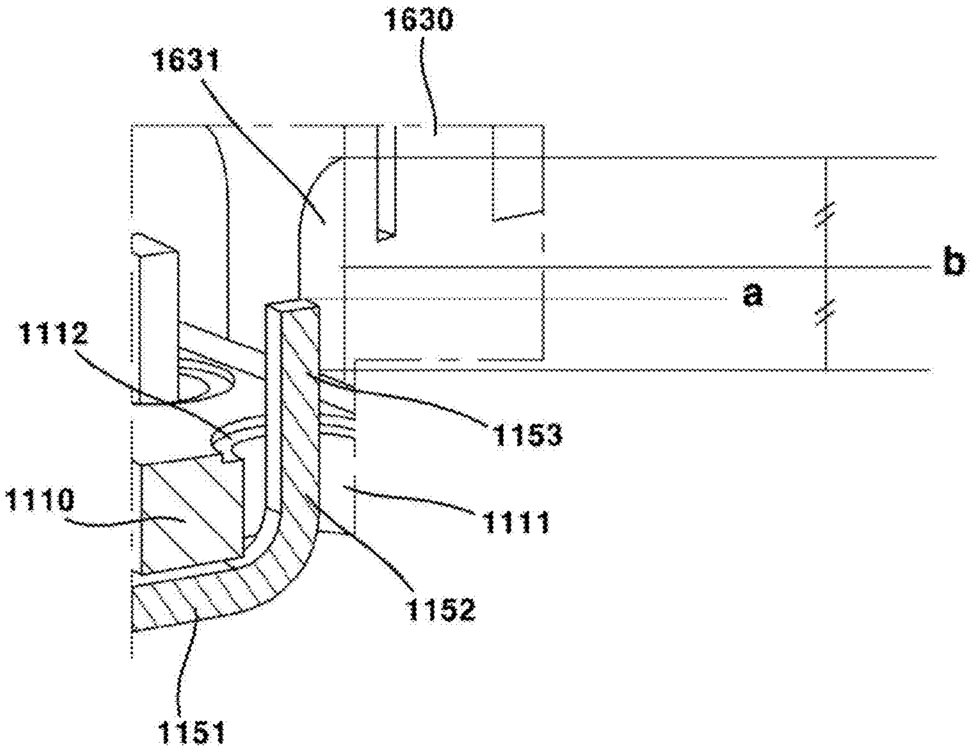
FIG. 45 is a cross-sectional view illustrating a pin member disposed in a hole of the first substrate in a second embodiment of the present invention.
Figure 46:
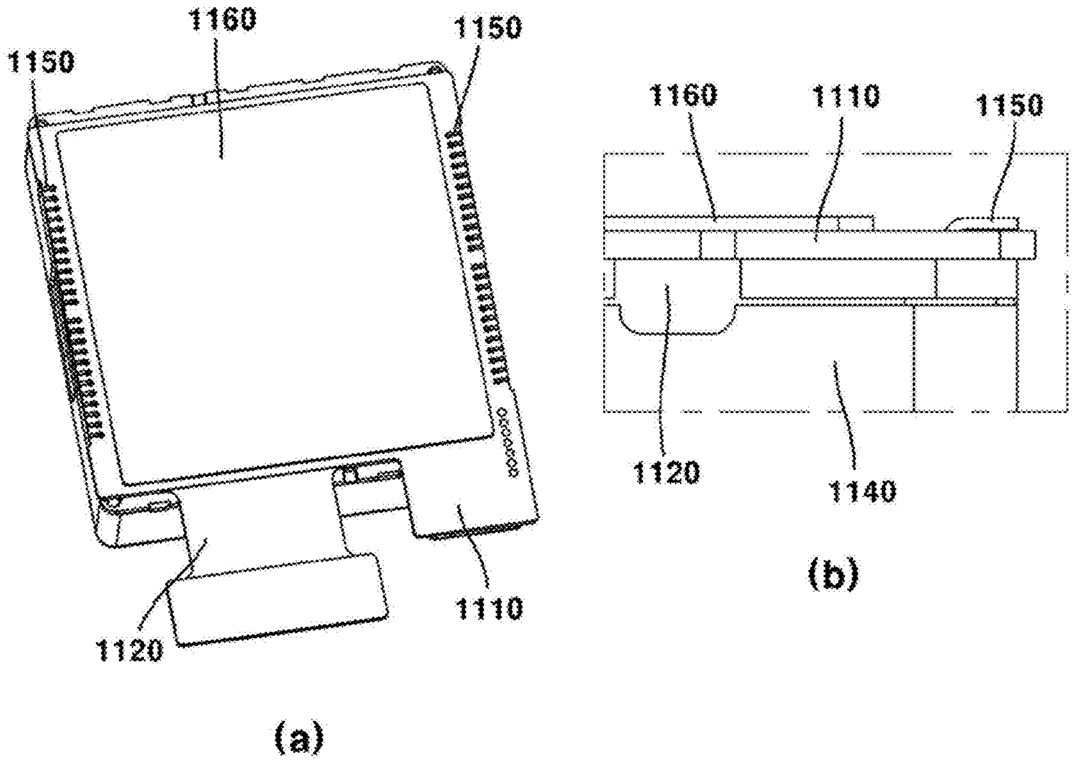
FIG. 46(*a*) is a bottom perspective view of a camera device according to a second embodiment of the present invention, and (b) is a side view illustrating an arrangement of a pin member and a stiffener.
Figure 52:
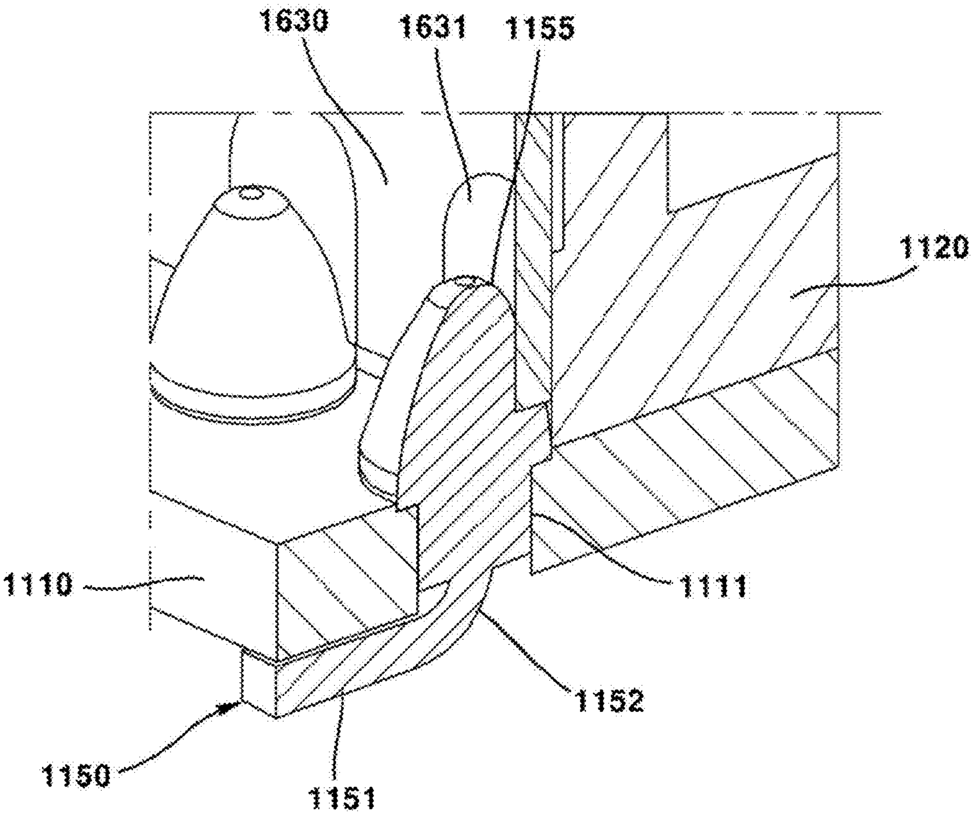
FIG. 52 is a diagram illustrating how a conductive member connects a terminal of a pin member and a connection substrate after a hot air process.
Figure 53:
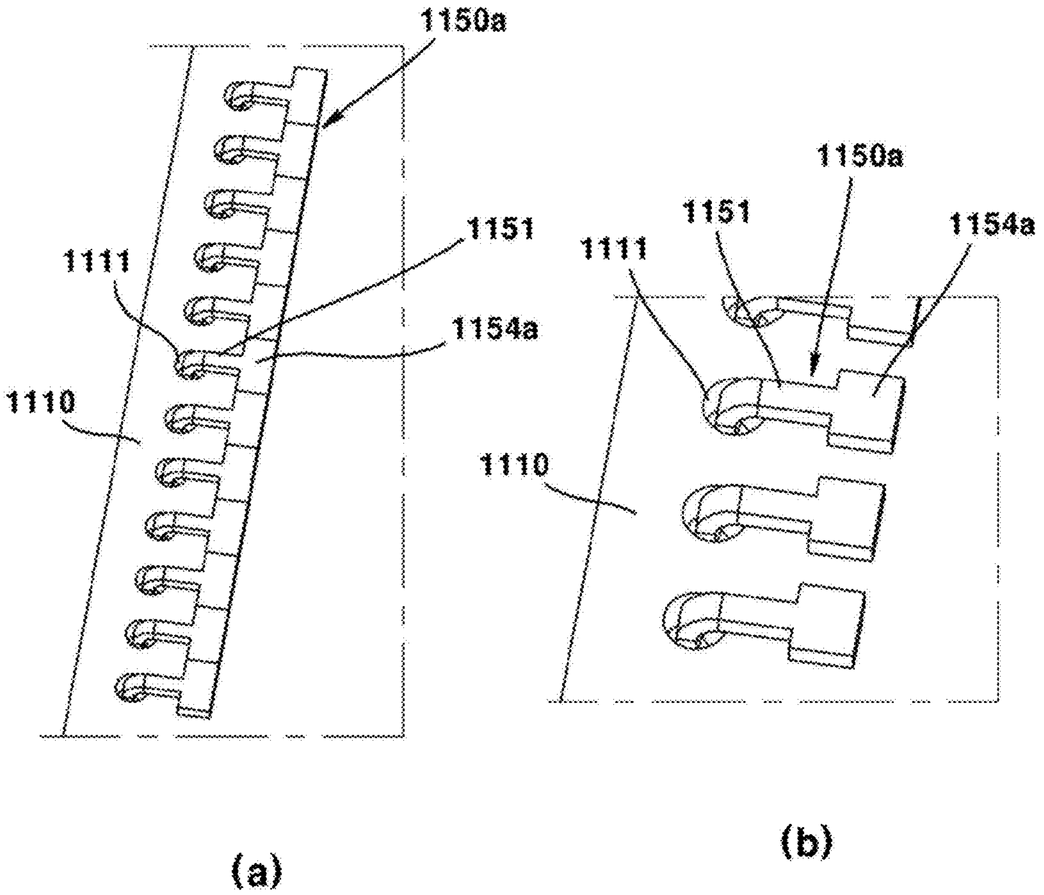
FIG. 53 is a diagram illustrating an arrangement of pin members according to a modified embodiment. In more detail, FIG. 53(*a*) is a diagram illustrating pluralities of pin members connected to one another in a modified embodiment, and FIG. 53(*b*) is a diagram illustrating a state in which a portion of a connection part is removed so that pluralities of pin members are separated from one another in a modified embodiment.
Figure 54:
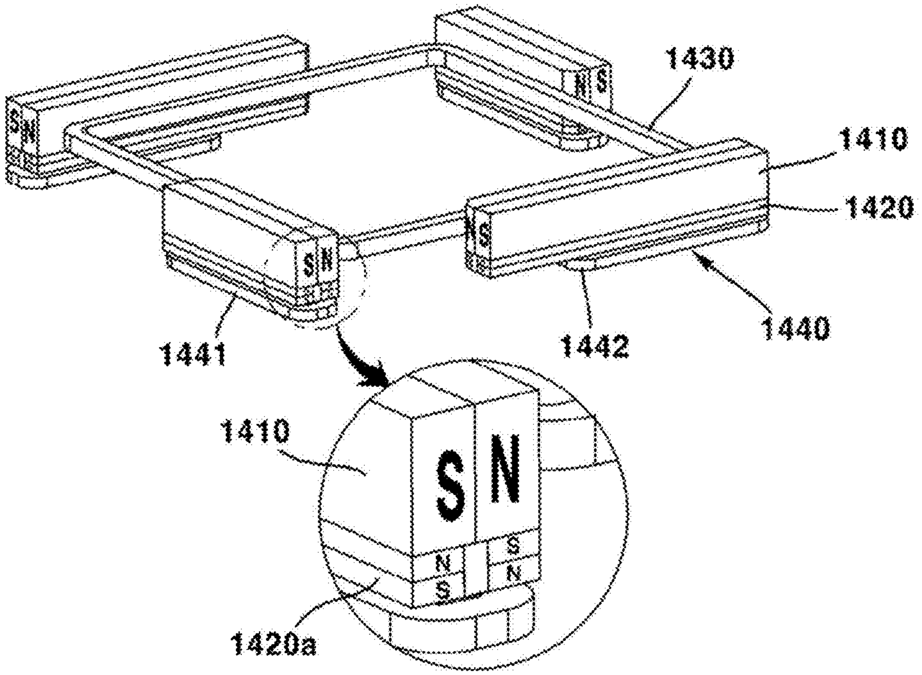
FIG. 54 is a perspective view illustrating an arrangement of the coil and a magnet of a camera device of a second embodiment of the present invention.

FIG. 31 is a perspective view of a camera device according to a second embodiment of the present invention; FIG. 32 is a perspective view of a camera device according to a second embodiment of the present invention with some components omitted; FIG. 33 is a side view of a camera device according to a second embodiment of the present invention; FIG. 34 is a plan view of a camera device according to a second embodiment of the present invention; FIG. 35 is a cross-sectional view and a partially enlarged view viewed from A-A in FIG. 34; FIG. 36 is a cross-sectional view taken along line B-B of FIG. 34; FIG. 37 is a cross-sectional view taken along line C-C of FIG. 34; FIG. 38 is an exploded perspective view of a camera device according to a second embodiment of the present invention; FIG. 39 is an exploded perspective view of a camera device according to a second embodiment of the present invention viewed from a direction different from that of FIG. 38; FIG. is an exploded perspective view of a first moving part and related components of a camera device according to a second embodiment of the present invention; FIG. 41 is an exploded perspective view of a second moving part and related components of a camera device according to a second embodiment of the present invention; FIG. 42 is a perspective view and a partially enlarged view illustrating a hole and related components of a first substrate of a camera device according to a second embodiment of the present invention; FIG. 43(*a*) is a perspective view of a pin member of a second embodiment of the present invention, and (b) is a side view; FIG. 44 is a perspective view illustrating a conductive member disposed in a pin member of a second embodiment of the present invention; FIG. 45 is a cross-sectional view illustrating a pin member disposed in a hole of the first substrate in a second embodiment of the present invention; FIG. 46(*a*) is a bottom perspective view of a camera device according to a second embodiment of the present invention, and (b) is a side view illustrating an arrangement of a pin member and a stiffener; FIG. 52 is a diagram illustrating how a conductive member connects a terminal of a pin member and a connection substrate after a hot air process; FIG. 53 is a diagram illustrating an arrangement of pin members according to a modified embodiment; In more detail, FIG. 53(*a*) is a diagram illustrating pluralities of pin members connected to one another in a modified embodiment; FIG. 53(*b*) is a diagram illustrating a state in which a portion of a connection part is removed so that pluralities of pin members are separated from one another in a modified embodiment; and FIG. 54 is a perspective view illustrating an arrangement of the coil and a magnet of a camera device of a second embodiment of the present invention.

The camera device 1010 can photograph one or more of images and videos. The camera device 1010 may be a camera. The camera device 1010 may be a camera module. The camera device 1010 may be a camera assembly. The camera device 1010 may be a camera unit. The camera device 1010 may comprise a lens driving device. The camera device 1010 may comprise a sensor driving device. The camera device 1010 may comprise a voice coil motor (VCM). The camera device 1010 may comprise an autofocus assembly. The camera device 1010 may comprise an image stabilization assembly. The camera device 1010 may comprise an autofocus device. The camera device 1010 may comprise an image stabilization device. The camera device 1010 may comprise an actuator. The camera device 1010 may comprise a lens driving actuator. The camera device 1010 may comprise a sensor-driven actuator. The camera device 1010 may comprise an autofocus actuator. The camera device 1010 may comprise an image stabilization actuator.

The camera device 1010 may comprise a fixed part 1100. The fixed part 1100 may be a relatively fixed portion when the moving parts 1200 and 1300 move. The fixed part 1100 may be a relatively fixed portion when at least one of the first moving part 1200 and the second moving part 1300 moves. The fixed part 1100 can accommodate the first moving part 1200 and the second moving part 1300. The fixed part 1100 may be disposed outside the first moving part 1200 and the second moving part 1300.

Throughout the specification, the first substrate 1110 is described as a component of the fixed part 1100, but the first substrate 1110 may be understood as a separate component from the fixed part 1100. The fixed part 1100 may be disposed in the first substrate 1110. The fixed part 1100 may be disposed on the first substrate 1110. The fixed part 1100 may be disposed above the first substrate 1110.

The camera device 1010 may comprise a first substrate 1110. The fixed part 1100 may comprise a first substrate 1110. The first substrate 1110 may be a main substrate. The first substrate 1110 may be a substrate. The first substrate 1110 may be a printed circuit board (PCB). The first substrate 1110 may be connected to a power source of the optical apparatus 1001. The first substrate 1110 may comprise a connector connected to a power source of the optical apparatus 1001. The first substrate 1110 may be spaced apart from the second substrate 1310.

The first substrate 1110 may comprise a hole 1111. The hole 1111 may be disposed at a location corresponding to the first terminal 1631 of the connection substrate 1600. A pin member 1150 may be disposed in the hole 1111. The hole 1111 may penetrate the first substrate 1110 in an optical axis direction. A conductive member 1155 may be disposed in the hole 1111. A conductive layer may be exposed on an inner circumferential surface of the hole 1111. The hole 1111 may comprise a terminal.

The hole 1111 may comprise a plurality of holes. The diameter of each of the plurality of holes (see a in FIG. 42) may be smaller than the spacing between the plurality of holes (see b in FIG. 42). At this time, the distance between the plurality of holes may be the distance from the edge of the hole to the edge of another adjacent hole. Or, the spacing between the plurality of holes may be the spacing between the centers of the holes and other adjacent holes. In a modified embodiment, the diameter of each of the plurality of holes may be equal to the spacing between the plurality of holes. Or, the diameter of each of the plurality of holes may be larger than the spacing between the plurality of holes. The diameter of the hole 1111 may be 0.3 mm. The thickness of the first substrate 1110 in an optical axis direction may be 0.24 mm. The diameter of the hole 1111 may be larger than the thickness of the first substrate 1110 in an optical axis direction. The thickness of the first substrate 1110 may be 75 to 85% of the diameter of the hole 1111. The thickness of the first substrate 1110 may be 77 to 83% of the diameter of the hole 1111. The diameter of the holes 1111 may be 30 to 70% of the spacing between the holes 1111. The diameter of the holes 1111 may be to 60% of the spacing between the holes 1111. The diameter of the holes 1111 may be 45 to 55% of the spacing between the holes 1111.

The first substrate 1110 may comprise an insulation layer. The first substrate 1110 may comprise a conductive layer. The first substrate 1110 may comprise an open region 1112. The open region 1112 may be formed around the hole 1111 of the first substrate 1110. The open region 1112 may be a portion in which the insulation layer is omitted and the conductive layer is open. The open region 1112 may be opened upward. The open region 1112 may lead to the inner circumferential surface. The open region 1112 may comprise an upper surface and an inner circumferential surface. Furthermore, the open region 1112 can be extended up to a lower surface. The open region 1112 may be a terminal of the first substrate 1110. The open region 1112 may be a pad of the first substrate 1110. The open region 1112 may be in the form of a circular penetratingly processed pad. The width of the open region 1112 (see d in FIG. 42) may be 0.05 mm.

In the second embodiment of the present invention, the configuration is a change in the form of the RPCB PAD, so that it is in the form of a circular through-processed pad (PAD), unlike the general pad (PAD) in which the black coverlay, which is a general configuration of the RPCB, is exposed. Unlike the lens shift camera device, the sensor shift camera device creates an additional portion connecting the image sensor 1330 and the first substrate 1110, which is a module connector PCB, because the image sensor 1330 moves. At this time, the number of soldering required to make an electrical connection through soldering is approximately four times greater than the existing specification, and precise soldering is required to connect them.

For this purpose, a circular penetrating pad (PAD) can be applied for inserting a lead pin. Solder balls may be 0.40 to 0.45 mm. The size of the pad of the connection substrate (FPCB) attached to the actuator or voice coil motor (VCM) can be up to 0.35 mm, and the gap between pads can be around 0.6 mm.

The circular penetrating pad (PAD) of the first substrate 1110 was designed to have a maximum diameter of 0.3 mm, and considering the black coverlay attachment tolerance, the upper end surface was designed with a clearance of 0.05 mm on one side, it can be formed up to a maximum of 0.4 mm. To prevent soldering short, the pitch between pads can be designed at 0.6 mm. The diameter of the pad of the first substrate 1110 may be 0.35 to 0.45 mm. In addition, the spacing between pads may be 0.55 to 0.65 mm. The diameter of the pads of the first substrate 1110 may be 50 to 80% of the gap between pads. The diameter of the pads of the first substrate 1110 may be 55 to 75% of the gap between pads. The diameter of the pads of the first substrate 1110 may be 60 to 70% of the gap between pads. At this time, the pad (PAD) may comprise the inner circumferential surface of the hole 1111 of the first substrate 1110 and the open region 1112 of the upper surface of the first substrate 1110. Or, the pad (PAD) may refer to the inner circumferential surface of the hole 1111 of the first substrate 1110.

The camera device 1010 may comprise a base 1120. The fixed part 1100 may comprise a base 1120. The base 1120 may be disposed in the first substrate 1110. The base 1120 may be disposed on the first substrate 1110. The base 1120 may be disposed above the first substrate 1110. The base 1120 may be fixed to the first substrate 1110. The base 1120 may be coupled to the first substrate 1110. The base 1120 may be attached to the first substrate 1110 using an adhesive. The base 1120 may be disposed between the first substrate 1110 and the housing 1130. The base 1120 may be disposed to be in contact with an upper surface of the first substrate 1110. The base 1120 may be disposed to be spaced apart above the first substrate 1110.

The connection substrate 1600 may be disposed in the base 1120. The connection substrate 1600 may be connected to the base 1120. The connection substrate 1600 may be fixed to the base 1120. The connection substrate 1600 may be coupled to the base 1120. The connection substrate 1600 may be attached to the base 1120. The connection substrate 1600 may be fixed to the base 1120 with an adhesive. The connection substrate 1600 may be in contact with the base 1120.

The base 1120 may comprise a protruding portion 1121. The base 1120 may comprise a protruding portion 1121 being protruded upward. The protruding portion 1121 may be protruded from an upper surface of the base 1120. The protruding portion 1121 may be protruded upward from an outer surface of the base 1120. The connection substrate 1600 may be disposed in the protruding portion 1121 of the base 1120. The connection substrate 1600 may be connected to the protruding portion 1121 of the base 1120. The connection substrate 1600 may be fixed to the protruding portion 1121 of the base 1120. The connection substrate 1600 may be coupled to the protruding portion 1121 of the base 1120. The connection substrate 1600 may be attached to the protruding portion 1121 of the base 1120. The connection substrate 1600 may be fixed to the protruding portion 1121 of the base 1120 with an adhesive. The connection substrate 1600 may be in contact with the protruding portion 1121 of the base 1120. A protruding structure of the base 1120 may be formed in the base 1120 for assembly of the connection substrate 1600.

The terminal portion 1630 of the connection substrate 1600 may be disposed in the protruding portion 1121 of the base 1120. The terminal portion 1630 of the connection substrate 1600 may be connected to the protruding portion 1121 of the base 1120. The terminal portion 1630 of the connection substrate 1600 may be fixed to the protruding portion 1121 of the base 1120. The terminal portion 1630 of the connection substrate 1600 may be coupled to the protruding portion 1121 of the base 1120. The terminal portion 1630 of the connection substrate 1600 may be attached to the protruding portion 1121 of the base 1120. The terminal portion 1630 of the connection substrate 1600 may be fixed to the protruding portion 1121 of the base 1120 with an adhesive. The terminal portion 1630 of the connection substrate 1600 may be in contact with the protruding portion 1121 of the base 1120.

The camera device 1010 may comprise a housing 1130. The fixed part 1100 may comprise a housing 1130. The housing 1130 may be disposed in base 1120. The housing 1130 may be disposed on base 1120. The housing 1130 may be disposed above the base 1120. The housing 1130 may be fixed to base 1120. The housing 1130 may be fixed to the first cover member 1140. The housing 1130 may be coupled to base 1120. The housing 1130 may be attached to the base 1120 with an adhesive. The housing 1130 may be disposed on the first substrate 1110. The housing 1130 may be disposed above the first substrate 1110. The housing 1130 may be formed as a separate member from the base 1120. The housing 1130 may be disposed on the holder 1340. The housing 1130 may be disposed between the base 1120 and the first cover member 1140. The housing 1130 may remain fixed without moving during AF driving. The housing 1130 may remain fixed without moving during OIS driving.

The housing 1130 may comprise a first side surface and a second side surface being disposed to be opposite to each other and a third side surface and a fourth side surface being disposed to be opposite to each other. A wing portion may be formed on each of a first side surface and a second side surface of the housing 1130. A protruding portion 1132 may be formed on each of a third side surface and a fourth side surface of the housing 1130.

The housing 1130 may comprise a wing portion. The wing portion may be disposed between the connection substrate 1600 and the side plate of the first cover member 1140. At least a portion of the terminal portion 1630 of the connection substrate 1600 may be disposed between the protruding portion 1121 of the base 1120 and the wing portion of the housing 1130. The wing portion may be a wing structure. The wing portion can block foreign substances from entering between the connection substrate 1600 and the side plate of the first cover member 1140. The wing portion can alleviate external shock applied to the side plate of the first cover member 1140. The housing 1130 may be formed of an insulating member. The wing portion may be a spacer portion. The wing portion may be a sealing portion. The wing portion may be a compensation portion. The wing portion may be an extension portion. The wing portion may comprise a horizontal extension portion and a vertical extension portion being extended downward from the horizontal extension portion. The wing portion may comprise a first portion being extended in a first direction, and a second portion being extended from the first portion in a second direction different from the first direction. The wing portion may be spaced apart from the protruding portion 1121 of the base 1120. The wing portion may be spaced apart from the protruding portion 1121 of the base 1120 inside a tolerance range. Or, the wing portion may be in contact with the protruding portion 1121 of the base 1120. The wing portion may be coupled with the protruding portion 1121 of the base 1120. The horizontal width of an upper portion of the wing portion may correspond to the width of the shortest portion among the horizontal widths of the terminal portion 1630 of the connection substrate 1600. Or, the horizontal width of the upper portion of the wing portion may be longer than the horizontal width of the terminal portion 1630 of the connection substrate 1600. The horizontal width of the upper portion of the wing portion may be shorter than the width of the shortest portion among the horizontal widths of the terminal portion 1630 of the connection substrate 1600. The wing portion may be disposed for sealing only on a side where the terminal portion 1630 is exposed.

In the sensor shift OIS actuator using the FPCB of the connection substrate 1600, a required separation distance may be required for the FPCB to drive. At this time, the required separation distance may be the separation distance between the FPCB and the stop part. In other words, a separation distance vulnerable to foreign substances may be created. However, due to the difficulty in applying the separation distance sealing structure, vulnerability to foreign matter defects may occur.

In a second embodiment of the present invention, the wing portion, which is a wing structure descending from the housing 1130, may be inserted between the first cover member 1140 and the connection substrate 1600, which serves as a side surface stopper. In a modified embodiment, a separate spacing member may be disposed instead of the wing portion descending from the housing 1130.

The sealing structure can be completed by inserting the wing structure deployed from the housing 1130, which is an essential fixing structure, into the space between the connection substrate 1600 and the side plate of the first cover member 1140. Through this, the product can be protected from external shock and foreign matter intrusion.

The housing 1130 may comprise a hole. The hole may be a wire passing hole. A wire 1800 may be disposed in the hole. The wire 1800 may pass through the hole. The wire 1800 may penetrate the hole. The hole may be formed to have a larger diameter than the wire 1800 so as not to interfere with the wire 1800.

The camera device 1010 may comprise a cover member 1140. The fixed part 1100 may comprise a cover member 1140. The cover member 1140 may be disposed in the base 1140. The cover member 1140 may be disposed on the base 1140. The cover member 1140 may be fixed to the base 1120. The cover member 1140 may be coupled to the base 1120. The cover member 1140 may be coupled to the housing 1130. The cover member 1140 may be coupled to the first substrate 1110. The cover member 1140 may be fixed to the base 1120. The cover member 1140 may be fixed to the housing 1130. The cover member 1140 may be fixed to the first substrate 1110. The cover member 1140 may cover at least a portion of the base 1120. The cover member 1140 may cover at least a portion of the housing 1130. The cover member 1140 can accommodate the housing 1130 therein.

The cover member 1140 may be a 'cover can' or a 'shield can'. The cover member 1140 may be formed of a metal material. The cover member 1140 can block electromagnetic interference (EMI). The cover member 1140 may be electrically connected to the first substrate 1110. The cover member 1140 may be grounded to the first substrate 1110.

The cover member 1140 may comprise an upper plate. The cover member 1140 may comprise a hole formed in the upper plate. The hole may be formed at a location corresponding to the lens 1220. The cover member 1140 may comprise a side plate. The side plate may comprise pluralities of side plates. The side plate may comprise four side plates. The side plate may comprise first to fourth side plates. The side plates may comprise first and second side plates being disposed to be opposite to each other, and third and fourth side plates being disposed to be opposite to each other. The cover member 1140 may comprise pluralities of corners between the pluralities of side plates.

The cover member 1140 may comprise a ground terminal. The ground terminal may be extended downward from the side plate. The ground terminal may be coupled to the first substrate 1110. The ground terminal may be connected to the first substrate 1110. The ground terminal may be electrically connected to the first substrate 1110. The ground terminal may be coupled to the first substrate 1110 and a conductive member. The ground terminal may be soldered to the terminal of the first substrate 1110. The cover member 1140 may be electrically connected to the first substrate 1110. The cover member 1140 may be grounded to the first substrate 1110.

The ground terminal of the cover member 1140 may be disposed at a position corresponding to the groove of the base 1120. Or, in a modified embodiment, the ground terminal **1144*a* may be bent. The ground terminal 1144*a* may be bent inward. At least a portion of the ground terminal 1144*a* may be bent inward and disposed inside the groove of the base 1120**.

Throughout the specification, the cover member 1140 is described as a component of the fixed part 1100, but the cover member 1140 may be understood as a separate component from the fixed part 1100. The cover member 1140 may be coupled with the fixed part 1100. The cover member 1140 may cover the first moving part 1200.

The camera device 1010 may comprise a control unit. The control unit may be disposed in the first substrate 1110. The control unit may be disposed next to the cover member 1140. The control unit may comprise an individual shield can that is smaller than the cover member 1140. The control unit may comprise a driver IC. The control unit may comprise an OIS driver IC that applies current to the second coil 1440. The control unit may control the operation of the camera device 1010.

The camera device 1010 may comprise a pin member 1150. The fixed part 1100 may comprise a pin member 1150. The pin member 1150 may be a connector pin. The pin member 1150 may be a pin array. The pin member 1150 may be disposed in the hole 1150 of the first substrate 1150. The pin member 1150 may electrically connect the first terminal 1631 of the connection substrate 1600 and the first substrate 1110. The pin member 1150 may be formed as a conductive member. The pin member 1150 may be formed of metal. The pin member 1150 may be formed of a brass alloy plated with tin. The cross-sectional size of the leg of the pin member 1150 may be 0.1*0.15 $mm^2$. Or, the cross-sectional size of the leg of the pin member 1150 may be 0.15*0.15 $mm^2$. The pin member 1150 may be formed as a set of 12 pins at pitch intervals of 0.6 mm. The leg of the pin member 1150 may be collectively referred to as first to third portions 1151, 1152, and 1153. The bending angle of the lead of the pin member 1150 is a right angle and may be formed with a curvature R of 0.1. The length of the bent lead may not exceed ½ of the length, in an optical axis direction, of the first terminal 1631 of the connection substrate 1600 of the VCM when finally attached to the first substrate 1110.

The pin member 1150 may comprise a plurality of pins. The plurality of pins may be formed in one set of 12 pins. The plurality of pins can be formed in one set of 12 pins, or 4 sets, for a total of 48 pins. Twenty-four of the plurality of pins may be disposed on one side of the first substrate 1110, and the other 24 pins may be disposed on the other side of the first substrate 1110.

A cream solder, which is solder paste, may be applied to the pin array. At this time, a metal mask may be used. The length of the conductive member 1155 can cover all of the second portion 1152 and the third portion 1153 in an optical axis direction, and the width can be formed to have a diameter of up to 0.25 mm.

The pin member 1150 may comprise a first portion 1151. The first portion 1151 may be disposed below the first substrate 1110. The end portion of the first portion 1151 may face outward. The fourth portion 1154 may be disposed on the end portion of the first portion 1151. After the pin member 1150 is inserted into the hole 1111 of the first substrate 1110, the fourth portion 1154 can be removed. After this, the end portion of the first portion 1151 may be formed as a free end. At this time, the end portion of the first portion 1151 may face outward. Removal of the fourth portion 1154 may be done by laser cutting at the edge of the first substrate 1110.

The pin member 1150 may comprise a second portion 1152. The second portion 1152 may be disposed in the hole 1111 of the first substrate 1110. The second portion 1152 may be bent roundly and extended from the first portion 1151. The second portion 1152 can be bent from the first portion 1151. The second portion 1152 may be bent from the first portion 1151. The second portion 1152 may be formed to have a first length in an optical axis direction (see a in FIG. 43).

The pin member 1150 may comprise a third portion 1153. The third portion 1153 may be protruded more upward than the first substrate 1110. The upper end of the third portion 1153 of the pin member 1150 (see a in FIG. 45) may be disposed at a location corresponding to the middle region (see b in FIG. 45) in an optical axis direction of the first terminal 1631 of the connection substrate 1600, or at a lower position. It may be formed as a second length (see b in FIG. 43) in an optical axis direction of the third portion 1153. The second length of the third portion 1153 may be the same as the first length of the second portion 1152. Or, the second length of the third portion 1153 may be greater than the first length of the second portion 1152. Alternatively, the second length of the third portion 1153 may be smaller than the first length of the second portion 1152.

The camera device 1010 may comprise adhesive. The camera device 1010 may comprise epoxy. The camera device 1010 may comprise a fixed member. The adhesive can fix the third portion 1153 of the pin member 1150 to a lower surface of the first substrate 1110. The adhesive may be an epoxy.

The pin member 1150 may comprise a fourth portion 1154. The fourth portion 1154 can connect a plurality of pins to each other so that the plurality of pins is not separated from one another. The fourth portion 1154 may be removed after the pin member 1150 is coupled to the first substrate 1110. The fourth portion 1154 is disposed outside the first substrate 1110 and can be removed at once through laser cutting.

In a modified embodiment as illustrated in FIG. 53, the fourth portion 1154*a* of the pin member 1150 may be disposed more inward than the first portion 1111 of the first substrate 1110. In this case, a portion of the fourth portion 1154*a* between the plurality of pin members is removed so that short circuits between a plurality of pins can be prevented. In the case of a modified embodiment, since the area of the pin member 1150 in contact with a lower surface of the first substrate 1110 is larger compared to a second embodiment of the present invention, the pin member 1150 can be more firmly fixed to the first substrate 1110 than in a second embodiment of the present invention. However, the process of removing the fourth portion 1154*a* of the pin member 1150 may be easier in a second embodiment of the present invention.

The camera device 1010 may comprise a conductive member 1155. The fixed part 1100 may comprise a conductive member 1155. The conductive member 1155 may be disposed in the pin member 1150. The conductive member 1155 may be disposed on at least a portion of the second portion 1152 and the third portion 1153 of the pin member 1150. The diameter of the conductive member 1155 in a direction perpendicular to the optical axis may be smaller than the diameter of the hole 1111 of the first substrate 1110. Through this structure, the conductive member 1155 can be inserted into the hole 1111 of the first substrate 1110 while being applied to the pin member 1150. The diameter of the conductive member 1155 may be 0.25 mm. The diameter of the hole 1111 of the first substrate 1110 may be 0.3 mm. The diameter of the conductive member 1155 may be 80 to 85% of the diameter of the hole 1111 of the first substrate 1110. The diameter of the conductive member 1155 may be 82 to 84% of the diameter of the hole 1111 of the first substrate 1110.

The conductive member 1155 may be a solder. The conductive member 1155 may comprise a solder. The conductive member 1155 may comprise cream solder. The conductive member 1155 can be connected to the terminal 1631 of the connection substrate 1600 by hot air. In the case of soldering using hot air, multiple lines being soldered are performed simultaneously, so the process time can be reduced compared to performing each soldering point individually.

The camera device 1010 may comprise a stiffener 1160. The fixed part 1100 may comprise a stiffener 1160. The stiffener 1160 may be disposed on a lower surface of the first substrate 1110. In an optical axis direction, the thickness of the stiffener 1160 may be thicker than the thickness of the first portion 1151 of the pin member 1150 or may be equal to the thickness of the first portion 1151 of the pin member 1150. In a second embodiment of the present invention, when attaching a lead pin, a height difference occurs at the bottom surface of the camera device, and the difference can be compensated by attaching 0.1 mm (T) of a lower surface SUS stiffener 1160 of the first substrate 1110 thereto.

The camera device 1010 may comprise a first moving part 1200. The first moving part 1200 can move with respect to the fixed part 1100. The first moving part 200 can move in an optical axis direction based on the fixed part 1100. The first moving part 1200 can be disposed inside the fixed part 1100. The first moving part 1200 may be movably disposed inside the fixed part 1100. The first moving part 1200 may be movably disposed inside the fixed part 1100 in an optical axis direction. An autofocus (AF) function may be performed as the first moving part 1200 moves in an optical axis direction with respect to the fixed part 1100. The first moving part 1200 may be disposed on the second moving part 1300.

The camera device 1010 may comprise a bobbin 1210. The first moving part 1200 may comprise a bobbin 1210. The bobbin 1210 may be disposed on the first substrate 1110. The bobbin 1210 may be disposed above the first substrate 1110. The bobbin 1210 may be disposed to be spaced apart above the first substrate 1110. The bobbin 1210 may be disposed inside the housing 1130. The bobbin 1210 may be disposed at an inner side of the housing 1130. At least a portion of the bobbin 1210 may be accommodated in the housing 1130. The bobbin 1210 may be movably disposed in the housing 1130. The bobbin 1210 may be movably disposed in the housing 1130 in an optical axis direction. The bobbin 1210 may be coupled with the lens 1220. The bobbin 1210 may comprise a hollow or a hole. The lens 1220 may be disposed in the hollow or hole of the bobbin 1210. The outer circumferential surface of the lens 1220 may be coupled to the inner circumferential surface of the bobbin 1210.

The camera device 1010 may comprise a lens 1220. The first moving part 1200 may comprise a lens 1220. The lens 1220 may be coupled to bobbin 1210. The lens 1220 may be fixed to bobbin 1210. The lens 1220 can move integrally with the bobbin 1210. The lens 1220 may be screw-coupled to bobbin 1210. The lens 1220 may be attached to the bobbin 1210 using an adhesive. The lens 1220 may be disposed at a location corresponding to the image sensor 1330. The optical axis of the lens 1220 may coincide with the optical axis of the image sensor 1330. The optical axis may be a z-axis. The lens 1220 may comprise pluralities of lenses. The lens 1220 may comprise a 5-element or a 6-element lens.

The camera device 1010 may comprise a lens module. The lens module may be coupled to the bobbin 1210. The lens module may comprise a barrel and one or more lenses 1220 being disposed inside the barrel.

The camera device 1010 may comprise a second moving part 1300. The second moving part 1300 can move with respect to the fixed part 1100. The second moving part 1300 can move in a direction perpendicular to the optical axis direction based on the fixed part 1100. The second moving part 1300 can be disposed inside the fixed part 1100. The second moving part 1300 can be movably disposed inside the fixed part 1100. The second moving part 1300 may be movably disposed inside the fixed part 1100 in a direction perpendicular to the optical axis direction. Optical image stabilization (OIS) function may be performed by the second moving part 1300 moving in a direction perpendicular to the optical axis direction with respect to the fixed part 1100. The second moving part 1300 may be disposed between the first moving part 1200 and the first substrate 1110.

The camera device 1010 may comprise a second substrate 1310. The second moving part 1300 may comprise a second substrate 1310. The second substrate 1310 may be a substrate. The second substrate 1310 may be a printed circuit board (PCB). The second substrate 1310 may be disposed in the first substrate 1110. The second substrate 1310 may be disposed on the first substrate 1110. The second substrate 1310 may be spaced apart from the first substrate 1110. The second substrate 1310 may be disposed between the first moving part 1200 and the first substrate 1110. The second substrate 1310 may be disposed between the bobbin 1210 and the first substrate 1110. The second substrate 1310 may be disposed between the lens 1220 and the first substrate 1110. The second substrate 1310 may be spaced apart from the fixed part 1100. The second substrate 1310 may be spaced apart from the fixed part 1100 in an optical axis direction and in a direction perpendicular to the optical axis direction. The second substrate 1310 may move in a direction perpendicular to the optical axis direction. The second substrate 1310 may be electrically connected to the image sensor 1330. The second substrate 1310 can be moved integrally with the image sensor 1330. The second substrate 1310 may comprise a hole. The image sensor 1330 may be disposed in the hole of the second substrate 1310. The second substrate 1310 may be coupled to an upper surface of the third substrate 1320. The second substrate 1310 may be disposed on an upper surface of the third substrate 1320. The second substrate 1310 may be fixed to an upper surface of the third substrate 1320. The second substrate 1310 may be spaced apart from the housing 1130. The second substrate 1310 may be disposed in the holder 1340.

The second substrate 1310 may comprise a terminal 1311. The terminal 1311 may be disposed on a lower surface of the second substrate 1310. The terminal 1311 may be coupled to a terminal of the sensor substrate 1320. The second substrate 1310 may be formed separately from the sensor substrate 1320. The second substrate 1310 may be formed separately from the sensor substrate 1320 to be coupled. The terminal of the sensor substrate 1320 may be soldered to the terminal 1311 of the second substrate 1310.

The camera device 1010 may comprise a sensor substrate 1320. The second moving part 1300 may comprise a sensor substrate 1320. The sensor substrate 1320 may be a substrate. The sensor substrate 1320 may be a printed circuit board (PCB). The sensor substrate 1320 may be coupled with the image sensor 1330. The sensor substrate 1320 may be coupled to the second substrate 1310.

The sensor substrate 1320 may comprise a hole. The hole may be hollow. The image sensor 1330 may be disposed in the hole of the sensor substrate 1320. A portion of the plate member 1370 may be disposed in the hole of the sensor substrate 1320. The protruding portion 1374 of the plate member 1370 may be disposed in the hole of the sensor substrate 1320. The hole of the sensor substrate 1320 may be formed in a size and shape corresponding to the protruding portion 1374 of the plate member 1370.

The sensor substrate 1320 may comprise a terminal. The terminal of the sensor substrate 1320 may be coupled to the terminal 1311 of the second substrate 1310. The sensor substrate 1320 may be coupled to a lower surface of the second substrate 1310. The sensor substrate 1320 may be disposed below the second substrate 1310. The sensor substrate 1320 may be coupled below the second substrate 1310 with the image sensor 1330 being coupled thereto.

The camera device 1010 may comprise an image sensor 1330. The second moving part 1300 may comprise an image sensor 1330. The image sensor 1330 may be disposed in the sensor substrate 1320. The image sensor 1330 may be disposed between the sensor substrate 1320 and the sensor base 1350. The image sensor 1330 may be disposed inside the base 1120. The image sensor 1330 may be electrically connected to the second substrate 1310. The image sensor 1330 can move integrally with the second substrate 1310. The image sensor 1330 may be disposed below the lens 1220. The image sensor 1330 may be disposed in the plate member 1370 and electrically connected to the sensor substrate 1320 through wire bonding. The image sensor 1330 may be movably disposed. The image sensor 1330 may move in a direction perpendicular to the optical axis direction. The image sensor 1330 may rotate about an optical axis.

Light passing through the lens 1220 and the filter 1360 may be incident on the image sensor 1330 to form an image. The image sensor 1330 may be electrically connected to the sensor substrate 1320, the second substrate 1310, and the first substrate 1110. The image sensor 1330 may comprise an effective image area. The image sensor 1330 can convert light irradiated to the effective image area into an electrical signal. The image sensor 1330 may comprise one or more among a charge coupled device (CCD), a metal oxide semiconductor (MOS), a CPD, and a CID.

The camera device 1010 may comprise a holder 1340. The second moving part 1300 may comprise a holder 1340. The holder 1340 may be formed of an insulating material. The holder 1340 may be disposed in the second substrate 1310. The holder 1340 may be disposed on the second substrate 1310. The holder 1340 may be disposed above the second substrate 1310. The holder 1340 may be fixed to the second substrate 1310. The holder 1340 may be coupled to the second substrate 1310. The holder 1340 may comprise a hollow or hole in which the image sensor 1330 is disposed. The OIS coil 1440 may be disposed in the holder 1340. The holder 1340 may comprise a protrusion around which the OIS coil 1440 is wound. The holder 1340 may comprise a hole where the sensor 1445 is disposed. The holder 1340 may be spaced apart from the housing 1130. The holder 1340 may move in a direction perpendicular to the optical axis direction or rotate about an optical axis by the interaction of the driving magnet and the OIS coil 1440 together with the image sensor 1330. The holder 1340 is a member on which the OIS coil 1440 is disposed and may be a coil holder.

The connection substrate 1600 may be disposed in the holder 1340. The connection substrate 1600 may be connected to the holder 1340. The connection substrate 1600 may be fixed to the holder 1340. The connection substrate 1600 may be coupled to the holder 1340. The connection substrate 1600 may be attached to the holder 1340. The connection substrate 1600 may be fixed to the holder 1340 with an adhesive. The connection substrate 1600 may be in contact with the holder 1340.

The holder 1340 may comprise a protruding portion 1341. The protruding portion 1341 may be protruded from an upper surface of the holder 1340. The protruding portion 1341 may be protruded upward from an outer side surface of the holder 1340. The connection substrate 1600 may be disposed in the protruding portion 1341 of the holder 1340. The connection substrate 1600 may be connected to the protruding portion 1341 of the holder 1340. The connection substrate 1600 may be fixed to the protruding portion 1341 of the holder 1340. The connection substrate 1600 may be coupled to the protruding portion 1341 of the holder 1340. The connection substrate 1600 may be attached to the protruding portion 1341 of the holder 1340. The connection substrate 1600 may be fixed to the protruding portion 1341 of the holder 1340 with an adhesive. The connection substrate 1600 may be in contact with the protruding portion 1341 of the holder 1340.

The camera device 1010 may comprise a sensor base 1350. The second moving part 1300 may comprise a sensor base 1350. The sensor base 1350 may be disposed in the third substrate 1320. The sensor base 1350 may comprise a hole being formed at a position corresponding to the image sensor 1330. The sensor base 1350 may comprise a groove in which the filter 1360 is disposed.

The camera device 1010 may comprise a filter 1360. The second moving part 1300 may comprise a filter 1360. The filter 1360 may be disposed between the lens 1220 and the image sensor 1330. The filter 1360 may be disposed in the sensor base 1350. The filter 1360 may block light in a specific frequency band from light passing through the lens 1220 from entering the image sensor 1330. The filter 1360 may comprise an infrared blocking filter. The filter 1360 may block infrared rays from being incident on the image sensor 1330.

The camera device 1010 may comprise a plate member 1370. The second moving part 1300 may comprise a plate member 1370. The plate member 1370 may be SUS. The plate member 1370 may be formed of SUS. The plate member 1370 may be formed of a copper alloy. The plate member 1370 may comprise copper. The plate member 1370 may be a reinforcement plate. The plate member 1370 may be a stiffener. The plate member 1370 may be coupled to the lower surface of the sensor substrate 1320. The plate member 1370 may be disposed on the lower surface of the sensor substrate 1320. The plate member 1370 may be in contact with the lower surface of the sensor substrate 1320. The plate member 1370 may be fixed to the lower surface of the sensor substrate 1320. The plate member 1370 may be attached to a lower surface of the sensor substrate 1320 with an adhesive.

In a second embodiment of the present invention, the image sensor 1330 may be disposed directly in the plate member 1370. Meanwhile, the flatness of the plate member 1370 may be easier to manage than that of the sensor substrate 1320. Through this, the flatness of the mounting surface of the image sensor 1330 can be easily managed. The image sensor 1330 may be electrically connected to the sensor substrate 1320 through wire bonding. The image sensor 1330 may be electrically connected to the sensor substrate 1320.

The camera device 1010 may comprise a coupling member 1380. The second moving part 1300 may comprise a coupling member 1380. The coupling member 1380 may be disposed in the holder 1340. The coupling member 1380 may be coupled to the wire 1800. The coupling member 1380 may be connected to the wire 1800 through soldering. The coupling member 1380 may be formed of metal. The coupling member 1380 may comprise a hole through which the wire 1800 passes. The coupling member 1380 may comprise a buffer portion to relieve impact. The coupling member 1380 may comprise a shape that is bent multiple times. The coupling member 1380 may comprise pluralities of terminals. The coupling member 1380 may comprise four terminals being disposed in four corner regions of the holder 1340. The coupling member 1380 may be a metal plate. The coupling member 1380 may be formed of metal. The coupling member 1380 may be a plate. The coupling member 1380 may be a terminal member. The coupling member 1380 may be a terminal.

In a modified embodiment, the coupling member 1380 may be omitted. For an example, the lower end portion of the wire 1800 may be coupled to the base 1120. The base 1120 may comprise a surface electrode for coupling to the wire 1800. The lower end portion of the wire 1800 may be soldered to the surface electrode of the base 1120.

The camera device 1010 may comprise a drive unit. The drive unit can move the moving parts 1200 and 1300 with respect to the fixed part 1100. The drive unit can perform an autofocus (AF) function. The drive unit can perform image stabilization (OIS) function. The drive unit can move the lens 1220. The drive unit may move the image sensor 1330. The drive unit may comprise a magnet and a coil. The drive unit may comprise shape memory alloy (SMA).

The drive unit may comprise a driving magnet. The driving magnet may be disposed in the housing. The driving magnet may comprise pluralities of magnets. The driving magnet may comprise first to fourth magnets. The driving magnet may comprise first and second magnets being disposed to be opposite to each other. The driving magnet may comprise third and fourth magnets being disposed to be opposite to each other.

The distance between the first magnet and the third magnet may be different from the distance between the first magnet and the fourth magnet. The distance between the first magnet and the third magnet may be greater than the distance between the first magnet and the fourth magnet. The distance between the second magnet and the fourth magnet may be different from the distance between the second magnet and the third magnet. The distance between the second magnet and the fourth magnet may be greater than the distance between the second magnet and the third magnet. In a modified embodiment, the distance between the first magnet and the third magnet may be shorter than the distance between the first magnet and the fourth magnet. The distance between the second magnet and the fourth magnet may be shorter than the distance between the second magnet and the third magnet.

The sensing magnet 1450 may be disposed between the first magnet and the third magnet. The sensing magnet 1450 may be overlapped with the first magnet and the third magnet in a direction perpendicular to the optical axis direction. The sensing magnet 1450 may be overlapped with the first magnet in a direction perpendicular to the optical axis direction. The sensing magnet 1450 may be overlapped with the third magnet in a direction perpendicular to the optical axis direction. The sensing magnet 1450 may be overlapped with the first magnet and the third magnet in a first direction perpendicular to the optical axis direction. The sensing magnet 1450 may be disposed on a virtual straight line connecting the first magnet and the third magnet.

The sensing magnet 1450 may be overlapped with the third magnet in a direction perpendicular to an inner surface of the first magnet. The sensing magnet 1450 may be overlapped with the first magnet in a direction perpendicular to an inner surface of the first magnet.

The correction magnet 1460 may be disposed between the second magnet and the fourth magnet. The correction magnet 1460 may be overlapped with the second magnet and the fourth magnet in a direction perpendicular to the optical axis direction. The correction magnet 1460 may be overlapped with the second magnet in a direction perpendicular to the optical axis direction. The correction magnet 1460 may be overlapped with the fourth magnet in a direction perpendicular to the optical axis direction. The correction magnet 1460 may be overlapped with the second magnet and the fourth magnet in a first direction perpendicular to the optical axis direction. The correction magnet 1460 may be disposed on a virtual straight line connecting the second magnet and the fourth magnet.

The correction magnet 1460 may be overlapped with the fourth magnet in a direction perpendicular to the inner surface of the second magnet. The correction magnet 1460 may be overlapped with the second magnet in a direction perpendicular to the inner surface of the second magnet.

Each of the first to fourth magnets may comprise an AF magnet 1410 being disposed at a position corresponding to the AF coil 1430. Each of the first to fourth magnets may comprise an OIS magnet 1420 being disposed at a position corresponding to the OIS coil 1440.

Each of the first to fourth magnets may comprise a first width, which is the length between the inner surface and the outer surface, and a second width, which is the length between both side surfaces. The first width of the first magnet and the first width of the third magnet may be the same. The first width of the second magnet and the first width of the fourth magnet may be the same. The first width of the first magnet and the first width of the second magnet may be the same. The first to fourth magnets may all have the same first width, which is the length between the inner surface and the outer surface.

The second width of the first magnet may be different from the second width of the third magnet. The second width of the first magnet may be longer than the second width of the third magnet. The second width of the second magnet may be longer than the second width of the fourth magnet. In a modified embodiment, the second width of the first magnet may be shorter than the second width of the third magnet. The second width of the second magnet may be shorter than the second width of the fourth magnet.

The camera device 1010 may comprise an AF drive unit. The AF drive unit may be an autofocus drive unit. The AF drive unit may be a drive unit for autofocus operation. The AF drive unit may move the first moving part 1200 in an optical axis direction. The AF drive unit may move the bobbin 1210 in an optical axis direction. The lens 1220 can be moved in an optical axis direction. The lens 1220 may be moved in an optical axis direction with respect to the image sensor 1330. The AF drive unit can perform an autofocus (AF) function. The AF drive unit may move the first moving part 1200 in an upward direction of the optical axis direction. The AF drive unit may move the first moving part 1200 in a downward direction of the optical axis direction.

The camera device 1010 may comprise an OIS drive unit. The OIS drive unit may be an optical image stabilization drive unit. The OIS drive unit may be a drive unit for driving image stabilization. The OIS drive unit can move the second moving part 1300 in a direction perpendicular to the optical axis direction. The OIS drive unit may move the second substrate 1310 in a direction perpendicular to the optical axis direction. The OIS drive unit may move the third substrate 1320 in a direction perpendicular to the optical axis direction. The OIS drive unit may move the image sensor 1330 in a direction perpendicular to the optical axis direction. The OIS drive unit may move the image sensor 1330 in a direction perpendicular to the optical axis direction with respect to the first substrate 1110. The OIS drive unit can move the holder 1340 in a direction perpendicular to the optical axis direction. The OIS drive unit can move the sensor base 1350 in a direction perpendicular to the optical axis direction. The OIS drive unit may move the filter 1360 in a direction perpendicular to the optical axis direction. The OIS drive unit can perform optical image stabilization (OIS) function.

The OIS drive unit may move the second moving part 1300 in a first direction perpendicular to the optical axis direction. The OIS drive unit may move the second moving part 1300 in a second direction perpendicular to the optical axis direction and the first direction. The OIS drive unit can rotate the second moving part 1300 about an optical axis.

In a second embodiment of the present invention, the AF drive unit may comprise an AF coil 1430. The OIS drive unit may comprise an OIS coil 1440. The AF drive unit may comprise an AF magnet 1410. The OIS drive unit may comprise an OIS magnet 1420. In a modified embodiment, the AF drive unit and the OIS drive unit may comprise a driving magnet commonly used for interaction with the AF coil 1430 and the OIS coil 1440. That is, the AF drive unit and the OIS drive unit may comprise individually controlled coils and common magnets.

The camera device 1010 may comprise an AF magnet 1410. The drive unit may comprise an AF magnet 1410. The AF magnet 1410 may be a magnet. The AF magnet 1410 may be a permanent magnet. The AF magnet 1410 may be a common magnet. The AF magnet 1410 can be used for autofocus (AF).

The AF magnet 1410 can be disposed in the fixed part 1100. The AF magnet 1410 can be fixed to the fixed part 1100. The AF magnet 1410 can be coupled to the fixed part 1100. The AF magnet 1410 can be attached to the fixed part 1100 with an adhesive. The AF magnet 1410 may be disposed in the housing 1130. The AF magnet 1410 may be fixed to the housing 1130. The AF magnet 1410 may be coupled to the housing 1130. The AF magnet 1410 may be attached to the housing 1130 with an adhesive. The AF magnet 1410 may be disposed at a corner of the housing 1130. The AF magnet 1410 may be biased toward a corner of the housing 1130.

The AF magnet 1410 may be a two-pole magnetized magnet comprising one N-pole region and one S-pole region. In a modified embodiment, the AF magnet 1410 may be a four-pole magnetized magnet comprising two N-pole regions and two S-pole regions.

The AF magnet 1410 may comprise pluralities of magnets. The AF magnet 1410 may comprise four magnets. The AF magnet 1410 may comprise first to fourth magnets. The first to fourth magnets may be disposed symmetrically to an optical axis. The first to fourth magnets may be formed to have the same size and shape.

The camera device 1010 may comprise an OIS magnet 1420. The drive unit may comprise an OIS magnet 1420. The OIS magnet 1420 may be a magnet. The OIS magnet 1420 may be a permanent magnet. The OIS magnet 1420 may be a common magnet. The OIS magnet 1420 can be used for optical image stabilization (OIS).

The OIS magnet 1420 can be disposed on the fixed part 1100. The OIS magnet 1420 can be fixed to the fixed part 1100. The OIS magnet 1420 can be combined with the fixed part 1100. The OIS magnet 1420 can be attached to the fixed part 1100 with an adhesive. The OIS magnet 1420 may be disposed in the housing 1130. The OIS magnet 1420 may be fixed to the housing 1130. The OIS magnet 1420 may be coupled to the housing 1130. The OIS magnet 1420 may be attached to the housing 1130 with an adhesive. The OIS magnet 1420 may be disposed at a corner of the housing 1130. The OIS magnet 1420 may be disposed to be biased toward a corner of the housing 1130.

The OIS magnet 1420 may be a two-pole magnetized magnet comprising one N-pole region and one S-pole region. In a modified embodiment, the OIS magnet 1420 may be a four-pole magnetized magnet comprising two N-pole regions and two S-pole regions.

The OIS magnet 1420 may comprise a plurality of magnets. The OIS magnet 1420 may comprise four magnets. The OIS magnet 1420 may comprise first to fourth magnets. The first to fourth magnets may be disposed symmetrically to an optical axis. The first to fourth magnets may be formed to have the same size and shape.

The OIS magnet 1420 may be disposed below the AF magnet 1410. The OIS magnet 1420 can be disposed on a lower surface of the AF magnet 1410. The OIS magnet 1420 may be in contact with a lower surface of the AF magnet 1410. The OIS magnet 1420 can be fixed to a lower surface of the AF magnet 1410. The OIS magnet 1420 can be coupled to a lower surface of the AF magnet 1410 by an adhesive. In an optical axis direction, the length of the OIS magnet 1420 may be shorter than the length of the AF magnet 1410. The size of the OIS magnet 1420 may be smaller than the length of the AF magnet 1410.

The camera device 10 may comprise an AF coil 430. The drive unit may comprise an AF coil 430. The AF coil 430 may be disposed in the first moving part 200. The AF coil 430 may be fixed to the first moving part 200. The AF coil 430 may be coupled to the first moving part 200. The AF coil 430 may be attached to the first moving part 200 with an adhesive. The AF coil 430 may be disposed on bobbin 210. The AF coil 430 may be fixed to the bobbin 210. The AF coil 430 may be coupled to the bobbin 210. The AF coil 430 may be attached to the bobbin 210 with an adhesive. The AF coil 430 may be electrically connected to the AF driver IC. The AF coil 430 may be electrically connected to a lower elastic member 720, a sensing substrate 470, and an AF driver IC. The AF coil 430 can receive current from the AF driver IC.

The AF coil 1430 may be disposed at a location corresponding to the AF magnet 1410. The AF coil 1430 may be disposed in the bobbin 1210 at a position corresponding to the AF magnet 1410. The AF coil 1430 may face the AF magnet 1410. The AF coil 1430 may comprise a surface facing the AF magnet 1410. The AF coil 1430 may be disposed adjacent to the AF magnet 1410. The AF coil 1430 may interact with the AF magnet 1410. The AF coil 1430 may electromagnetically interact with the AF magnet 1410.

The AF coil 1430 can move the first moving part 1200 in an optical axis direction. The AF coil 1430 can move the bobbin 1210 in an optical axis direction. The AF coil 1430 can move the lens 1220 in an optical axis direction. The AF coil 1430 can move the first moving part 1200 upward in an optical axis direction. The AF coil 1430 can move the bobbin 1210 upward in an optical axis direction. The AF coil 1430 can move the lens 1220 upward in an optical axis direction. The AF coil 1430 can move the first moving part 1200 in a downward direction of the optical axis direction. The AF coil 1430 can move the bobbin 1210 in a downward direction of the optical axis direction. The AF coil 1430 can move the lens 1220 in a downward direction of the optical axis direction. The AF magnet 1410 and AF coil 1430 can move the lens 1220 in an optical axis direction.

The camera device 1010 may comprise an OIS coil 1440. The drive unit may comprise an OIS coil 1440. The OIS coil 1440 may be disposed in the second moving part 1300. The OIS coil 1440 may be fixed to the second moving part 1300. The OIS coil 1440 may be coupled to the second moving part 1300. The OIS coil 1440 may be attached to the second moving part 1300 with an adhesive. The OIS coil 1440 may be disposed in the holder 1340. The OIS coil 1440 may be fixed to the holder 1340. The OIS coil 1440 may be coupled to the holder 1340. The OIS coil 1440 may be attached to the holder 1340 with an adhesive. The OIS coil 1440 can be disposed by being wound around the protrusion of the holder 1340. The OIS coil 1440 may be disposed on the holder 1340. The OIS coil 1440 may be disposed on an upper surface of the holder 1340. The OIS coil 1440 may be disposed in the second substrate 1310. The OIS coil 1440 may be electrically connected to the second substrate 1310. Both ends of the OIS coil 1440 may be soldered to the second substrate 1310. The OIS coil 1440 may be electrically connected to the OIS driver IC. The OIS coil 1440 may be electrically connected to the second substrate 1310 and the OIS driver IC. The OIS coil 1440 can receive current from the OIS driver IC.

The OIS coil 1440 may be disposed at a location corresponding to the OIS magnet 1420. The OIS coil 1440 may be disposed at a location corresponding to the driving magnet. The OIS coil 1440 may be disposed in the holder 1340 at a position corresponding to the OIS magnet 1420. The OIS coil 1440 may face the OIS magnet 1420. The OIS coil 1440 may comprise a surface facing the OIS magnet 1420. The OIS coil 1440 may be disposed adjacent to the OIS magnet 1420. The OIS coil 1440 may interact with the OIS magnet 1420. The OIS coil 1440 may electromagnetically interact with the OIS magnet 420.

The OIS coil 1440 can move the second moving part 1300 in a direction perpendicular to the optical axis direction. The OIS coil 1440 can move the second substrate 1310 in a direction perpendicular to the optical axis direction. The OIS coil 1440 can move the third substrate 1320 in a direction perpendicular to the optical axis direction. The OIS coil 1440 can move the image sensor 1330 in a direction perpendicular to the optical axis direction. The OIS coil 1440 can move the holder 1340 in a direction perpendicular to the optical axis direction. The OIS coil 1440 can rotate the second moving part 1300 about an optical axis. The OIS coil 1440 can rotate the second substrate 1310 about an optical axis. The OIS coil 1440 can rotate the third substrate 1320 about an optical axis. The OIS coil 1440 may rotate the image sensor 1330 about an optical axis. The OIS coil 1440 can rotate the holder 1340 about an optical axis. The OIS magnet 1420 and the OIS coil 1440 can move the image sensor 1330 in a direction perpendicular to the optical axis direction with respect to the base 1120.

The OIS coil 1440 may comprise a plurality of coils. The OIS coil 1440 may comprise four coils. The OIS coil 1440 may comprise a coil for x-axis shift. The OIS coil 1440 may comprise a coil for y-axis shift.

The OIS coil 1440 may comprise a first coil 1441. The first coil 1441 may be a first sub-coil. The first coil 1441 may be a coil for x-axis shift. The first coil 1441 can move the second moving part 300 in an x-axis direction. The first coil 1441 may be disposed long along a y-axis. The first coil 1441 may comprise a plurality of coils. The first coil 1441 may comprise two coils. The two coils of the first coil 1441 may be electrically connected to each other. The first coil 1441 may comprise a connection coil connecting two coils. In this case, the two coils of the first coil 1441 can receive current together. Or, the two coils of the first coil 1441 may be electrically separated from each other and receive current individually.

The OIS coil 1440 may comprise a second coil 1442. The second coil 1442 may be a second sub-coil. The second coil 1442 may be a coil for y-axis shift. The second coil 1442 can move the second moving part 1300 in a y-axis direction. The second coil 1442 may be disposed long along an x-axis. The first coil 1441 may comprise a plurality of coils. The second coil 1442 may comprise two coils. The two coils of the second coil 1442 may be electrically connected to each other. The second coil 1442 may comprise a connection coil connecting two coils. In this case, the two coils of the second coil 1442 can receive current together. Or, the two coils of the second coil 1442 may be electrically separated from each other and receive current individually.

The camera device 1010 may comprise a sensor 1445. The sensor 1445 may be disposed in the second substrate 1310. The sensor 1445 may be disposed in the hole of the holder 1340. The sensor 1445 may comprise a Hall sensor. The sensor 1445 may comprise a Hall element (Hall IC). The sensor 1445 can detect the OIS magnet 1420. The sensor 1445 can detect the magnetic force of the OIS magnet 1420. The sensor 1445 may face the OIS magnet 1420. The sensor 1445 may be disposed at a location corresponding to the OIS magnet 1420. The sensor 1445 may be disposed adjacent to the OIS magnet 1420. The sensor 1445 can detect the position of the second moving part 1300. The sensor 1445 can detect the movement of the second moving part 1300. The sensor 1445 may be disposed in a hollow of the OIS coil 1440. The sensing value detected by the sensor 1445 can be used to feedback the image stabilization operation. The sensor 1445 may be electrically connected to the OIS driver IC.

The sensor 1445 may comprise a plurality of sensors. The sensor 1445 may comprise three sensors. The sensor 1445 may comprise first to third sensors. The first sensor can detect the displacement of the second moving part 1300 in an x-axis direction. The second sensor can detect the displacement of the second moving part 1300 in a y-axis direction. The third sensor may detect rotation of the second moving part 1300 about a z-axis alone or together with one or more of the first Hall sensor and the second Hall sensor. Each of the first to third sensors may comprise a Hall sensor.

The camera device 1010 may comprise a sensing magnet 1450. The sensing magnet 1450 may be disposed in the first moving part 1200. The sensing magnet 1450 may be fixed to the first moving part 1200. The sensing magnet 1450 may be coupled to the first moving part 1200. The sensing magnet 1450 may be attached to the first moving part 1200 with an adhesive. The sensing magnet 1450 may be disposed in the bobbin 1210. The sensing magnet 1450 may be fixed to the bobbin 1210. The sensing magnet 1450 may be coupled to the bobbin 1210. The sensing magnet 1450 may be attached to the bobbin 1210 with an adhesive. The sensing magnet 1450 may be formed in a smaller size than the AF magnet 1410. The sensing magnet 1450 may be formed in a smaller size than the OIS magnet 1420. Through this, the influence of the sensing magnet 1450 on driving can be minimized.

The sensing magnet 1450 may be disposed at an opposite side of the correction magnet 1460. The sensing magnet 1450 and the correction magnet 1460 may be disposed to be opposite to each other in the first moving part 1200. The sensing magnet 1450 and the correction magnet 1460 may be disposed to be opposite to each other in the bobbin 1210.

The camera device 1010 may comprise a correction magnet 1460. The correction magnet 1460 may be a compensation magnet. The correction magnet 1460 may be disposed in the first moving part 1200. The correction magnet 1460 may be fixed to the first moving part 1200. The correction magnet 1460 may be coupled to the first moving part 1200. The correction magnet 1460 may be attached to the first moving part 1200 with an adhesive. The correction magnet 1460 may be disposed in the bobbin 1210. The correction magnet 1460 may be fixed to the bobbin 1210. The correction magnet 460 may be coupled to the bobbin 1210. The correction magnet 1460 may be attached to the bobbin 1210 with an adhesive. The correction magnet 1460 may be formed in a smaller size than the AF magnet 1410. The correction magnet 1460 may be formed in a smaller size than the OIS magnet 1420. Through this, the impact of the correction magnet 1460 on driving can be minimized. In addition, the correction magnet 1460 may be disposed at an opposite side of the sensing magnet 1450 to form magnetic force balance with the sensing magnet 1450. Through this, tilt that may be caused by the sensing magnet 1450 can be prevented.

The camera device 1010 may comprise a sensing substrate 1470. The sensing substrate 1470 may be a substrate. The sensing board 1470 may be a printed circuit board (PCB). The sensing substrate 1470 may be a flexible substrate. The sensing substrate 1470 may be an FPCB. The sensing substrate 1470 may be coupled with the first substrate 1110. The sensing substrate 1470 may be connected to the first substrate 1110. The sensing substrate 1470 may be electrically connected to the first substrate 1110. The sensing substrate 1470 may be soldered to the first substrate 1110. The sensing substrate 1470 may be disposed in the housing 1130. The sensing substrate 1470 may be fixed to the housing 1130. The sensing substrate 1470 may be coupled to the housing 1130. The housing 1130 may comprise a groove or hole of a shape corresponding to the sensing substrate 1470. The sensing substrate 1470 may be disposed in a groove or hole of the housing 1130. The sensing substrate 1470 may be connected to a terminal of the connection substrate 1600 after bending.

In a direction perpendicular to the optical axis direction, a portion of the sensing substrate 1470 may be disposed between the connection substrate 1600 and the wing portion of the housing 1130. The sensing substrate 1470 may be disposed in the groove 1131*a* of the wing portion of the housing 1130.

The camera device 1010 may comprise an AF driver IC. The AF driver IC may be an AF driver IC. The AF driver IC may be electrically connected to the AF coil 1430. The AF driver IC may apply current to the AF coil 1430 to perform AF driving. The AF driver IC can apply power to the AF coil 1430. The AF driver IC can apply current to the AF coil 1430. The AF driver IC can apply voltage to the AF coil 1430. The AF driver IC may be disposed in the sensing substrate 1470. The AF driver IC may be disposed at a location corresponding to the sensing magnet 1450. The AF driver IC can be disposed to face the sensing magnet 1450. The AF driver IC may be disposed adjacent to the sensing magnet 1450.

The AF driver IC may comprise a sensor. The sensor may comprise a Hall element (Hall IC). The sensor may be disposed at a location corresponding to the sensing magnet 1450. The sensor may be disposed to face the sensing magnet 1450. The sensor may be disposed adjacent to the sensing magnet 1450. The sensor can detect the sensing magnet 1450. The sensor can detect the magnetic force of the sensing magnet 1450. The sensor can detect the position of the first moving part 1200. The sensor can detect the movement of the first moving part 1200. The detection value detected by the sensor can be used as feedback for autofocus driving. The sensor can be disposed inside the AF driver IC. The sensor can be built into the AF driver IC. The sensor may be comprised in the AF driver IC. The sensor may be a component of the AF driver IC. The sensor may be disposed in the sensing substrate 1470.

The camera device 1010 may comprise a gyro sensor. The gyro sensor may be disposed in the first substrate 1110. The gyro sensor can detect shaking of the camera device 1010. The gyro sensor can sense the angular velocity or linear velocity caused by the shaking of the camera device 1010. The gyro sensor may be electrically connected to the OIS driver IC. The shaking of the camera device 1010 detected by the gyro sensor can be used to drive image stabilization (OIS).

The camera device 1010 may comprise an OIS driver IC. The OIS driver IC may be an OIS driver IC. The OIS driver IC may be electrically connected to the OIS coil 1440. The OIS driver IC may apply current to the OIS coil 1440 to perform OIS driving. The OIS driver IC can apply power to the OIS coil 1440. The OIS driver IC can apply current to the OIS coil 1440. The OIS driver IC may apply voltage to the OIS coil 1440. The OIS driver IC may be disposed in the second substrate 1310.

The camera device 1010 may comprise a connection member. The connection member may be an interposer. The connection member may support the movement of the second moving part 1300. The connection member can movably support the second moving part 1300. The connection member can connect the second moving part 1300 and the fixed part 1100. The connection member may connect the first substrate 1110 and the second substrate 1310. The connection member may electrically connect the first substrate 1110 and the second substrate 1310. The connection member may connect the first substrate 1110 and the second moving part 1300. The connection member can guide the movement of the second moving part 1300. The connection member may guide the second moving part 1300 to move in a direction perpendicular to the optical axis direction. The connection member may guide the second moving part 1300 to rotate about an optical axis. The connection member may restrict movement of the second moving part 1300 in an optical axis direction.

The connection member may comprise a connection substrate 1600. The connection member may comprise an elastic member connecting the fixed part 1100 and the second moving part 1300. The connecting member may comprise a leaf spring. The connection member may comprise a wire 1800. The connection member may comprise a ball being disposed between the fixed part 1100 and the second moving part 1300. A connection member can comprise conductive members. The connecting member may comprise conductive tape. The connection member may comprise an EMI tape.

The camera device 1010 may comprise a connection substrate 1600. The connection substrate 1600 may be a connection portion. The connection substrate 1600 may be a connection member. The connection substrate 1600 may be a flexible substrate. The connection substrate 1600 may be a flexible substrate. The connection substrate 1600 may be a flexible printed circuit board. The connection substrate 1600 may be a flexible printed circuit substrate (FPCB). The connection substrate 1600 may be flexible at least in part. The second substrate 1310 and the connection substrate 1600 may be formed integrally.

The connection substrate 1600 may support the second moving part 1300. The connection substrate 1600 may support the movement of the second moving part 1300. The connection substrate 1600 can movably support the second moving part 1300. The connection substrate 1600 can connect the second moving part 1300 and the fixed part 1100. The connection substrate 1600 can connect the first substrate 1110 and the second substrate 1310. The connection substrate 1600 can electrically connect the first substrate 1110 and the second substrate 1310. The connection substrate 1600 may guide the movement of the second moving part 1300. The connection substrate 1600 may guide the second moving part 1300 to move in a direction perpendicular to the optical axis direction. The connection substrate 1600 may guide the second moving part 1300 to rotate about an optical axis. The connection substrate 1600 may restrict movement of the second moving part 1300 in an optical axis direction. A portion of the connection substrate 1600 may be coupled to the base 1120. The connection substrate 1600 may movably support the image sensor 1330. The connection substrate 1600 may be disposed inside the first cover member 140.

The connection substrate 1600 may comprise two connection substrates 1600 spaced apart from each other and formed symmetrically. Two connection substrates 1600 may be disposed at both sides of the second substrate 1310. The connection substrate 1600 may be bent a total of six times to connect the first substrate 1110 and the second substrate 1310.

The connection substrate 1600 may comprise a first region connected to the second substrate 1310 and bent in an optical axis direction. The first region is connected to the second substrate 1310 and can be bent in an optical axis direction. The first region is connected to the second substrate 1310 and may be extended in an optical axis direction. The first region is connected to the second substrate 1310 and can be bent and extended in an optical axis direction. The connection substrate 1600 may comprise a second region being extended from a first region. The connection substrate 1600 may comprise a third region bent in a direction perpendicular to the optical axis direction in a second region. The third region may be bent in a direction perpendicular to the optical axis direction in a second region. The third region may be extended from a second region in a direction perpendicular to the optical axis direction. A third region may be bent and extended from a second region in a direction perpendicular to the optical axis direction.

The connection substrate 1600 may comprise a connection portion 1610 comprising a first region. The connection substrate 1600 may comprise an extension portion 1620 comprising a second region and a third region. The connection substrate 1600 may comprise a connection portion 1610 connected to the second substrate 1310. The connection substrate 1600 may comprise an extension portion 1620 being extended from the connection portion 1610. The connection substrate 1600 may comprise a terminal portion 1630 being connected to the extension portion 1620 and comprising a terminal.

The terminal portion 1630 may comprise a first terminal. The first terminal may be connected to the first substrate 1110. The first terminal may be electrically connected to the first substrate 1110. The first terminal may be coupled to the first substrate 1110. The first terminal may be coupled to the first substrate 1110 by a conductive member. The first terminal may be coupled to the first substrate 1110 through soldering.

The width of the first terminal 1631 of the connection substrate 1600 in a direction perpendicular to the optical axis (see c in FIG. 42) may be larger than the diameter of the hole 1111 of the first substrate 1110 in the corresponding direction. In a modified embodiment, the width of the first terminal 1631 of the connection substrate 1600 in a direction perpendicular to the optical axis may be equal to the diameter of the hole 1111 of the first substrate 1110 in the corresponding direction. Or, the width of the first terminal 1631 of the connection substrate 1600 in a direction perpendicular to the optical axis may be smaller than the diameter of the hole 1111 of the first substrate 1110 in the corresponding direction. The width of the first terminal 1631 of the connection substrate 1600 in a direction perpendicular to the optical axis may be equal to the distance between the holes 1111 of the first substrate 1110. The diameter of the hole 1111 of the first substrate 1110 may be 30 to 70% of the width of the first terminal 1631 of the connection substrate 1600 in a direction perpendicular to the optical axis. It may be 40 to 60% of the width of the first terminal 1631 in a direction perpendicular to the optical axis.

The first terminal 1631 may comprise a plurality of terminals. The first terminal 1631 may comprise a plurality of terminals electrically connected to the image sensor 1330. In a second embodiment of the present invention, many terminals may be required to electrically connect the image sensor 1330 to the first substrate 1631. For this reason, the gap between the plurality of terminals can be narrowed. The pin member 1150 of the second embodiment of the present invention can be minimize defect rate in the connection process between the first terminal 1631 and the open region 1112 of the first substrate 1110 even if the gap between multiple terminals is narrow.

The terminal portion 1630 may comprise a second terminal. The second terminal may be connected to the sensing substrate 1470. The second terminal may be electrically connected to the sensing substrate 1470. The second terminal may be coupled to the sensing substrate 1470. The second terminal may be coupled to the sensing substrate 1470 by a conductive member. The second terminal may be connected to the sensing substrate 1470 through soldering. The second terminal of the connection substrate 1600 may be overlapped with a first terminal 1631 of the connection substrate 1600 in an optical axis direction. The second terminal may be disposed above the first terminal 1631. The second terminal may be spaced apart from the first terminal 1631. The second terminal may be disposed higher than the first terminal 1631.

In a second embodiment of the present invention, the camera device 1010 may comprise a flexible substrate. The flexible substrate can connect the fixed part 1100 and the second moving part 1300. The flexible substrate may comprise: a connection portion 1610 connected to the second moving part 1300; an extension portion 1620 being extended from the connection portion 1610; and a terminal portion 1630 connected to the extension portion 1620 and comprising a terminal.

In a second embodiment of the present invention, the connection substrate 1600 may comprise: a first portion coupled to the first substrate 1110; a second portion coupled to the second substrate 1310; and a third portion connecting the first portion and the second portion. The third portion may be disposed at least partially parallel to an optical axis. The third portion may be formed so that the length in an optical axis direction is longer than the thickness. The second portion of the connection substrate 1600 may be disposed parallel to the second substrate 1310 at least in part. The third portion of the connection substrate 1600 may be disposed perpendicular to the second portion at least in part. The third portion of the connection substrate 1600 may be bent roundly at the portion corresponding to the corner of the second substrate 1310. The second substrate 1310 may comprise a first side surface and a second side surface being disposed to be opposite to each other and a third side surface and a fourth side surface being disposed to be opposite to each other. The second portion of the connection substrate 1600 may be coupled with the first side surface and the second side surface of the second substrate 1310. The first portion of the connection substrate 1600 may be coupled to the portion of the first substrate 1110 that corresponds to the third side surface and the fourth side surface of the second substrate 1310.

The camera device 1010 may comprise a shielding member. The shielding member may be disposed on one surface of the connection substrate 1600. The shielding member may be a conductive tape. The shielding member may be EMI tape. In a modified embodiment, the shielding member may be disposed separately from the connection substrate 1600. The camera device 1010 may comprise a conductive tape. The connecting member may comprise a conductive tape. The connection substrate 1600 may comprise a conductive tape. However, the conductive tape may be understood as a separate component from the connection substrate 1600. The conductive tape may comprise electromagnetic interference (EMI) tape. The conductive tape can be a metal member. The conductive tape can be metal. The conductive tape can be a metal layer. The conductive tape can be a thin metal film. The conductive tape can be formed from metal. The conductive tape can be formed from alloys. The conductive tape can be formed from conductive materials. The conductive tape can have adhesive properties. The conductive tape can be distinguished from the conductive layer 1602 of the connection substrate 1600. The conductive tape may be formed of a material different from the conductive layer 1602 of the connection substrate 1600.

The conductive tape can be disposed in the connection substrate 1600. The conductive tape can be bonded to the connection substrate 1600. The conductive tape can be fixed to the connection substrate 1600. The conductive tape can be formed integrally with the connection substrate 1600. The conductive tape can be elastic. The conductive tape can be attached to an outer surface of the connection substrate 1600. Or, the conductive tape may be attached to an inner surface of the connection substrate 1600.

In an optical axis direction, the length of the conductive tape may, at least in part, be equal to the length of the extension 1620. The conductive tape may be extended the same length in an optical axis direction as the extension portion 1620. The thickness of the conductive tape may be thinner than the thickness of the connection substrate 1600. The thickness of the conductive tape may be the same as the thickness of the connection substrate 1600. The conductive tape can be connected to ground (GND) and used for impedance matching and noise suppression.

At least a portion of the conductive tape may be disposed in the extension portion 1620 of the connection substrate 1600. The extension portion 1620 may comprise a bending region that is bent in a direction perpendicular to the optical axis direction. At this time, the conductive tape can be disposed in the bending region. The conductive tape may be disposed on an inner surface of the extension portion 1620. The conductive tape may be disposed on an outer surface of the extension portion 1620.

The conductive tape can be formed from conductive materials. The conductive tape may be electrically connected to the second substrate 1310. The conductive tape may be electrically connected to the image sensor 1330. The conductive tape can be electrically connected to the OIS driver IC. The conductive tape may be connected to a first terminal of the connection substrate 1600. The conductive tape may be electrically connected to the first terminal of the connection substrate 1600. The conductive tape may be in direct contact with the first terminal of the connection substrate 1600. The conductive tape can be used as ground (GND). The conductive tape can be connected to a ground terminal of the connection substrate 1600. The conductive tape may be electrically connected to the first substrate 1110. In this case, the number of power connection patterns of the connection substrate 1600 may be reduced. The conductive tape may be electrically connected to the ground terminal of the image sensor 1330.

The camera device 1010 may comprise an elastic member 1700. The elastic member 1700 may be a support member. The elastic member 1700 can connect the fixed part 1100 and the first moving part 1200. The elastic member 1700 can elastically connect the fixed part 1100 and the first moving part 1200. The elastic member 1700 may connect the bobbin 1210 and the housing 1130. The elastic member 1700 can elastically connect the bobbin 1210 and the housing 1130. The elastic member 1700 can movably support the first moving part 1200 with respect to the fixed part 1100. The elastic member 1700 may be deformed when the first moving part 1200 moves. When the movement of the first moving part 1200 is completed, the elastic member 1700 can position the first moving part 1200 to the initial position through restoring force (elastic force). The elastic member 1700 may comprise a leaf spring. The elastic member 1700 may comprise a spring. The elastic member 1700 may have elasticity at least in part. The elastic member 1700 may provide restoring force (elastic force) to the first moving part.

The camera device 1010 may comprise an upper elastic member 1710. The elastic member 1700 may comprise an upper elastic member 1710. The upper elastic member 1710 may be an upper spring. The upper elastic member 1710 may be disposed on a lower elastic member 1720. The upper elastic member 1710 may connect the housing 1130 and the bobbin 1210. The upper elastic member 1710 may be coupled to the housing 1130. The upper elastic member 1710 may be coupled to the bobbin 1210.

The upper elastic member 1710 may comprise a plurality of upper elastic units. The upper elastic member 1710 may comprise two upper elastic units. The upper elastic member 1710 may comprise first and second upper elastic units. The first and second upper elastic units may be spaced apart from each other. The first and second upper elastic units may electrically connect the sensing substrate 1470 and the AF coil 1430. In a modified embodiment, the lower elastic member 1720 may comprise a plurality of lower elastic units. The lower elastic member 1720 may comprise two lower elastic units.

The AF driver IC may be disposed on an inner surface of the sensing substrate 1470. The first upper elastic unit may be coupled to an inner surface of the sensing substrate 1470. The second upper elastic unit may be coupled to an outer surface opposite to an inner surface of the sensing substrate 1470.

The upper elastic member 1710 may comprise an outer side portion coupled to the housing 1130. The outer side portion of the upper elastic member 1710 may be coupled to an upper portion of the housing 1130. The outer side portion of the upper elastic member 1710 may be disposed on an upper surface of the housing 1130. The upper elastic member 1710 may comprise an inner side portion coupled to the bobbin 1210. The inner side portion of the upper elastic member 1710 may be coupled to an upper portion of the bobbin 1210. The inner side portion of the upper elastic member 1710 may be disposed on an upper surface of the bobbin 1210. The upper elastic member 1710 may comprise a connection portion connecting the outer side portion and the inner side portion. The connection portion may have elasticity.

The upper elastic member 1710 may comprise a coupling portion. The coupling portion may be coupled to a wire 1800. The coupling portion may be extended from the outer side portion. The coupling portion may comprise a hole. The upper elastic member 1710 may comprise a hole in which the wire 1800 is disposed. The upper elastic member 1710 may comprise a hole through which the wire 1800 passes.

The upper elastic member 1710 may comprise a terminal portion. The terminal portion may be coupled with the sensing substrate 1470. The terminal unit may be connected to a terminal of the sensing substrate 1470. The terminal portion may be coupled to the second terminal 1472 of the sensing substrate 1470 through a conductive member.

The camera device 1010 may comprise a lower elastic member 1720. The elastic member 1700 may comprise a lower elastic member 1720. The lower elastic member 1720 may be a lower spring. The lower elastic member 1720 may be disposed below the upper elastic member 1710. The lower elastic member 1720 may connect the housing 1130 and the bobbin 1210. The lower elastic member 1720 may be coupled to the housing 1130. The lower elastic member 1720 may be coupled to the bobbin 1210.

The lower elastic member 1720 may comprise an outer side portion coupled to the housing 1130. The outer side portion of the lower elastic member 1720 may be coupled to the lower portion of the housing 1130. The outer side portion of the lower elastic member 1720 may be disposed on a lower surface of the housing 1130. The lower elastic member 1720 may comprise an inner side portion coupled to the bobbin 1210. The inner side portion of the lower elastic member 1720 may be coupled to a lower portion of the bobbin 1210. The inner side portion of the lower elastic member 1720 may be disposed on a lower surface of the bobbin 1210. The lower elastic member 1720 may comprise a connection portion connecting the outer side portion and the inner side portion. The connection portion may have elasticity.

The camera device 1010 may comprise a wire 1800. The wire 1800 may be a wire spring. The wire 1800 may be an elastic member. The wire 1800 may be a leaf spring in a modified embodiment. The wire 1800 can connect the fixed part 1100 and the second moving part 1300. The wire 1800 can elastically connect the fixed part 1100 and the second moving part 1300. The wire 1800 may connect the housing 1130 and the second substrate 1310. The wire 1800 can elastically connect the housing 1130 and the second substrate 1310. The wire 1800 may movably support the second moving part 1300. The wire 1800 may movably support the second moving part 1300 with respect to the fixed part 1100. The wire 1800 may support the movement of the image sensor 1330. The wire 1800 may movably support the image sensor 1330. The wire 1800 may be disposed in an optical axis direction. The wire 1800 may support the second moving part 1300 to move or rotate in a direction perpendicular to the optical axis direction. The wire 1800 may connect the upper elastic member 1710 and the coupling member 1380. The wire 1800 may electrically connect the upper elastic member 1710 and the coupling member 1380. The wire 1800 may be coupled to the upper elastic member 1710 through soldering. The wire 1800 may be coupled to the coupling member 1380 through soldering.

The wire 1800 may comprise a first portion coupled to the upper elastic member 1710. At this time, the first portion may be the upper end of the wire 1800. However, the first portion may be spaced apart from the upper end of the wire 1800. The wire 1800 may comprise a second portion coupled to the coupling member 1380. At this time, the second portion may be the lower end of the wire 1800. However, the second portion may be spaced apart from the lower end of the wire 1800.

Hereinafter, the assembly sequence of the camera device according to the second embodiment of the present invention will be described with reference to the drawings.

Figure 47:
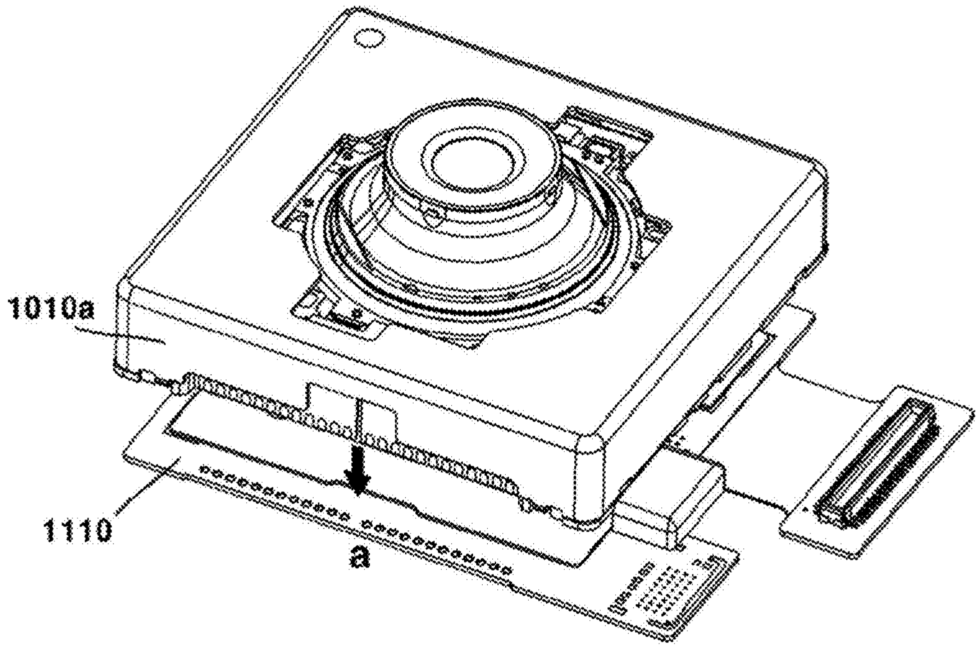
FIGS. 47 to 51 are diagrams sequentially illustrating an assembly sequence of a camera device according to a second embodiment of the present invention.
Figure 48:
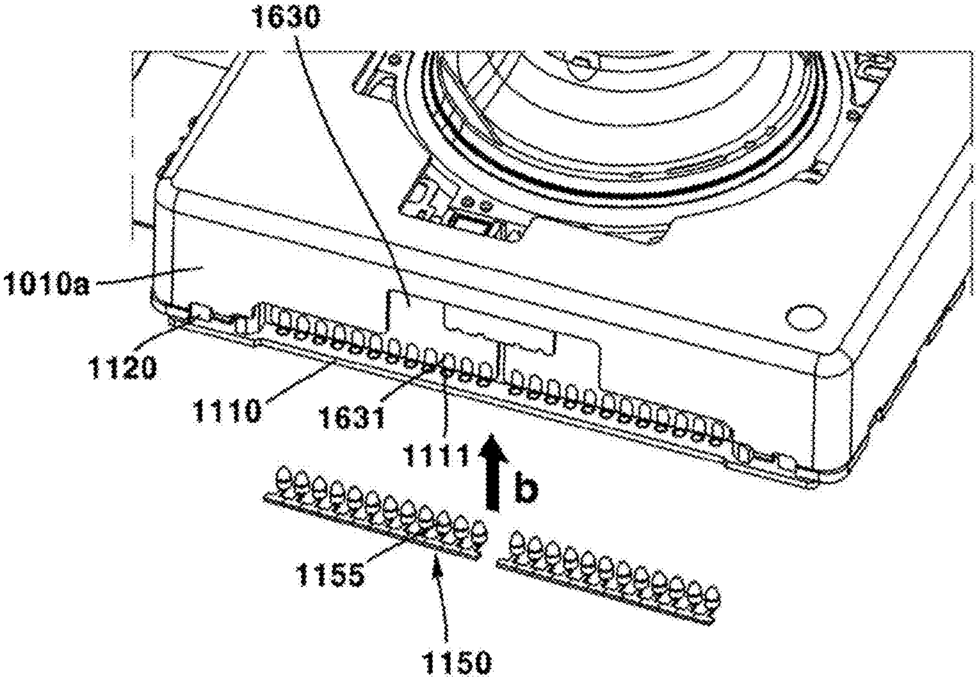
Figure 49:
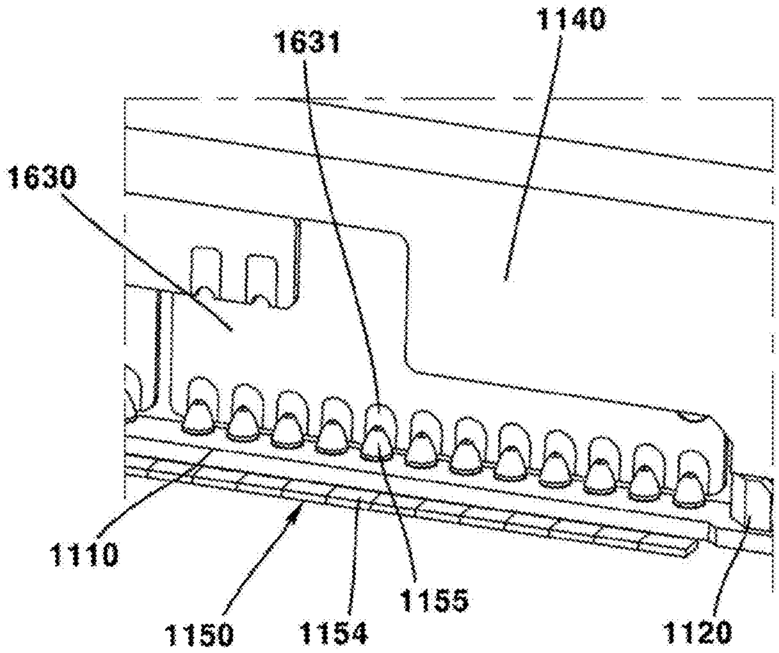
Figure 50:
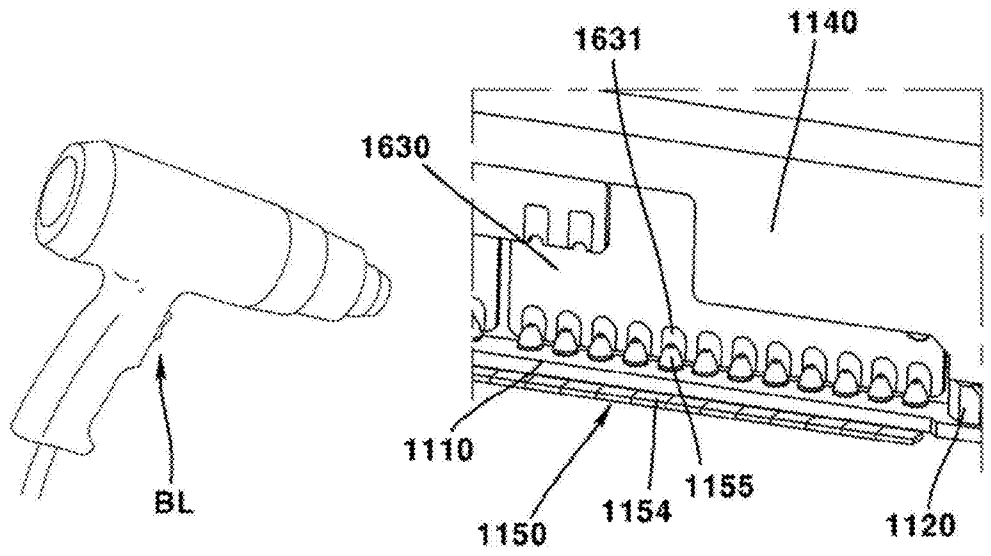
Figure 51:
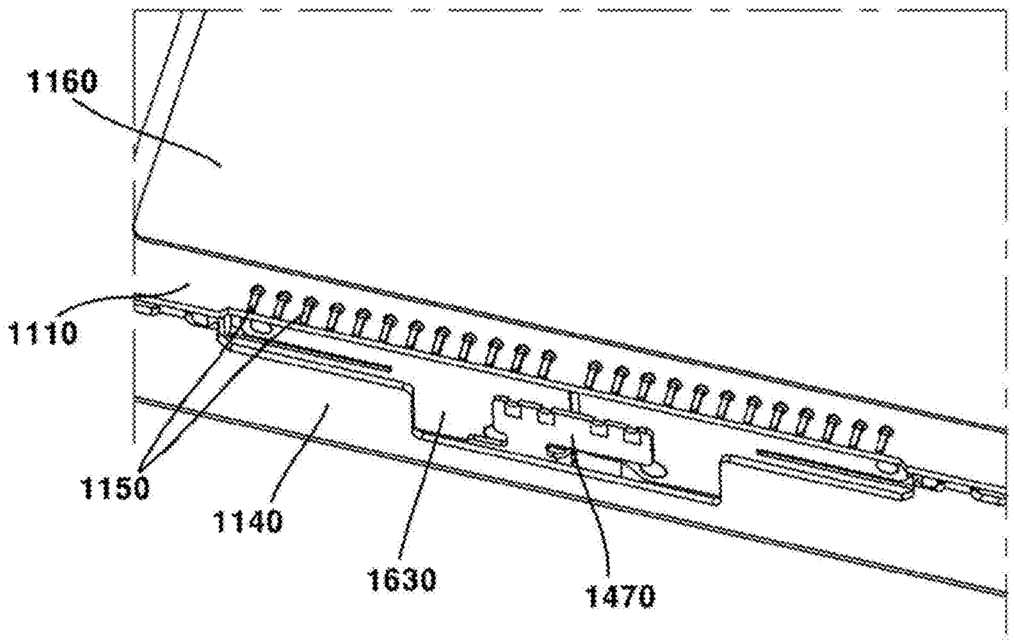

FIGS. 47 to 51 are diagrams sequentially illustrating an assembly sequence of a camera device according to a second embodiment of the present invention; FIG. 47 is a diagram illustrating an actuator being seated on a first substrate; FIG. 48 is a diagram illustrating inserting a pin member with a conductive member disposed in a hole of a first substrate; FIG. 49 is a diagram illustrating a pin member inserted into a hole of a first substrate and a portion of the pin member and a conductive member being more protruded than an upper surface of a first substrate; FIG. 50 is a diagram illustrating hot air being applied to a conductive member through a blower (BL) so that the conductive member is connected to a terminal of a connection substrate; and FIG. 51 is a view illustrating the portion connecting pluralities of pin members to one another after being cut from an edge of a first substrate.

First, the actuator or voice coil motor (VCM) may be disposed on the first substrate 1110, which is a connector PCB (see a in FIG. 47). Thereafter, a pin array in which a plurality of pin members 1150 are connected may be inserted into the hole 1111 of the first substrate 1110 (see b in FIG. 48). At this time, the conductive member 1155 may be applied to the pin member 1150. Thereafter, as illustrated in FIG. 49, it may be disposed in a state that at least a portion of the third portion 1153 and the conductive member 1155 of the pin member 1150 is more protruded than an upper surface of the first substrate 1110, and the fourth portion 1154 of the pin member 1150 is protruded outward from the first substrate 1110. Afterwards, as illustrated in FIG. 50, hot air of about 200 degrees is applied to the conductive member 1155 by a blower (BL), and as the conductive member 1155 melts, the pin member 1150, the open region 1111 of the first substrate 1110, and the first terminal 1631 of the connection substrate 1600 can be connected (see FIG. 52). Thereafter, as illustrated in FIG. 51, the fourth portion 1154 of the pin member 1150 that connects the plurality of pins to each other may be removed through laser cutting. Afterwards, epoxy is applied to the pin member 1150 and the first substrate 1110 to fix the pin member 1150 to the first substrate 1110, thereby preventing foreign matter from entering through the hole 1111 of the first substrate 1110.

In a second embodiment of the present invention, the pad of the RPCB, which is the first substrate 1110, may be formed in a penetrating type. In addition, a pin member 1150 to which solder paste is attached may be provided. Through the electrical connection between the first substrate 1110 and the connection substrate 1600 through the pin member 1150, soldering quality for a large number of pads can be improved. In other words, the soldering attachment area can be increased to reduce open defects compared to existing one and prevent short circuits between solders. In addition, the present structure can be broadly applied to a camera device with the concept of positioning and soldering PCBs at right angles. On the other hand, since soldering can be done simply by heating hot air without investing in soldering equipment, it has the advantage of reducing manufacturing costs and simplifying the process.

Hereinafter, the driving of a camera device according to a first embodiment of the present invention will be described with reference to the drawings.

Figure 55:
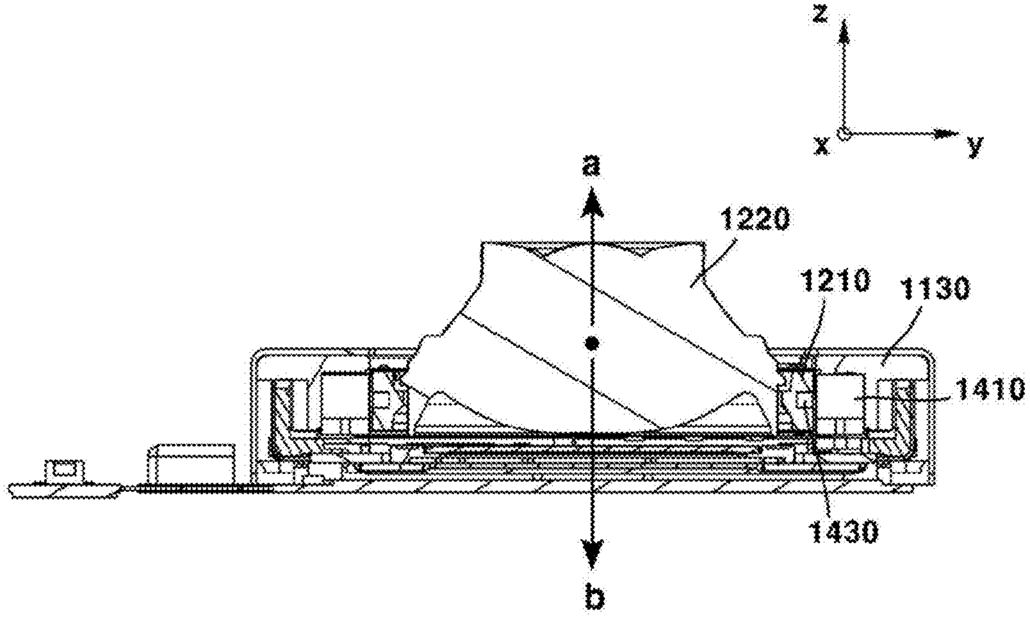
FIG. 55 is a diagram for explaining an operation of an autofocus function of a camera device according to a second embodiment of the present invention.

FIG. 55 is a diagram for explaining an operation of an autofocus function of a camera device according to a second embodiment of the present invention.

When power is applied to an AF coil 1430 of a camera device 1010 according to a first embodiment of the present invention, an electromagnetic field is formed in the AF coil 1430, and the AF coil 1430 can move in an optical axis direction (z-axis direction) through electromagnetic interaction with the AF magnet 1410. At this time, the AF coil 1430 may move in an optical axis direction together with the first moving part 1200 comprising the lens 1220. In this case, the lens 1220 moves away from or approaches the image sensor 1330, so the focus of the subject can be adjusted. To apply power to the AF coil 1430, one or more of current and voltage may be applied.

When a current in a first direction is applied to the AF coil 1430 of the camera device 1010 according to a second embodiment of the present invention, the AF coil 1430 can move upward in an optical axis direction (see a in FIG. 55) through electromagnetic interaction with the AF magnet 1410. At this time, the AF coil 1430 may move the lens 1220 upward in an optical axis direction away from the image sensor 1330.

When a current in a second direction opposite to a first direction is applied to the AF coil 1430 of the camera device 1010 according to a second embodiment of the present invention, the AF coil 1430 can move in a downward direction (see b in FIG. 55) in an optical axis direction through electromagnetic interaction with the AF magnet 410. At this time, the AF coil 1430 may move the lens 1220 downward in an optical axis direction to become closer to the image sensor 1330.

Figure 56:
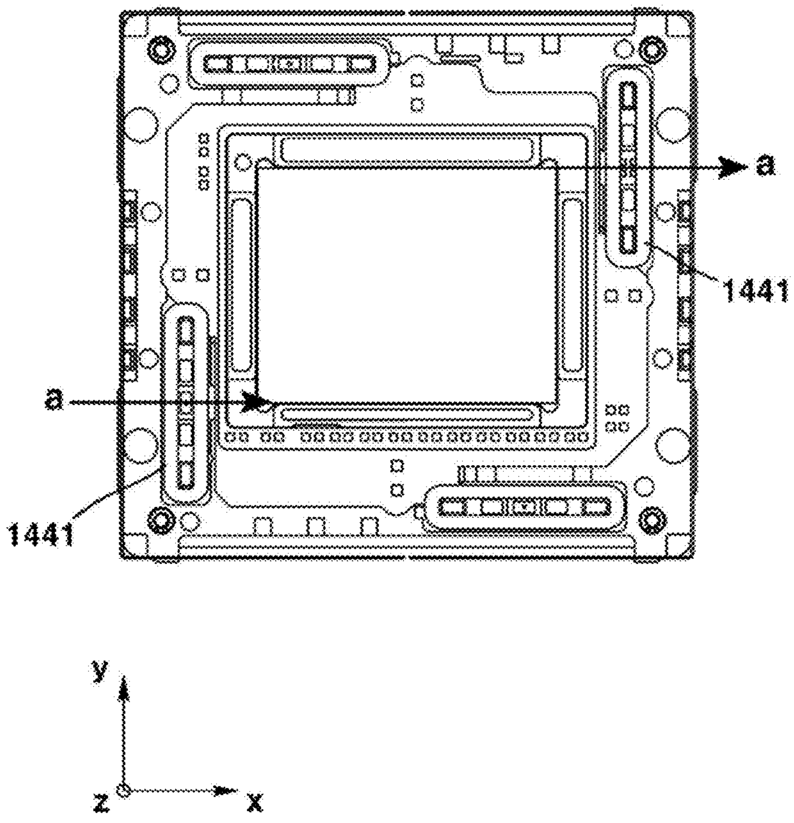
FIGS. 56 to 58 are diagrams for explaining an operation of an image stabilization function of a camera device according to a second embodiment of the present invention. In more detail.
Figure 57:
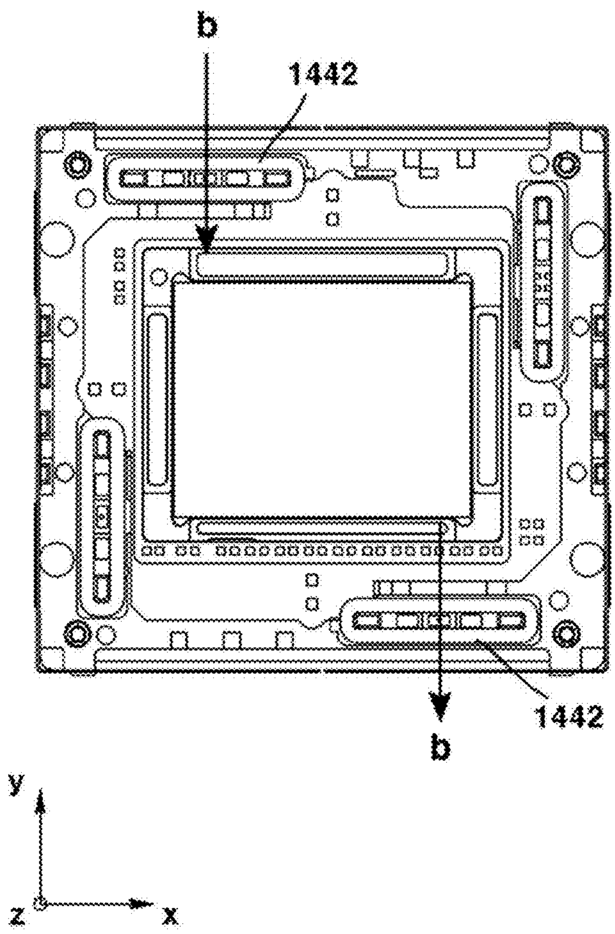
Figure 58:
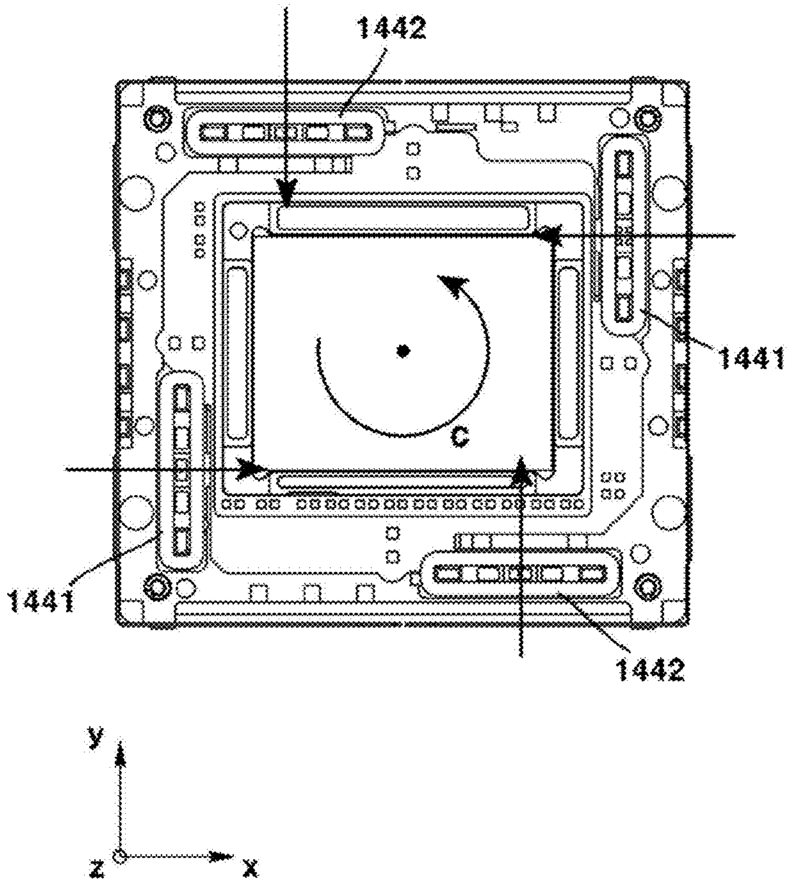

FIGS. 56 to 58 are diagrams for explaining an operation of an image stabilization function of a camera device according to a second embodiment of the present invention.

When power is applied to the OIS coil 1440 of the camera device 1010 according to a second embodiment of the present invention, an electromagnetic field is formed in the OIS coil 1440, so that the OIS coil 1440 can move in a direction perpendicular to the optical axis direction through electromagnetic interaction with the OIS magnet 1420. In addition, the OIS coil 1440 can rotate about an optical axis through electromagnetic interaction with the OIS magnet 1420. At this time, the OIS coil 1440 may move or rotate together with the second moving part 1300 comprising the image sensor 1330. In a second embodiment of the present invention, the OIS coil 1440 may move the image sensor 1330 to compensate for the shaking of the camera device 1010 detected by the gyro sensor 490.

FIG. 56 is a diagram to explain how the image sensor of a camera device according to a second embodiment of the present invention is shifted along an x-axis.

When a current in a first direction is applied to the first coil 1441 of a camera device 1010 according to a second embodiment of the present invention, the first coil 1441 can move in one direction (see a in FIG. 56) of a first direction (x-axis direction) perpendicular to the optical axis direction through electromagnetic interaction with the OIS magnet 1420. At this time, the first coil 1441 may move the image sensor 1330 in one direction among the first directions perpendicular to the optical axis direction. Conversely, when a current in a second direction opposite to a first direction is applied to the first coil 1441, the first coil 1441 can move in the other direction among the first directions (x-axis direction) perpendicular to the optical axis direction through electromagnetic interaction with the OIS magnet 1420. At this time, the first coil 1441 may move the image sensor 1330 in another direction among the first directions perpendicular to the optical axis direction.

FIG. 57 is a diagram to explain how an image sensor of a camera device is shifted along a y-axis according to a second embodiment of the present invention.

When a current in a first direction is applied to the second coil 1442 of a camera device 1010 according to a second embodiment of the present invention, the second coil 1442 can move in one direction (see b in FIG. 57) among the second directions (y-axis direction) perpendicular to the optical axis direction through electromagnetic interaction with the OIS magnet 1420. At this time, the second coil 1442 may move the image sensor 1330 in one direction among the second directions perpendicular to the optical axis direction. Conversely, when a current in a second direction opposite to a first direction is applied to the second coil 1442, the second coil 1442 can move in the other direction among the second directions (y-axis direction) perpendicular to the optical axis direction through electromagnetic interaction with the OIS magnet 1420. At this time, the second coil 1442 may move the image sensor 1330 in another direction among the second directions perpendicular to the optical axis direction.

FIG. 58 is a diagram for explaining a rolling operation of an image sensor of a camera device according to a second embodiment of the present invention around the z-axis.

When current in a first direction is applied to the first coil 1441 and the second coil 1442 of a camera device 1010 according to a second embodiment of the present invention, the first coil 1441 and the second coil 1442 can rotate in one direction about the optical axis through electromagnetic interaction with the OIS magnet 1420 (see c in FIG. 58). At this time, the first coil 1441 and the second coil 1442 can rotate the image sensor 1330 in one direction about an optical axis. At this time, one direction may be counterclockwise. Conversely, when a current in a second direction opposite to a first direction is applied to the first coil 1441 and the second coil 1442, the first coil 1441 and the second coil 1442 can rotate in other direction about an optical axis through electromagnetic interaction with the OIS magnet 1420. At this time, the first coil 1441 and the second coil 1442 may rotate the image sensor 1330 in other direction about an optical axis. At this time, the other direction may be clockwise.

Hereinafter, an optical apparatus according to a second embodiment of the present invention will be described with reference to the drawings.

Figure 59:
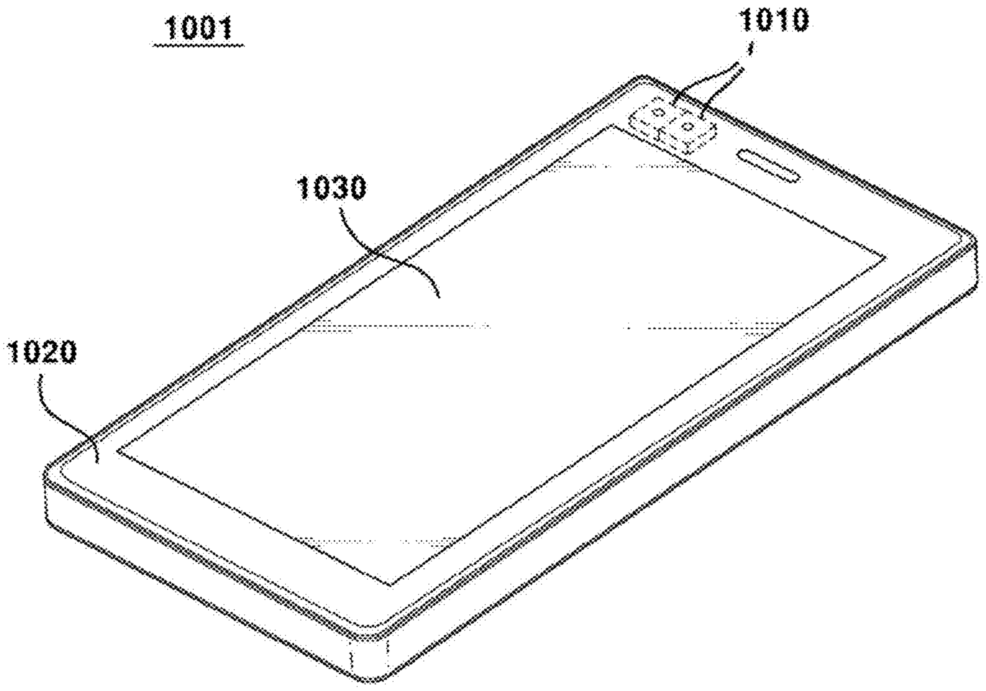
FIG. 59 is a perspective view of an optical apparatus according to a second embodiment of the present invention.
Figure 60:
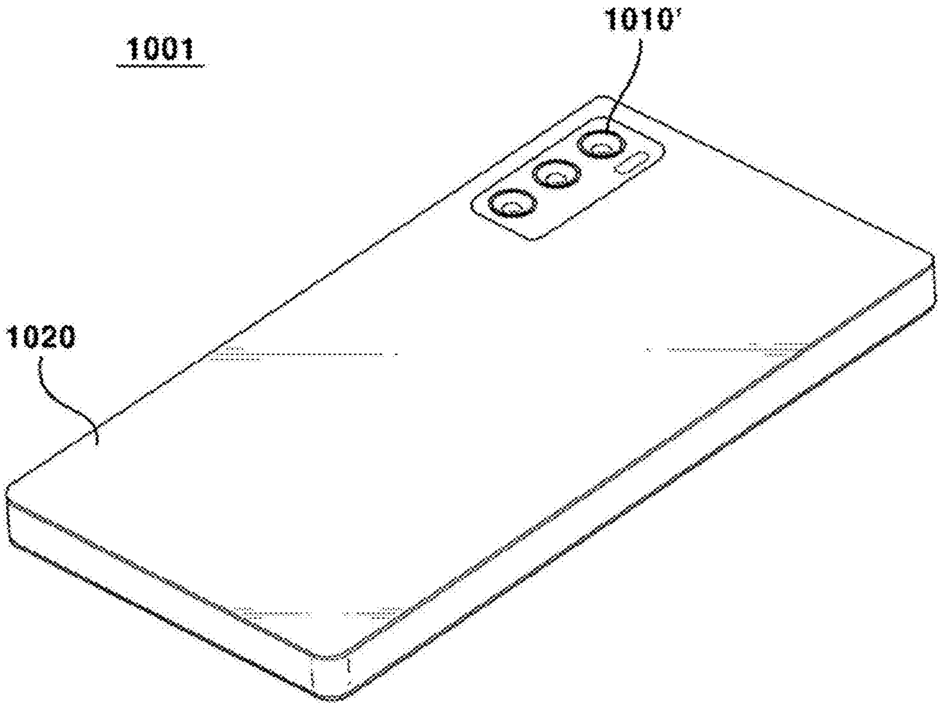
FIG. 60 is a perspective view of an optical apparatus according to a second embodiment of the present invention as viewed from a direction different from that of FIG. 59.
Figure 61:
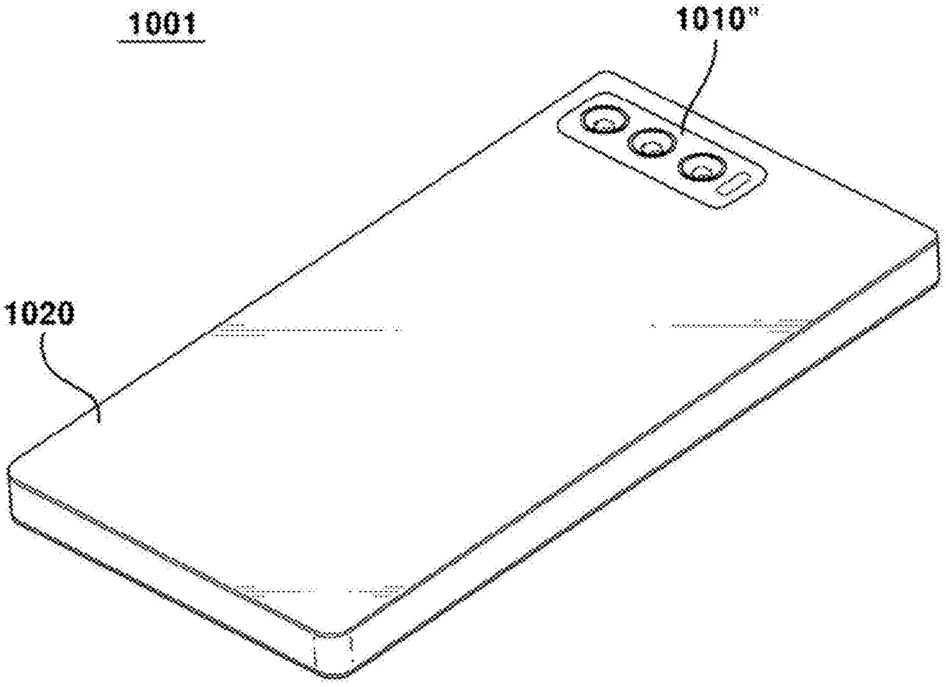
FIG. 61 is a perspective view of an optical apparatus according to a modified embodiment.

FIG. 59 is a perspective view of an optical apparatus according to a second embodiment of the present invention; FIG. 60 is a perspective view of an optical apparatus according to a second embodiment of the present invention seen from a direction different from that of FIG. 59; and FIG. 61 is a perspective view of an optical apparatus according to a modified embodiment. This is a perspective view of the optical apparatus.

An optical apparatus 1001 may comprise any one or more among a hand phone, a portable phone, a portable terminal, a mobile terminal, a smart phone, a smart pad, a portable smart device, a digital camera, a laptop computer, a digital broadcasting terminal, a personal digital assistant (PDA), a portable multimedia player (PMP), and a navigation. The optical apparatus 1001 may comprise any device for photographing images or photos.

The optical apparatus 1001 may comprise a main body 1020. The optical apparatus 1001 may comprise a camera device 1010. The camera device 1010 may be disposed in the main body 1020. The camera device 1010 may photograph a subject. The optical apparatus 1001 may comprise a display 1030. The display 1030 may be disposed in the main body 1020. The display 1030 may output any one or more of a video and an image photographed by the camera device 1010. The display 1030 may be disposed on the first surface of the main body 1020. The camera device 1010 may be disposed on any one or more of a first surface of the main body 1020 and a second surface opposite to the first surface.

The camera device 1010 may be disposed on the front side of the main body 1020 as illustrated in FIG. 59. That is, the camera device 1010 may be disposed on the same surface as the display 1030. However, the additional camera device 1010' may be disposed on the back side of the main body 1020 as illustrated in FIG. 30. At this time, the camera device 1010' may have a plurality of camera devices disposed parallel to the long side of the main body 1020. The camera device according to a second embodiment of the present invention may be disposed on one or more of the front and back sides of the main body 1020. In addition, in a modified embodiment, the camera device 1010" may have a plurality of camera devices disposed on the back side of the main body 1020 and parallel to the short side of the main body 1020.

In the above, the first and second embodiments of the present invention have been separately described, but some components of the first embodiment can be replaced with corresponding components of the second embodiment. The modified embodiment of the first embodiment may comprise the pin member 1150 and related components of the second embodiment. Or, some components of the second embodiment may be replaced with corresponding components of the first embodiment. The modified embodiment of the second embodiment may comprise a heat dissipation structure of the image sensor 330 of the first embodiment. The third embodiment of the present invention may comprise some elements of the first embodiment and some elements of the second embodiment.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:
a first substrate;
a second substrate spaced apart from the first substrate;
a first stiffener coupled to the second substrate;
an image sensor disposed on the first stiffener;
a connection substrate connecting the first substrate and the second substrate; and
a drive unit configured to move the image sensor with respect to the first substrate,
wherein the first stiffener comprises:
a first surface on which the image sensor is disposed;
a second surface opposite to the first surface; and
a plurality of grooves formed on the second surface and spaced apart from each other,
wherein the plurality of grooves of the first stiffener overlap the image sensor in a direction of an optical axis of the image sensor, and
wherein the first surface of the first stiffener is disposed between the image sensor and the plurality of grooves in the direction of the optical axis.

2. The camera device of claim 1, wherein each of the plurality of grooves of the first stiffener is formed in a first direction perpendicular to the optical axis to be greater than a length of the image sensor in corresponding direction.

3. The camera device of claim 2, wherein the plurality of grooves of the first stiffener comprise a first groove and a second groove disposed furthest from each other in a second direction perpendicular to both the optical axis and the first direction, and
wherein a distance between the first groove and the second groove is shorter than a length of the image sensor in corresponding direction.

4. The camera device of claim 1, comprising a third substrate disposed on a lower surface of the second substrate and comprising a hole,
wherein the first stiffener is disposed on a lower surface of the third substrate,
wherein the image sensor is disposed on the first surface of the first stiffener and disposed in the hole of the third substrate, and
wherein the plurality of grooves do not overlap the third substrate in a direction perpendicular to the optical axis.

5. The camera device of claim 1, comprising a second stiffener disposed on an upper surface of the first substrate,
wherein a gap is formed between the first stiffener and the second stiffener.

6. The camera device of claim 5, wherein in the direction of the optical axis, the gap between the first stiffener and the second stiffener is greater than a thickness of the second stiffener and smaller than a thickness of the first substrate.

7. The camera device of claim 5, wherein the first substrate comprises an insulation layer and a conductive layer,
wherein the conductive layer of the first substrate comprises an open region where the insulation layer is omitted from a lower surface of the first substrate, and
wherein an area of the open region of the conductive layer is more than 70% of a total area of the lower surface of the first substrate.

8. The camera device of claim 7, wherein the open region of the conductive layer is connected with the second stiffener through a via hole formed on the first substrate.

9. The camera device of claim 4, wherein the first stiffener comprises a protruding portion protruded from an upper surface and disposed on the hole of the third substrate, and
wherein the image sensor is disposed on an upper surface of the protruding portion of the first stiffener.

10. An optical apparatus comprising:
a main body;
the camera device of claim 1 disposed on the main body; and
a display disposed on the main body and configured to output an image photographed by the camera device.

11. The camera device of claim 9, wherein an upper surface of the image sensor is disposed at a height corresponding with an upper surface of the third substrate.

12. The camera device of claim 1, wherein the drive unit comprises a coil disposed on the second substrate and a magnet configured to interact with the coil.

13. The camera device of claim 12, comprising:
a bracket;
a first cover member disposed on the first substrate and disposed in the bracket;
a driver IC disposed on the first substrate outside the first cover member and electrically connected with the coil;
a second cover member covering the driver IC; and
a conductive tape attached to the second cover member and the bracket.

14. The camera device of claim 12, comprising:
a first cover member disposed on the first substrate and comprising an upper plate and a side plate;
a driver IC disposed on the first substrate outside the first cover member and electrically connected with the coil;
a bracket disposed on the first substrate to cover the driver IC; and
a conductive epoxy disposed between the driver IC and the bracket.

15. The camera device of claim 1, comprising:
a lens disposed on the image sensor; and
a second drive unit configured to move the lens with respect to the image sensor in the direction of the optical axis.

16. A camera device comprising:
a first substrate;
a second substrate spaced apart from the first substrate;
a first stiffener coupled to the second substrate;
an image sensor disposed on the first stiffener; and
a drive unit configured to move the image sensor with respect to the first substrate,
wherein the first stiffener comprises:
a first surface on which the image sensor is disposed;
a second surface opposite to the first surface; and
first and second grooves formed on the second surface and spaced apart from each other, and
wherein the first and second grooves of the first stiffener overlap the image sensor in a direction of an optical axis of the image sensor, and
wherein the first surface of the first stiffener is disposed between the image sensor and the first and second grooves in the direction of the optical axis.

17. The camera device of claim 16, wherein each of the first and second grooves of the first stiffener is formed in a first direction perpendicular to the optical axis to be greater than a length of the image sensor in corresponding direction.

18. The camera device of claim 17, wherein a distance between the first groove and the second groove is shorter than a length of the image sensor in corresponding direction.

19. The camera device of claim 16, comprising a third substrate disposed on a lower surface of the second substrate and comprising a hole, wherein the first stiffener is disposed on a lower surface of the third substrate, wherein the image sensor is disposed on the first surface of the first stiffener and disposed on the hole of the third substrate, and wherein the first and second grooves do not overlap the third substrate in a direction perpendicular to the optical axis.

20. A camera device comprising:

a first substrate;

a second substrate spaced apart from the first substrate;

a first stiffener coupled to the second substrate;

an image sensor disposed on the first stiffener;

a second stiffener disposed on the first substrate and spaced apart from the first stiffener; and a drive unit configured to move the image sensor with respect to the first substrate, wherein the first stiffener comprises:

a first surface on which the image sensor is disposed;

a second surface opposite to the first surface; and a plurality of grooves formed on the second surface and spaced apart from each other, wherein the plurality of grooves of the first stiffener overlap the image sensor in a direction of an optical axis of the image sensor, and wherein the first surface of the first stiffener is disposed between the image sensor and the plurality of grooves in the direction of the optical axis.

* * * * *